(12) United States Patent
Fuse et al.

(10) Patent No.: US 8,180,052 B2
(45) Date of Patent: May 15, 2012

(54) DATA COMMUNICATION APPARATUS

(75) Inventors: Masaru Fuse, Osaka (JP); Satoshi Furusawa, Osaka (JP); Tsuyoshi Ikushima, Nara (JP); Toru Shiozaki, Kyoto (JP)

(73) Assignee: Panasonic Corporation, Osaka (JP)

( * ) Notice: Subject to any disclaimer, the term of this patent is extended or adjusted under 35 U.S.C. 154(b) by 1479 days.

(21) Appl. No.: 11/661,313

(22) PCT Filed: Aug. 31, 2005

(86) PCT No.: PCT/JP2005/015860
§ 371 (c)(1),
(2), (4) Date: Feb. 27, 2007

(87) PCT Pub. No.: WO2006/025426
PCT Pub. Date: Mar. 9, 2006

(65) Prior Publication Data
US 2008/0019523 A1   Jan. 24, 2008

(30) Foreign Application Priority Data

| Aug. 31, 2004 | (JP) | 2004-252980 |
| Sep. 28, 2004 | (JP) | 2004-282635 |
| Oct. 8, 2004 | (JP) | 2004-296821 |
| Oct. 29, 2004 | (JP) | 2004-317186 |
| Nov. 15, 2004 | (JP) | 2004-330980 |
| Feb. 24, 2005 | (JP) | 2005-049460 |

(51) Int. Cl.
*H04K 1/00* (2006.01)
(52) U.S. Cl. ...................... 380/256; 380/255
(58) Field of Classification Search .......... 380/256, 380/252, 287; 332/149
See application file for complete search history.

(56) References Cited

U.S. PATENT DOCUMENTS 4,573,205 A * 2/1986 Nash ............................ 380/252
5,086,467 A * 2/1992 Malek ......................... 380/252
(Continued)

FOREIGN PATENT DOCUMENTS

JP  61-131637  6/1986
(Continued)

OTHER PUBLICATIONS

Osamu Hirota, Kentaro Kato, Masaki Soma, Tsuyoshi S. Usuda, Katsuyoshi Harasawa, "Quantum stream cipher based on optical communications," arXiv: quant-ph/0407062vl, Jul. 8, 2001, http://xxx.lanl.gov/list/quant-ph/0407.

(Continued)

*Primary Examiner* — Eleni Shiferaw
*Assistant Examiner* — Abu Sholeman
(74) *Attorney, Agent, or Firm* — Wenderoth, Lind & Ponack, L.L.P.

(57) ABSTRACT

A data communication apparatus wherein stealthiness is enhanced by significantly increasing the time required for a wiretapper to decrypt an encrypted text. The data communication apparatus is constituted by connecting a data transmitting apparatus and a data receiving apparatus via a transmission path. The data transmitting apparatus receives a first predetermined initial value (key information) and information data, generates a multi-valued signal, the level of which varies substantially in a random number manner, and converts the multi-valued signal to a modulated signal of a predetermined modulation format for transmission. The data receiving apparatus demodulates the modulated signal to output the multi-valued signal, and then reproduces the information data from the multi-valued signal and a received second predetermined initial value (key information).

58 Claims, 64 Drawing Sheets

U.S. PATENT DOCUMENTS

| | | | | |
|---|---|---|---|---|
| 5,307,410 | A * | 4/1994 | Bennett | 380/256 |
| 5,329,134 | A * | 7/1994 | Morrison | 257/14 |
| 5,339,182 | A * | 8/1994 | Kimble et al. | 398/158 |
| 5,604,732 | A * | 2/1997 | Kim et al. | 370/342 |
| 5,966,262 | A * | 10/1999 | Brickner et al. | 360/65 |
| 6,381,015 | B1 * | 4/2002 | Sonehara et al. | 356/497 |
| 6,577,684 | B1 * | 6/2003 | Hirano et al. | 375/286 |
| 6,895,092 | B2 * | 5/2005 | Tomita | 380/278 |
| 7,246,240 | B2 * | 7/2007 | Chuang et al. | 713/176 |
| 7,308,260 | B2 * | 12/2007 | Mandayam et al. | 455/435.1 |
| 7,333,611 | B1 * | 2/2008 | Yuen et al. | 380/256 |
| 7,359,513 | B2 * | 4/2008 | Gisin et al. | 380/256 |
| 2001/0014944 | A1 * | 8/2001 | Ibi et al. | 713/183 |
| 2002/0025041 | A1 * | 2/2002 | Tomita | 380/256 |
| 2003/0123546 | A1 * | 7/2003 | Falik et al. | 375/240.12 |
| 2003/0223762 | A1 * | 12/2003 | Ho et al. | 398/186 |
| 2004/0032954 | A1 * | 2/2004 | Bonfrate et al. | 380/263 |
| 2005/0041981 | A1 * | 2/2005 | Gill et al. | 398/183 |
| 2005/0047601 | A1 * | 3/2005 | Shields et al. | 380/283 |
| 2005/0141716 | A1 | 6/2005 | Kumar et al. | |

FOREIGN PATENT DOCUMENTS

| | | |
|---|---|---|
| JP | 2-67837 | 3/1990 |
| JP | 06-104793 | 4/1994 |
| JP | 6-104793 | 4/1994 |
| JP | 9-205420 | 8/1997 |

OTHER PUBLICATIONS

Tsuyoshi Nishioka, Toshio Hasegawa, Yuichi Ishiduka, Kentaro Imai, "Hikari Tsushin Ryoshi Ango no Anzensei", 2004 Nen Symposium on Cryptography and Information Security Yokoshu, vol. 1 of 2, Jan. 27, 2004, pp. 237 to 242.

U.S. Patent Office Action mailed Jan. 27, 2010 in corresponding U.S. Appl. No. 11/665,684.

Office Action issued Jul. 15, 2010 in connection with related U.S. Appl. No. 11/664,521.

Office Action issued Aug. 4, 2010 in connection with related U.S. Appl. No. 11/665,684.

* cited by examiner

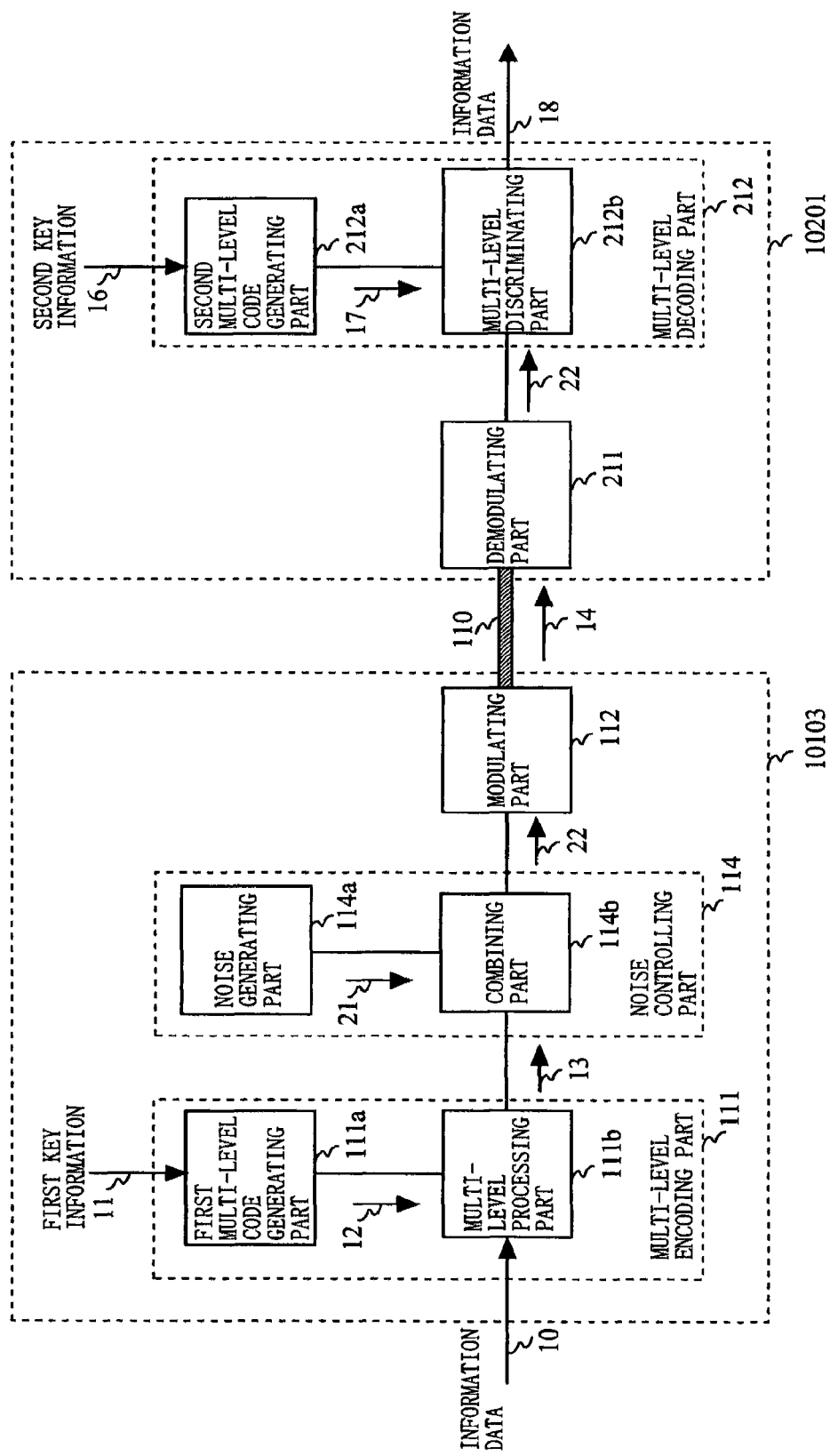
F I G. 6

INFORMATION DATA 10

MULTI-LEVEL CODE SEQUENCE 12

MULTI-LEVEL SIGNAL 13

MODULATED SIGNAL 14

INFORMATION DATA 10

MULTI-LEVEL CODE SEQUENCE 12

MULTI-LEVEL SIGNAL 13

NOISE SIGNAL

MODULATED SIGNAL 14

INFORMATION AMPLITUDE AND DISCRIMINATION
THRESHOLD VALUE OF MULTI-LEVEL SIGNAL

DETERMINATION THRESHOLD VALUE OF INTER
SIGNAL POINT INTERVALS OF MULTI-LEVEL SIGNAL

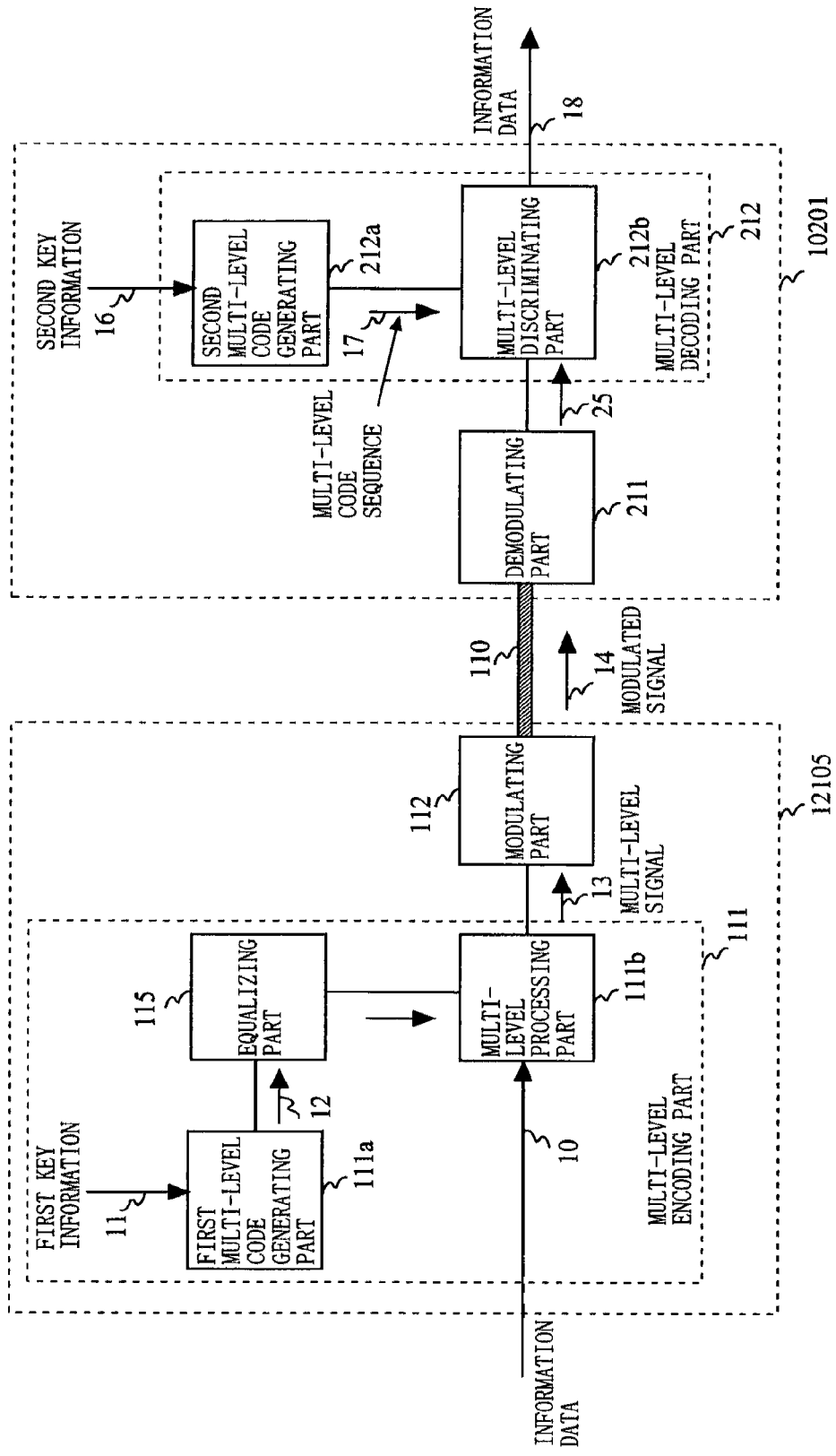

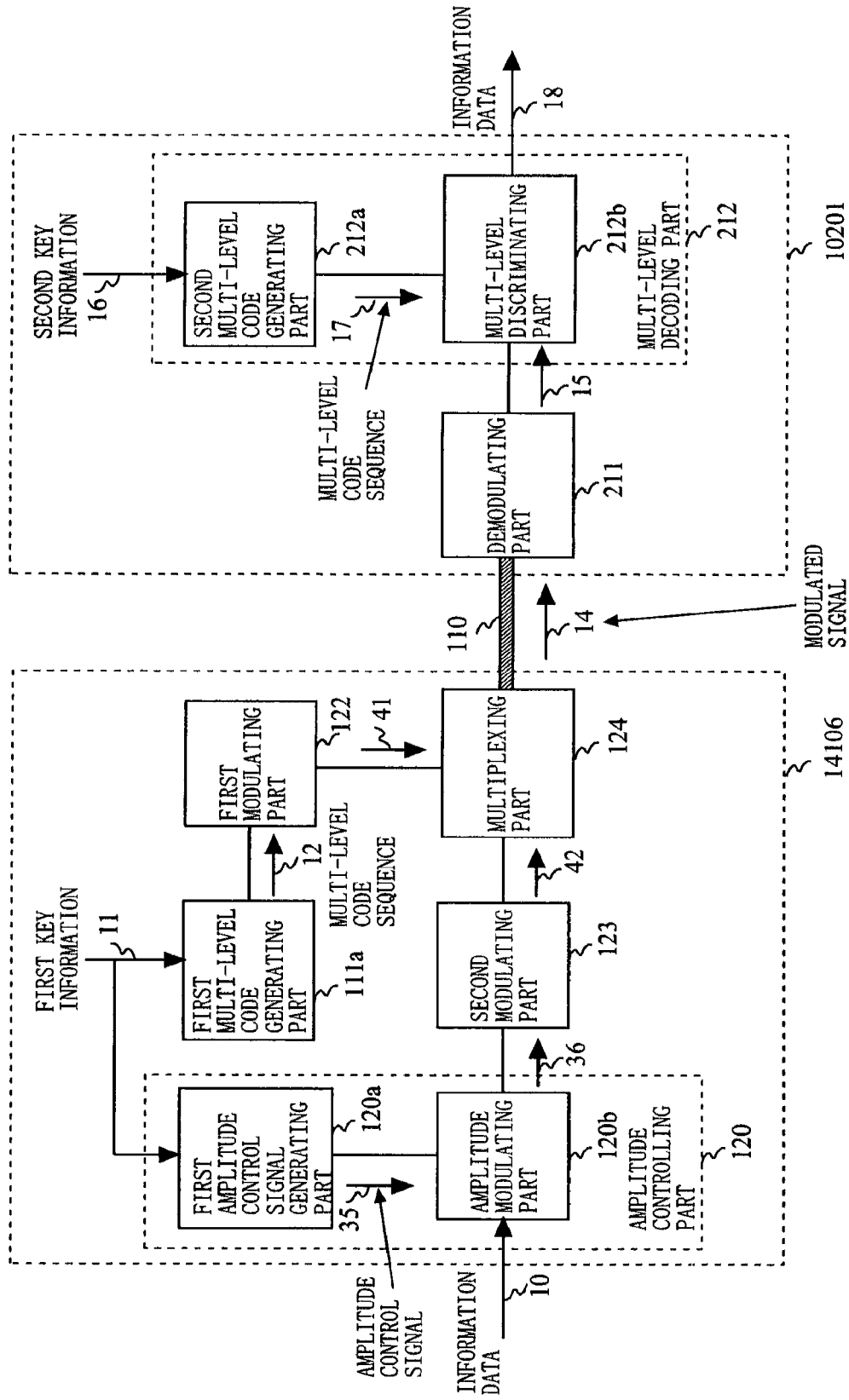
F I G. 32A (a) FIRST INFORMATION DATA 50

(b) SECOND INFORMATION DATA 51

BASE N CODED SIGNAL 52

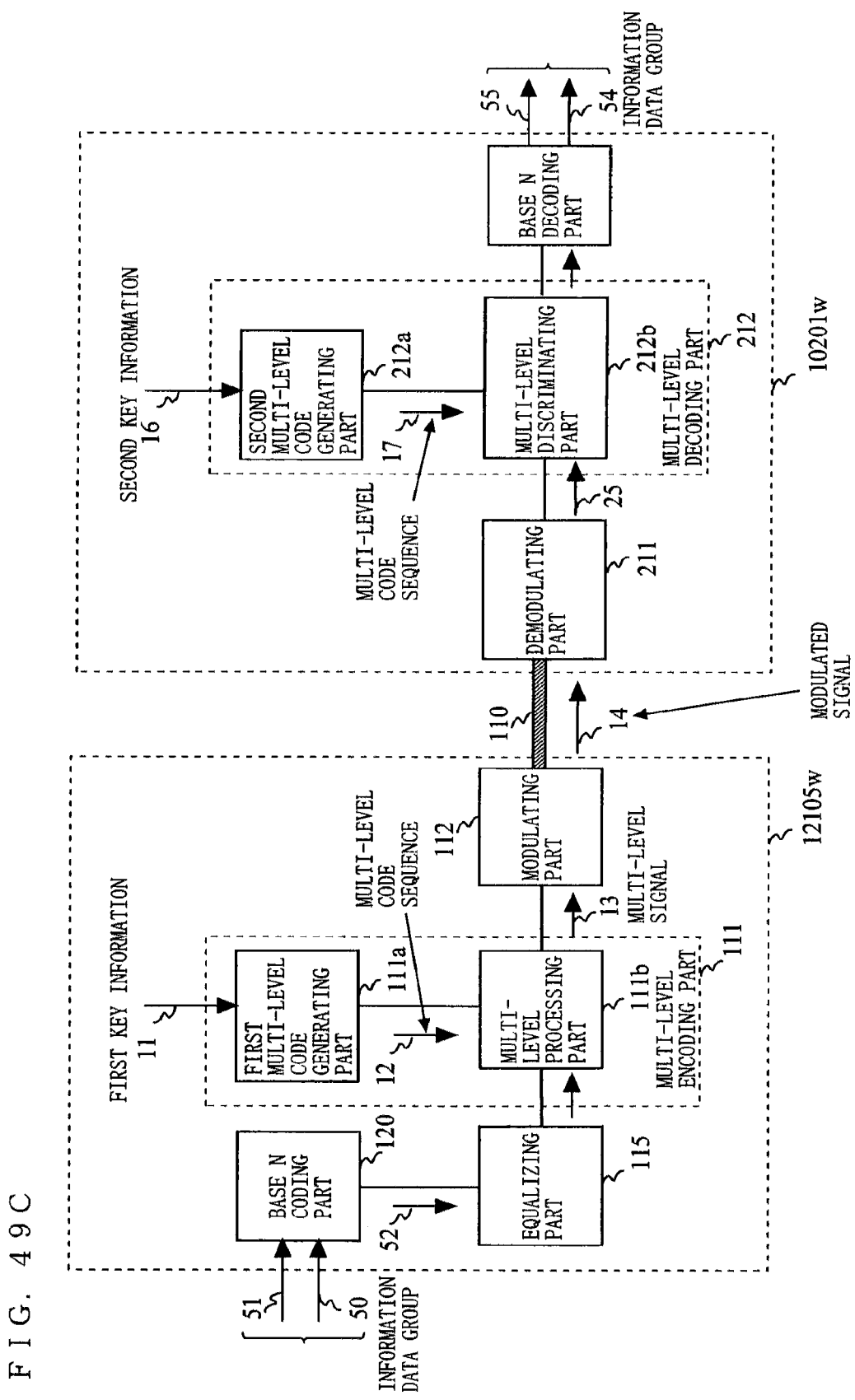

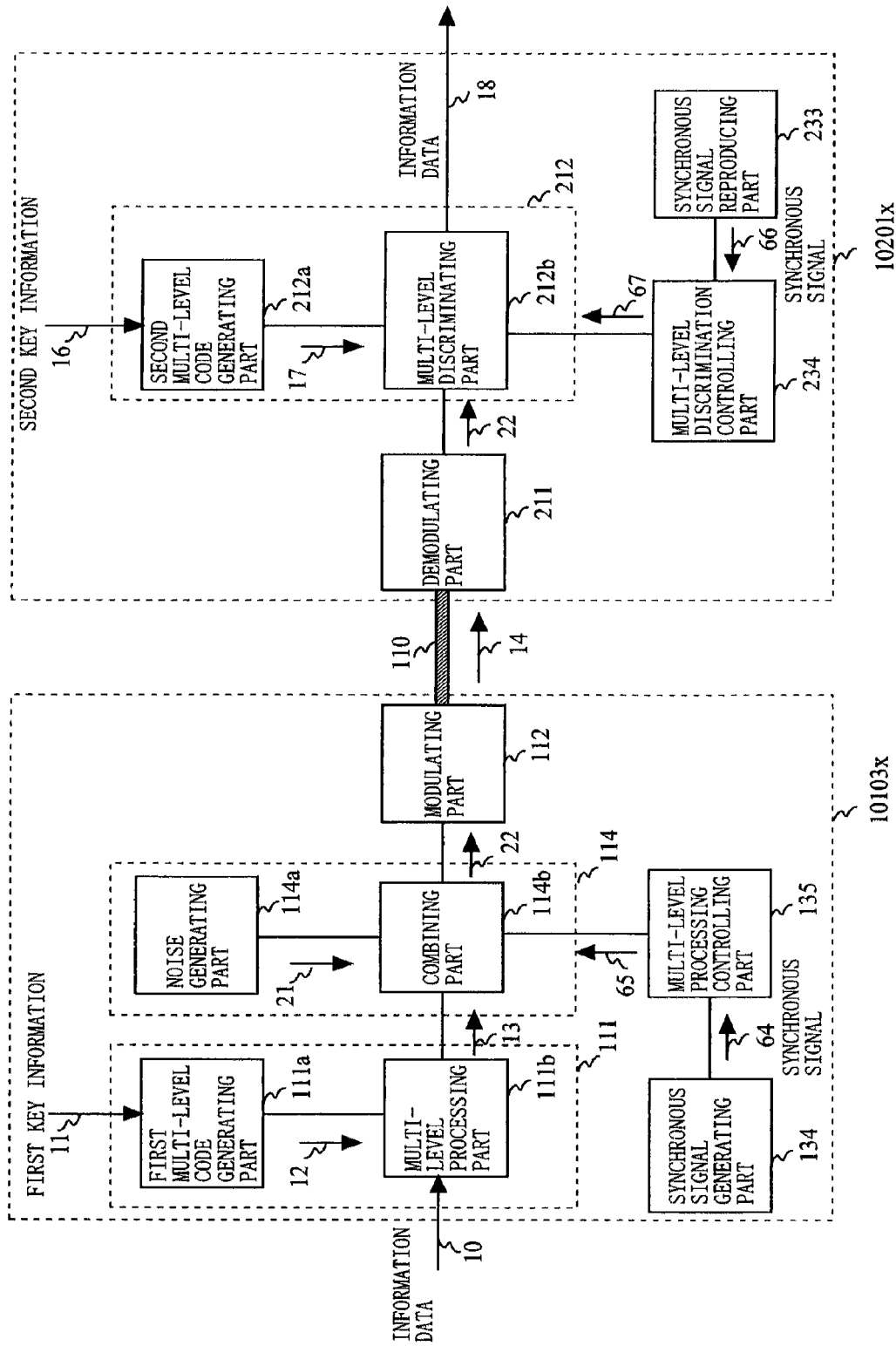

DATA COMMUNICATION APPARATUS

TECHNICAL FIELD

The present invention relates to an apparatus that performs secret communication to prevent illegal wiretapping and interception by third parties. More particularly, the present invention relates to an apparatus that selects and sets a specific encoding and decoding (modulating and demodulating) method to perform data communication between authorized transmitters and receivers.

BACKGROUND ART

Conventionally, to perform communication only among specific persons, a method is adopted in which key information for encoding and decoding is shared between the transmitter and the receiver and an operation or an inverse operation of the information data (plain text) to be transmitted is mathematically performed based on the key information to thereby realize secret communication. FIG. 53 is a block diagram showing the structure of a conventional data transmitting apparatus based on the method. In FIG. 53, the conventional data communication apparatus is constituted by connecting a data transmission apparatus 90001 and a data receiving apparatus 90002 via a transmission path 913. The data transmission apparatus 90001 has an encoding part 911 and a modulating part 912. The data receiving apparatus 90002 has a demodulating part 914 and a decoding part 915. In the conventional data communication apparatus, when the encoding part 911 receives information data 90 and first key information 91 and the decoding part 915 receives second key information 96, the decoding part 915 outputs information data 98. Hereinafter, the operation of the conventional data communication apparatus will be explained with reference to FIG. 53.

In the data transmission apparatus 90001, the encoding part 911 encodes (encrypts) the information data 90 based on the first key information 91. The modulating part 912 modulates the information data encoded by the encoding part 911 in a predetermined modulation format, and transmits it as a modulated signal 94 to the data receiving apparatus 90002 via the transmission path 913. In the data receiving apparatus 90002, the demodulating part 914 demodulates the modulated signal 94 transmitted via the transmission path 913 in a predetermined demodulation format, and outputs it as encoded information data. The decoding part 915 decodes (decrypts) the encoded information data based on the second key information 96 shared with the encoding part 911, and reproduces the original information data 98.

Now, wiretapping by a third party will be explained by using a wiretapper data receiving apparatus 90003. In FIG. 53, the wiretapper data receiving apparatus 90003 has a wiretapper demodulating part 916 and a wiretapper decoding part 917. The wiretapper demodulating part 916 wiretaps the modulated signal (information data) transmitted between the data transmitting apparatus 90001 and the data receiving apparatus 90002, and demodulates the wiretapped modulated signal by a predetermined demodulation method. The wiretapper decoding part 917 tries to decode the signal demodulated by the wiretapper demodulating part 916 based on third key information 99. Here, since the key information is not shared between the wiretapper decoding part 917 and the encoding part 911, the wiretapper decoding part 917 tries to decode the signal demodulated by the wiretapper demodulating part 916 based on the third key information 99 different from the first key information 91. For this reason, the wiretapper decoding part 917 cannot correctly decode the signal modulated by the wiretapper demodulating part 916, and cannot reproduce the original information data.

The mathematical encryption (also called computational encryption or software encryption) technology based on such a mathematical operation is adaptable, for example, to an access system as mentioned in a patent document 1. That is, in a PON (passive optical network) structure in which an optical signal sent out from one optical transmitter is branched by an optical coupler and distributed to each of the optical receivers at a plurality of optical subscriber homes, a signal for other subscribers other than the desired optical signal is inputted to each optical receiver. Therefore, by encrypting the information data for each subscriber by using different pieces of key information, information of each subscriber is prevented from being leaked and wiretapped, so that safe data communication can be realized.

The patent document 1: Japanese Laid-Open Patent Publication No. H09-205420

DISCLOSURE OF THE INVENTION

Problems to be Solved by the Invention

However, the conventional data communication apparatus based on the mathematical encryption technology has the following problem: Even though the key information is not shared, wiretappers can perform decryption in theory by trying an operation using all the possible combinations of key information (brute force attack) or the application of a special analytical algorithm to the cipher (modulated signal, or encrypted information data). In particular, the processing speed of computers has been remarkably improving in recent years, and if computers based on a new principle such as quantum computers are realized in the future, it will be possible to wiretap ciphers within a limited time.

Accordingly, an object of the present invention is to provide a high-stealthiness data communication apparatus based on an astronomical amount of calculations which apparatus significantly increases the time required for wiretappers to analyze ciphers.

Solution to the Problems

The present invention is directed to a data transmitting apparatus that performs cipher communication. To achieve the above object, the data transmitting apparatus according to the present invention is provided with a multi-level encoding part and a modulating part. The multi-level encoding part receives predetermined key information and information data, and generates a multi-level signal the signal level of which varies substantially like a random number. The modulating part generates a modulated signal of a predetermined modulation format based on the multi-level signal. The multi-level encoding part includes: a multi-level code generating part that generates, from the key information, a multi-level code sequence the signal level of which varies substantially like a random number; and a multi-level processing part that combines the multi-level code sequence and the information data according to a predetermined processing to thereby generate a multi-level signal having a level corresponding to a combination of the signal levels of the multi-level code sequence and the information data. The multi-level encoding part sets the inter signal point intervals of the multi-level signal so as to be substantially uniform.

Preferably, the inter signal point intervals of the multi-level signal are smaller than the amplitude of the information data included in the multi-level signal. The maximum amplitude of the multi-level signal is equal to or larger than twice the amplitude of the information data included in the multi-level signal.

The data transmitting apparatus may be further provided with a data inverting part that bit-inverts the information data based on a predetermined pseudo-random number sequence and outputs the bit-inverted information data to the multi-level encoding part. Moreover, the change rates of the multi-level code sequence and the information data coincide with each other. The information data is a binary signal.

Preferably, as the predetermined processing, the multi-level processing part generates the multi-level signal by adding the information data to the multi-level code sequence by using the multi-level code sequence as the reference level. Moreover, as the predetermined processing, the multi-level processing part may generate the multi-level signal by level-controlling the multi-level code sequence according to the information data by using the multi-level code sequence as the reference level.

The modulated signal is generated by modulating an electromagnetic field by the multi-level signal. Moreover, the modulated signal may be generated by modulating a light wave by the multi-level signal. At this time, the light wave may be coherent light.

Moreover, the data transmitting apparatus may be further provided with a noise controlling part that is connected between the multi-level encoding part and the modulating part, combines a predetermined noise on the multi-level signal, and outputs the signal to the modulating part as a noise-combined multi-level signal. At this time, the noise controlling part includes: a noise generating part that generates the predetermined noise; and a combining part that combines the noise and the multi-level signal.

The multi-level encoding part distributes, in the noise-combined multi-level signal, the inter signal point intervals of the multi-level signal so that the signal-to-noise power ratios calculated between adjoining two signal points are substantially the same. Moreover, the multi-level encoding part non-uniformly or non-linearly distributes, in the noise-combined multi-level signal, the inter signal point intervals of the multi-level signal so that the signal-to-noise power ratios calculated between adjoining two signal points are substantially the same.

The data transmitting apparatus may be further provided with an equalizing part that is connected between the multi-level encoding part and the modulating part and waveform-equalizes the multi-level signal by predetermined means. Alternatively, the data transmitting apparatus may be further provided with an equalizing part that waveform-equalizes the information data by predetermined means and outputs the waveform-equalized information data to the multi-level encoding part. Alternatively, in the data transmitting apparatus, the multi-level encoding part may be further provided with an equalizing part that is connected between the multi-level code generating part and the multi-level processing part and waveform-equalizes the multi-level code sequence by predetermined means. Alternatively, the data transmitting apparatus may be further provided with an equalizing part that waveform-equalizes the modulated signal by predetermined means.

The equalizing part is a low-pass filter. The low-pass filter filters a signal component of equal to or lower than half the signal band of an inputted signal. Alternatively, the equalizing part may be a high-pass filter that intercepts a direct-current component included in the signal from an inputted signal. Alternatively, the equalizing part may be a band-pass filter that filters a signal component of a predetermined frequency band from an inputted signal.

Moreover, the data transmitting apparatus may be provided with: a multi-level code generating part that generates, from predetermined key information, a multi-level code sequence the signal level of which varies substantially like a random number; a first modulating part that generates a first modulated signal of a predetermined modulation format based on the multi-level code sequence; a second modulating part that receives the first modulated signal and information data and generates a second modulated signal of a predetermined modulation format based on the information data; and an equalizing part that is connected in the succeeding stage of the multi-level code generating part and waveform-equalizes the multi-level code sequence by predetermined means.

Alternatively, the data transmitting apparatus may be provided with: a multi-level code generating part that generates, from predetermined key information, a multi-level code sequence the signal level of which varies substantially like a random number; a first modulating part that receives information data and generates a first modulated signal of a predetermined modulation format based on the information data; a second modulating part that receives the first modulated signal and the multi-level code sequence and generates a second modulated signal of a predetermined modulation format based on the multi-level code sequence; and an equalizing part that is connected in the succeeding stage of the multi-level code generating part and waveform-equalizes the multi-level code sequence by predetermined means.

Preferably, the data transmitting apparatus may be further provided with: an amplitude control signal generating part that generates, from predetermined amplitude control key information, an amplitude control signal the value of which varies substantially like a random number; and an amplitude modulating part that is connected in the preceding stage of the multi-level encoding part, amplitude-modulates the information data based on the amplitude control signal, and outputs the amplitude-modulated signal to the multi-level encoding part.

Moreover, the data transmitting apparatus may be further provided with: an amplitude control signal generating part that generates, from predetermined amplitude control key information, an amplitude control signal the value of which varies substantially like a random number; and an amplitude modulating part that is inserted between the multi-level encoding part and the modulating part, amplitude-modulates the multi-level signal based on the amplitude control signal, and outputs the amplitude-modulated signal to the modulating part.

Moreover, the data transmitting apparatus may be further provided with: an amplitude control signal generating part that generates, from predetermined amplitude control key information, an amplitude control signal the value of which varies substantially like a random number; and an amplitude modulating part that is connected in the succeeding stage of the modulating part, modulates the modulated signal in a predetermined modulation format based on the amplitude control signal, and outputs the modulated signal. At this time, the amplitude modulating part amplitude-modulates or intensity-modulates the modulated signal.

Moreover, the data transmitting apparatus may be provided with: a multi-level code generating part that generates, from predetermined key information, a multi-level code sequence the level of which varies substantially like a random number; a first modulating part that generates a first modulated signal of a predetermined modulation format based on the multi-level code sequence; a second modulating part that receives information data and generates a second modulated signal of a predetermined modulation format; and a multiplexing part that multiplexes the first modulated signal and the second modulated signal.

Preferably, the data transmitting apparatus is further provided with: an amplitude control signal generating part that generates, from predetermined amplitude control key information, an amplitude control signal the value of which varies substantially like a random number; and an amplitude modulating part that is inserted in the preceding stage of the second modulating part, amplitude-modulates the information data based on the amplitude control signal, and outputs the amplitude-modulated signal.

Alternatively, the data transmitting apparatus may be further provided with: an amplitude control signal generating part that generates, from predetermined amplitude control key information, an amplitude control signal the value of which varies substantially like a random number; and an amplitude modulating part that is inserted in the preceding stage of the first modulating part, amplitude-modulates the multi-level code sequence based on the amplitude control signal, and outputs the amplitude-modulated signal.

Moreover, the data transmitting apparatus may be provided with: a multi-level code generating part that generates, from predetermined key information, a multi-level code sequence the signal level of which varies substantially like a random number; a first modulating part that generates a first modulated signal of a predetermined modulation format based on the multi-level code sequence; and a second modulating part that receives information data, modulates the first modulated signal by the information data, and generates a second modulated signal of a predetermined modulation format.

Preferably, the data transmitting apparatus is further provided with: an amplitude control signal generating part that generates, from predetermined amplitude control key information, an amplitude control signal the value of which varies substantially like a random number; and an amplitude modulating part that is inserted in the preceding stage of the second modulating part, amplitude-modulates the information data based on the amplitude control signal, and outputs the amplitude-modulated signal.

Alternatively, the data transmitting apparatus may be further provided with: an amplitude control signal generating part that generates, from predetermined amplitude control key information, an amplitude control signal the value of which varies substantially like a random number; and an amplitude modulating part that is inserted in the preceding stage of the first modulating part, amplitude-modulates the multi-level code sequence based on the amplitude control signal, and outputs the amplitude-modulated signal.

Moreover, the data transmitting apparatus may be further provided with a base N encoding part that is connected in the preceding stage of the multi-level encoding part, encodes an information data group comprising a plurality of pieces of the information data, into a number in given base system according to a predetermined processing, and outputs the number to the multi-level encoding part as a base N encoded signal.

Preferably, to encode the information data group into the number in given base system, the base N encoding part varies multiple levels of the base N encoded signal according to a combination of logics by the pieces of information data. At this time, the base N encoding part outputs the base N encoded signal from the information data group based on the key information. Moreover, the base N encoding part may output the base N encoded signal from the information data group based on key information different from the above key information. The multi-level encoding part generates the multi-level signal of any one of a plurality of predetermined level numbers every predetermined period.

Moreover, the data transmitting apparatus may be further provided with: a synchronous signal generating part that outputs a predetermined synchronous signal corresponding to the multi-level signal; and a multi-level processing controlling part that outputs a multi-level processing control signal that specifies the level number based on the synchronous signal. The multi-level encoding part outputs a binary multi-level signal in at least any of the predetermined periods. In this case, the multi-level encoding part makes the amplitude of the binary multi-level signal equal to or larger than the amplitude of the multi-level signal of the maximum level number of the level numbers, and outputs the binary multi-level signal. Alternatively, the multi-level encoding part outputs the information data as the binary multi-level signal.

Preferably, the data transmitting apparatus changes the transfer rate of the information data, the multi-level code sequence or the multi-level signal according to the level number. Moreover, the data transmitting apparatus increases the transfer rate of the information data, the multi-level code sequence or the multi-level signal as the level number decreases.

Moreover, the present invention is also directed to a data receiving apparatus that performs cipher communication. To achieve the above object, the data receiving apparatus according to the present invention is provided with a demodulating part and a multi-level decoding part.

The demodulating part demodulates a modulated signal of a predetermined modulation format, and outputs a multi-level signal. The multi-level decoding part receives predetermined key information and the multi-level signal, and outputs information data. The multi-level decoding part includes: a multi-level code generating part that generates, from the key information, a multi-level code sequence the signal level of which varies substantially like a random number; and a multi-level discriminating part that discriminates the multi-level signal based on the multi-level code sequence and outputs the information data.

Moreover, the data receiving apparatus may be further provided with a data inverting part that bit-inverts the information data outputted from the multi-level decoding part based on a predetermined pseudo-random number sequence and outputs the bit-inverted information data.

Moreover, the multi-level decoding part may further include an amplitude control signal generating part that generates, from predetermined amplitude control key information, an amplitude control signal the value of which varies substantially like a random number. Moreover, the multi-level discriminating part discriminates the multi-level signal based on the multi-level code sequence and the amplitude control signal, and outputs the information data.

Preferably, the multi-level discriminating part switches a threshold value for discriminating the multi-level signal, based on the level number of the multi-level signal inputted in a predetermined prescribed period.

The data receiving apparatus may be further provided with: a synchronous signal generating part that reproduces a predetermined synchronous signal corresponding to the multi-level signal; and a multi-level discrimination controlling part that outputs a multi-level discrimination control signal that changes the threshold value at the multi-level discriminating part based on the synchronous signal. The multi-level decoding part discriminates the binary multi-level signal at least in any of the predetermined periods.

Moreover, the present invention is directed to a data communication apparatus in which a data transmitting apparatus and a data receiving apparatus perform cipher communication. To achieve the above object, in the data communication apparatus according to the present invention, the data transmitting apparatus is provided with a multi-level encoding part and a modulating part. The multi-level encoding part receives predetermined first key information and information data, and generates a first multi-level signal the signal level of which varies substantially like a random number. The modulating part generates a modulated signal of a predetermined modulation format based on the first multi-level signal. The multi-level encoding part includes: a first multi-level code generating part that generates, from the first key information, a first multi-level code sequence the signal level of which varies substantially a random number; and a multi-level processing part that combines the first multi-level code sequence and the information data according to a predetermined processing so as to be converted into the first multi-level signal having a level corresponding to a combination of the signal levels of the first multi-level code sequence and the information data. The first multi-level code generating part sets the inter signal point intervals of the multi-level signal so as to be substantially uniform.

Moreover, the data receiving apparatus is provided with a demodulating part and a multi-level decoding part. The demodulating part demodulates the modulated signal of the predetermined modulation format, and outputs a second multi-level signal. The multi-level decoding part receives predetermined second key information and the second multi-level signal, and outputs information data.

Preferably, the inter signal point intervals of the multi-level signal are smaller than the amplitude of the information data included in the multi-level signal. The maximum amplitude of the multi-level signal is equal to or larger than twice the amplitude of the information data included in the multi-level signal.

The data transmitting apparatus may be further provided with a data inverting part that bit-inverts the information data based on a predetermined pseudo-random number sequence and outputs the bit-inverted information data to the multi-level encoding part. Moreover, the change rates of the multi-level code sequence and the information data coincide with each other. The information data is a binary signal.

Preferably, as the predetermined processing, the multi-level processing part generates the multi-level signal by adding the information data to the multi-level code sequence by using the multi-level code sequence as the reference level. Moreover, as the predetermined processing, the multi-level processing part generates the multi-level signal by level-controlling the multi-level code sequence according to the information data by using the multi-level code sequence as the reference level.

The modulated signal is generated by modulating an electromagnetic field by the multi-level signal. Moreover, the modulated signal is generated by modulating a light wave by the multi-level signal. At this time, the lightwave is coherent light.

Moreover, the data transmitting apparatus may be further provided with a noise controlling part that is connected between the multi-level encoding part and the modulating part, combines a predetermined noise on the multi-level signal, and outputs the signal to the modulating part as a noise-combined multi-level signal. At this time, the noise controlling part includes: a noise generating part that generates the predetermined noise; and a combining part that combines the noise and the multi-level signal.

The multi-level encoding part distributes, in the noise-combined multi-level signal, the inter signal point intervals of the multi-level signal so that the signal-to-noise power ratios calculated between adjoining two signal points are substantially the same. Moreover, the multi-level encoding part non-uniformly or non-linearly distributes, in the noise-combined multi-level signal, the inter signal point intervals of the multi-level signal so that the signal-to-noise power ratios calculated between adjoining two signal points are substantially the same.

The data transmitting apparatus may be further provided with an equalizing part that is connected between the multi-level encoding part and the modulating part and waveform-equalizes the multi-level signal by predetermined means. Alternatively, the data transmitting apparatus may be further provided with an equalizing part that waveform-equalizes the information data by predetermined means and outputs the waveform-equalized information data to the multi-level encoding part. Alternatively, in the data transmitting apparatus, the multi-level encoding part may be further provided with an equalizing part that is connected between the multi-level code generating part and the multi-level processing part and waveform-equalizes the multi-level code sequence by predetermined means. Alternatively, the data transmitting apparatus may be further provided with an equalizing part that waveform-equalizes the modulated signal by predetermined means.

The equalizing part is a low-pass filter. The low-pass filter filters a signal component of equal to or lower than half the signal band of an inputted signal. Alternatively, the equalizing part may be a high-pass filter that intercepts a direct-current component included in the signal from an inputted signal. Alternatively, the equalizing part may be a band-pass filter that filters a signal component of a predetermined frequency band from an inputted signal.

Moreover, the data transmitting apparatus may be provided with: a multi-level code generating part that generates, from predetermined key information, a multi-level code sequence the signal level of which varies substantially like a random number; a first modulating part that generates a first modulated signal of a predetermined modulation format based on the multi-level code sequence; a second modulating part that receives the first modulated signal and information data and generates a second modulated signal of a predetermined modulation format based on the information data; and an equalizing part that is connected in the succeeding stage of the multi-level code generating part and waveform-equalizes the multi-level code sequence by predetermined means.

Alternatively, the data transmitting apparatus may be provided with: a multi-level code generating part that generates, from predetermined key information, a multi-level code sequence the signal level of which varies substantially like a random number; a first modulating part that receives information data and generates a first modulated signal of a predetermined modulation format based on the information data; a second modulating part that receives the first modulated signal and the multi-level code sequence and generates a second modulated signal of a predetermined modulation format based on the multi-level code sequence; and an equalizing part that is connected in the succeeding stage of the multi-level code generating part and waveform-equalizes the multi-level code sequence by predetermined means.

Preferably, the data transmitting apparatus may be further provided with: an amplitude control signal generating part that generates, from predetermined amplitude control key information, an amplitude control signal the value of which varies substantially like a random number; and an amplitude modulating part that is connected in the preceding stage of the multi-level encoding part, amplitude-modulates the information data based on the amplitude control signal, and outputs the amplitude-modulated signal to the multi-level encoding part.

Moreover, the data transmitting apparatus may be further provided with an amplitude control signal generating part that generates, from predetermined amplitude control key information, an amplitude control signal the value of which varies substantially like a random number; and an amplitude modulating part that is inserted between the multi-level encoding part and the modulating part, amplitude-modulates the multi-level signal based on the amplitude control signal, and outputs the amplitude-modulated signal to the modulating part.

Moreover, the data transmitting apparatus may be further provided with: an amplitude control signal generating part that generates, from predetermined amplitude control key information, an amplitude control signal the value of which varies substantially like a random number; and an amplitude modulating part that is connected in the succeeding stage of the modulating part, modulates the modulated signal in a predetermined modulation format based on the amplitude control signal, and outputs the modulated signal. At this time, the amplitude modulating part amplitude-modulates or intensity-modulates the modulated signal.

Moreover, the data transmitting apparatus may be provided with: a multi-level code generating part that generates, from predetermined key information, a multi-level code sequence the level of which varies substantially like a random number; a first modulating part that generates a first modulated signal of a predetermined modulation format based on the multi-level code sequence; a second modulating part that receives information data and generates a second modulated signal of a predetermined modulation format; and a multiplexing part that multiplexes the first modulated signal and the second modulated signal.

Preferably, the data transmitting apparatus is further provided with: an amplitude control signal generating part that generates, from predetermined amplitude control key information, an amplitude control signal the value of which varies substantially like a random number; and an amplitude modulating part that is inserted in the preceding stage of the second modulating part, amplitude-modulates the information data based on the amplitude control signal, and outputs the amplitude-modulated signal.

Alternatively, the data transmitting apparatus may be further provided with: an amplitude control signal generating part that generates, from predetermined amplitude control key information, an amplitude control signal the value of which varies substantially like a random number; and an amplitude modulating part that is inserted in the preceding stage of the first modulating part, amplitude-modulates the multi-level code sequence based on the amplitude control signal, and outputs the amplitude-modulated signal.

Moreover, the data transmitting apparatus may be provided with: a multi-level code generating part that generates, from predetermined key information, a multi-level code sequence the signal level of which varies substantially like a random number; a first modulating part that generates a first modulated signal of a predetermined modulation format based on the multi-level code sequence; and a second modulating part that receives information data, modulates the first modulated signal by the information data, and generates a second modulated signal of a predetermined modulation format.

Preferably, the data transmitting apparatus is further provided with: an amplitude control signal generating part that generates, from predetermined amplitude control key information, an amplitude control signal the value of which varies substantially like a random number; and an amplitude modulating part that is inserted in the preceding stage of the second modulating part, amplitude-modulates the information data based on the amplitude control signal, and outputs the amplitude-modulated signal.

Alternatively, the data transmitting apparatus may be further provided with an amplitude control signal generating part that generates, from predetermined amplitude control key information, an amplitude control signal the value of which varies substantially like a random number; and an amplitude modulating part that is inserted in the preceding stage of the first modulating part, amplitude-modulates the multi-level code sequence based on the amplitude control signal, and outputs the amplitude-modulated signal.

Moreover, the data transmitting apparatus may be further provided with a base N encoding part that is connected in the preceding stage of the multi-level encoding part, encodes an information data group comprising a plurality of pieces of the information data, into a number in given base system according to a predetermined processing, and outputs the number to the multi-level encoding part as a base N encoded signal.

Preferably, to encode the information data group into the number in given base system, the base N encoding part varies multiple levels of the base N encoded signal according to a combination of logics by the pieces of information data. At this time, the base N encoding part outputs the base N encoded signal from the information data group based on the key information. Moreover, the base N encoding part outputs the base N encoded signal from the information data group based on key information different from the key information. The multi-level encoding part generates the multi-level signal of any one of a plurality of predetermined level numbers every predetermined period.

Moreover, the data transmitting apparatus may be further provided with: a synchronous signal generating part that outputs a predetermined synchronous signal corresponding to the multi-level signal; and a multi-level processing controlling part that outputs a multi-level processing control signal that specifies the level number based on the synchronous signal. The multi-level encoding part outputs a binary multi-level signal in at least any of the predetermined periods. In this case, the multi-level encoding part makes the amplitude of the binary multi-level signal equal to or larger than the amplitude of the multi-level signal of the maximum level number of the level numbers, and outputs the binary multi-level signal. Alternatively, the multi-level encoding part outputs the information data as the binary multi-level signal.

Preferably, the data transmitting apparatus changes the transfer rate of the information data, the multi-level code sequence or the multi-level signal according to the level number. Moreover, the data transmitting apparatus increases the transfer rate of the information data, the multi-level code sequence or the multi-level signal as the level number decreases.

EFFECT OF THE INVENTION

The data communication apparatus according to the present invention encodes and modulates the information data into the multi-level signal based on the key information, transmits the multi-level signal, demodulates and decodes the received multi-level signal based on the same key information, and optimizes the signal-to-noise power ratios of the multi-level signal to thereby significantly increase the time required for the analysis of ciphers, so that a high-stealthiness data communication apparatus based on an astronomical amount of calculations can be provided.

BRIEF DESCRIPTION OF THE DRAWINGS

FIG. 6 is a block diagram showing of the structure of a data communication apparatus according to a third embodiment of the present invention.

FIG. 20C is a block diagram showing another example of the structure of the data communication apparatus according to the sixth embodiment of the present invention.

FIG. 32A is a block diagram showing an example of the structure of a data communication apparatus according to a ninth embodiment of the present invention.

FIG. 49C is a block diagram showing an example of the structure of a data communication apparatus in which the characteristics of some of the embodiments of the present invention are combined.

FIG. 50B is a block diagram showing an example of the structure of a data communication apparatus in which the characteristics of some of the embodiments of the present invention are combined.

DESCRIPTION OF THE REFERENCE CHARACTERS

Figure 1:
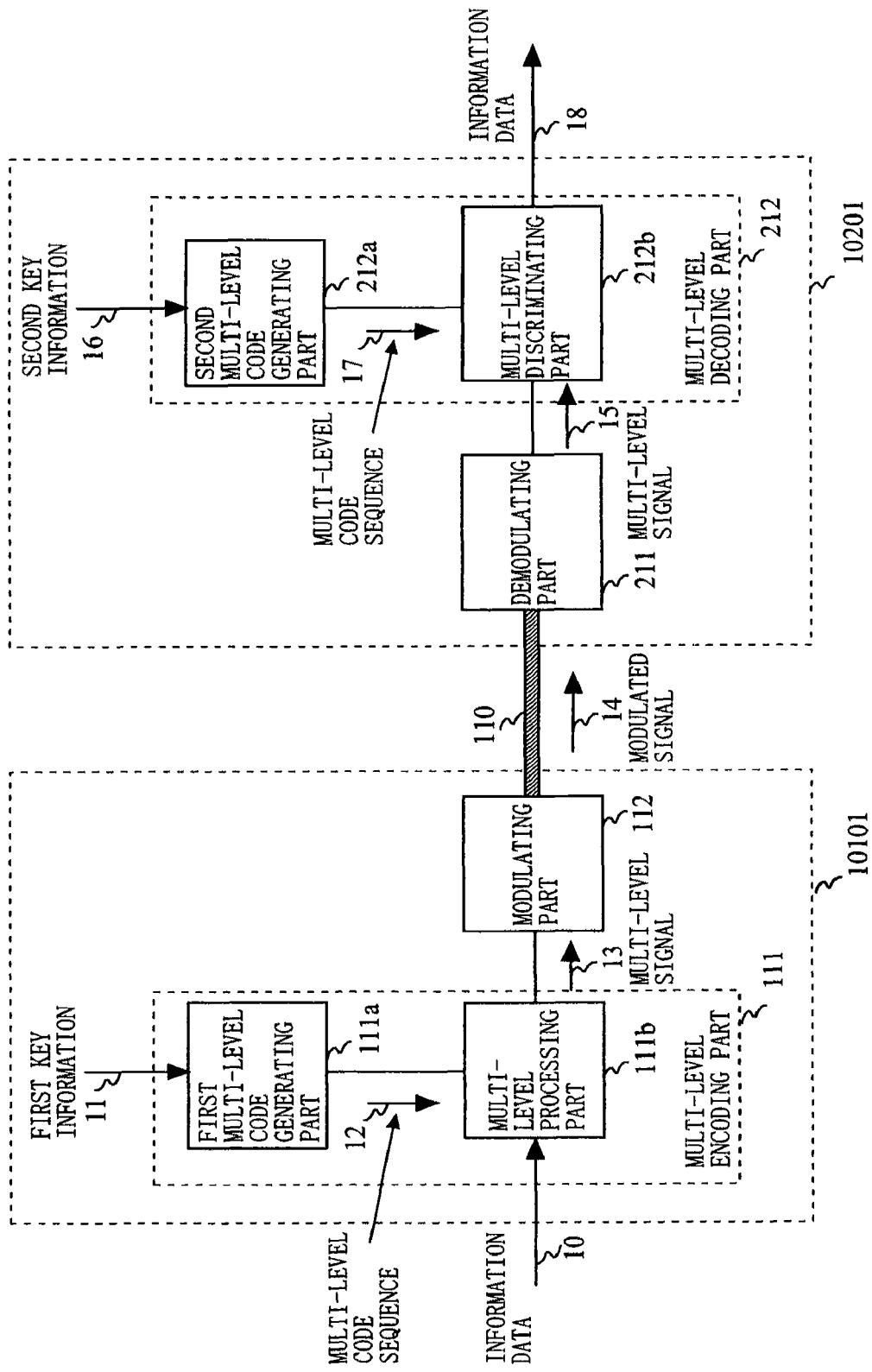
FIG. 1 is a block diagram showing of the structure of a data communication apparatus according to a first embodiment of the present invention.

10, 18 information data
11, 16, 38, 39, 91, 96, 99 key information
12, 17 multi-level code sequence
13, 15 multi-level signal
14, 41, 42, 94 modulated signal
24, 25 equalized multi-level signal
27 equalized multi-level code sequence
35, 40 amplitude control signal
36 amplitude-modulated information data
37 amplitude-modulated multi-level signal
110 transmission path
111 multi-level encoding part
111a first multi-level code generating part
111b multi-level processing part
112, 122, 123, 912 modulating part
113 first data inverting part
114 noise controlling part
114a noise generating part
114b combining part
115 equalizing part
116, 122 first modulating part
117, 123 second modulating part
120 amplitude controlling part
120a first amplitude control signal generating part
120b amplitude modulating part
124 multiplexing part
131, 132 base N encoding part
134 synchronous signal generating part
135 multi-level processing controlling part
211, 914, 916 demodulating part
212, 218 multi-level decoding part
212a second multi-level signal generating part
212b multi-level discriminating part
212c second amplitude control signal generating part
213 second data inverting part
220, 221 base N decoding part
233 synchronous signal reproducing part
234 multi-level discrimination controlling part
236 sub demodulating part
237 discriminating part
911 encoding part
915, 917 decoding part
10101 to 19108 data transmitting apparatus
10201 to 19207 data receiving apparatus

BEST MODE FOR CARRYING OUT THE INVENTION (First Embodiment)

FIG. 1 is a block diagram showing the structure of a data communication apparatus according to a first embodiment of the present invention. In FIG. 1, the data communication apparatus according to the first embodiment is constituted by connecting a data transmitting apparatus 10101 and a data receiving apparatus 10201 via a transmission path 110. The data transmitting apparatus 10101 has a multi-level encoding part 111 and a modulating part 112. The multi-level encoding part 111 includes a first multi-level code generating part 111a and a multi-level processing part 111b. The data receiving apparatus 10201 has a demodulating part 211 and a multi-level decoding part 212. The multi-level decoding part 212 includes a second multi-level code generating part 212a and a multi-level discriminating part 212b. As the transmission path 110, a metal line such as a LAN cable or a coaxial cable, or an optical waveguide such as an optical fiber cable may be used. The transmission path 110 is not limited to a wired cable such as a LAN cable, and may be a free space that allows radio signals to propagate therethrough.

Figure 2:
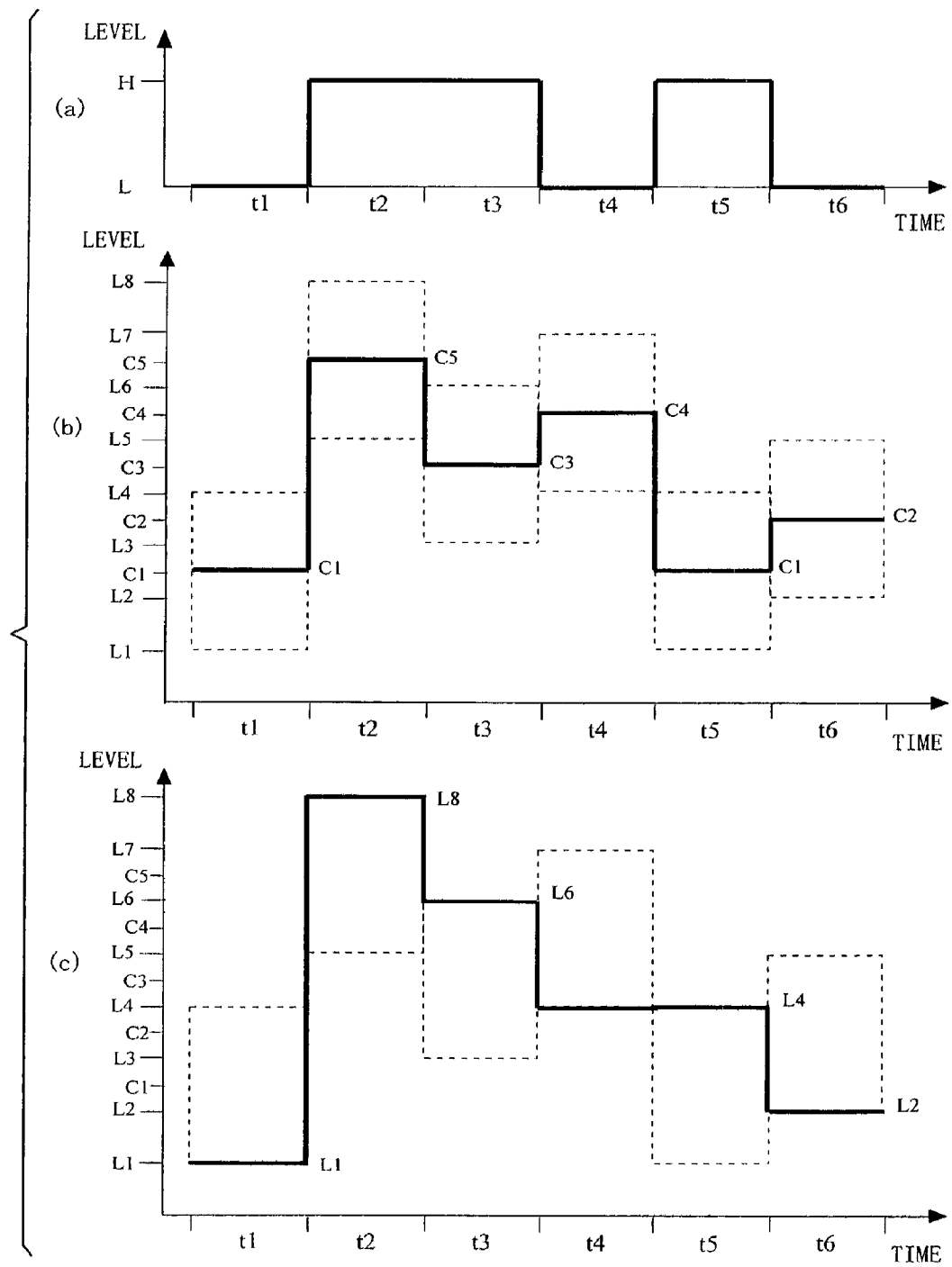
FIG. 2 is a schematic view explaining the waveform of a transmission signal of the data communication apparatus according to the first embodiment of the present invention.
Figure 3:
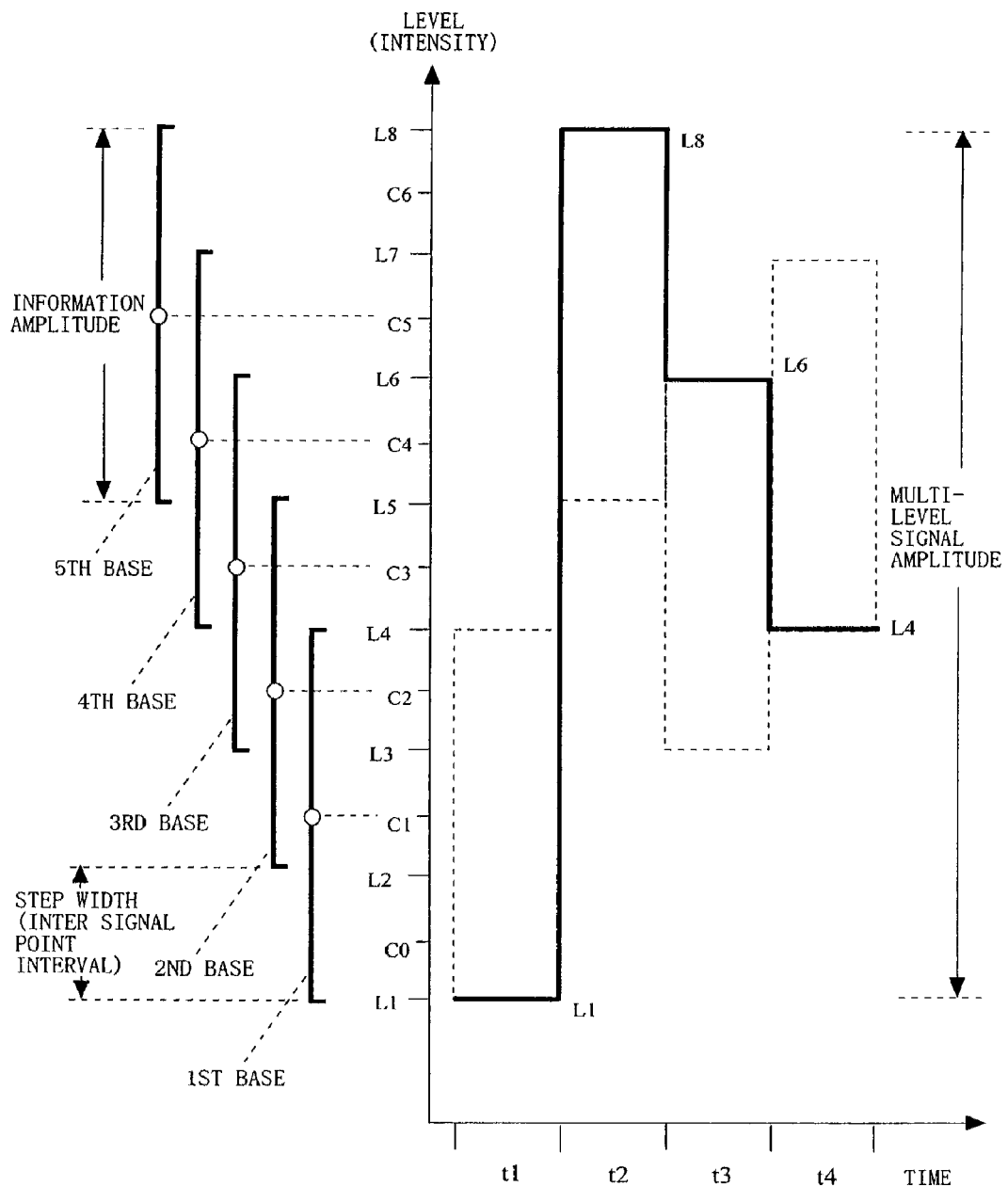
FIG. 3 is a schematic view explaining the waveform of a transmission signal of the data communication apparatus according to the first embodiment of the present invention.

FIGS. 2 and 3 are schematic views for explaining the waveforms of the modulated signals outputted from the modulating part 112. Hereinafter, the operation of the data communication apparatus according to the first embodiment will be explained by using FIGS. 1 to 3.

The first multi-level code generating part 111a generates a multi-level code sequence 12 (FIG. 2 (b)) the signal level of which varies substantially like a random number, based on predetermined first key information 11. The multi-level processing part 111b receives the multi-level code sequence 12 and information data 10 (FIG. 2(a)), and combines these signals by a predetermined procedure to thereby generate a multi-level signal 13 (FIG. 2(c)) having a level uniquely corresponding to a combination of the levels of the signals. For example, when the level of the multi-level code sequence 12 varies like c1, c5, c3 and c4 for the time slots t1, t2, t3 and t4, with the multi-level code sequence 12 as the bias level, the multi-level processing part 111b adds the information data 10 to thereby generate the multi-level signal 13 the level of which varies like L1, L8, L6 and L4.

Here, as shown in FIG. 3, the amplitude of the information data 10 will be referred to as "information amplitude," the total amplitude of the multi-level signal 13, as "multi-level signal amplitude," the level combinations (L1, L4), (L2, L5), (L3, L6), (L4, L7), and (L5, L8) that the multi-level signal 13 can take in correspondence with the levels c1, c2, c3, c4, and c5 of the multi-level code sequence 12, as a first to a fifth "bases," and the shortest inter signal point interval of the multi-level signal 13, as "step width."

The modulating part 112 modulates the multi-level signal 13 in a predetermined modulation format, and sends it out to the transmission path 110 as a modulated signal 14. The demodulating part 211 demodulates the modulated signal 14 transmitted via the transmission path 110, and reproduces a multi-level signal 15. The second multi-level code generating part 212a previously shares second key information 16 the same as the first key information 11, and generates a multi-level code sequence 17 corresponding to the multi-level code sequence 12 based on the second key information 16. The multi-level discriminating part 212b performs the discrimination (binary determination) of the multi-level signal 15 with the multi-level code sequence 17 as the threshold value, and reproduces information data 18. Here, the modulated signal 14 of the predetermined modulation format transmitted and received via the transmission path 110 by the modulating part 112 and the demodulating part 211 is obtained by modulating an electromagnetic wave (electromagnetic field) or a light wave by the multi-level signal 13.

The multi-level processing part 111b may generate the multi-level signal 13 by any method as well as generates the multi-level signal 13 by the addition of the multi-level code sequence 12 and the information data 10a as described above.

For example, the multi-level processing part 111b may generate the multi-level signal 13 by amplitude-modulating the level of the multi-level code sequence 12 based on the information data 10 or may generate the multi-level signal 13 by successively reading the level of the multi-level signal 13 corresponding to the combination of the information data 10 and the multi-level code sequence 12 from a memory where the levels of the multi-level signal 13 are prestored.

While the level of the multi-level signal 13 is represented in eight steps in FIGS. 2 and 3, the level of the multi-level signal 13 is not limited to this representation. While the information amplitude is represented as three times or an integral multiple of the step width of the multi-level signal 13, the information amplitude is not limited to this representation. The information amplitude may be any integral multiple of the step width of the multi-level signal 13 or is not necessarily an integral multiple. Further, while in relation thereto, the levels (bias levels) of the multi-level code sequence 12 are disposed so as to be substantially at the center of the levels of the multi-level signal 13 in FIGS. 2 and 3, the disposition of the levels of the multi-level code sequence 12 are not limited thereto. The levels of the multi-level code sequence 12 are not necessarily substantially at the center of the levels of the multi-level signal 13 or may coincide with the levels of the multi-level signal 13. While it is premised that the change rates of the multi-level code sequence 12 and the information data 10 are equal to each other and in synchronization, the present invention is not limited thereto; the change rates may be such that one is higher (or lower) than the other or may be asynchronous to each other.

Next, wiretapping of the modulated signal 14 by a third party will be explained. It is considered that the third party decrypts the modulated signal by using a structure corresponding to the data receiving apparatus 10201 that the authorized user has or a higher-performance data receiving apparatus (wiretapper data receiving apparatus). The wiretapper data receiving apparatus reproduces the multi-level signal by demodulating the modulated signal 14. However, since the key information is not shared between the wiretapper data receiving apparatus and the data transmitting apparatus 10101, the wiretapper data receiving apparatus cannot generate the multi-level code sequence from the key information like the data receiving apparatus 10201. For this reason, the wiretapper data receiving apparatus cannot perform the binary determination of the multi-level signal with reference to the multi-level code sequence.

Wiretapping considered to be performed in such a case includes simultaneously discriminating all the levels of the multi-level signal (generally called "brute force attack"). That is, the wiretapper data receiving apparatus is provided with threshold values for all the inter signal point intervals that the multi-level signal can take, performs the simultaneous determination of the multi-level signal, and analyzes the result of the determination to thereby try to extract the correct key information or information data. For example, the wiretapper data receiving apparatus tries to extract the correct key information or information data by performing the multi-level determination on the multi-level signal by using, as the threshold values, the levels c0, c1, c2, c3, c4, c5 and c6 of the multi-level code sequence 12 shown in FIG. 2.

Figure 4:
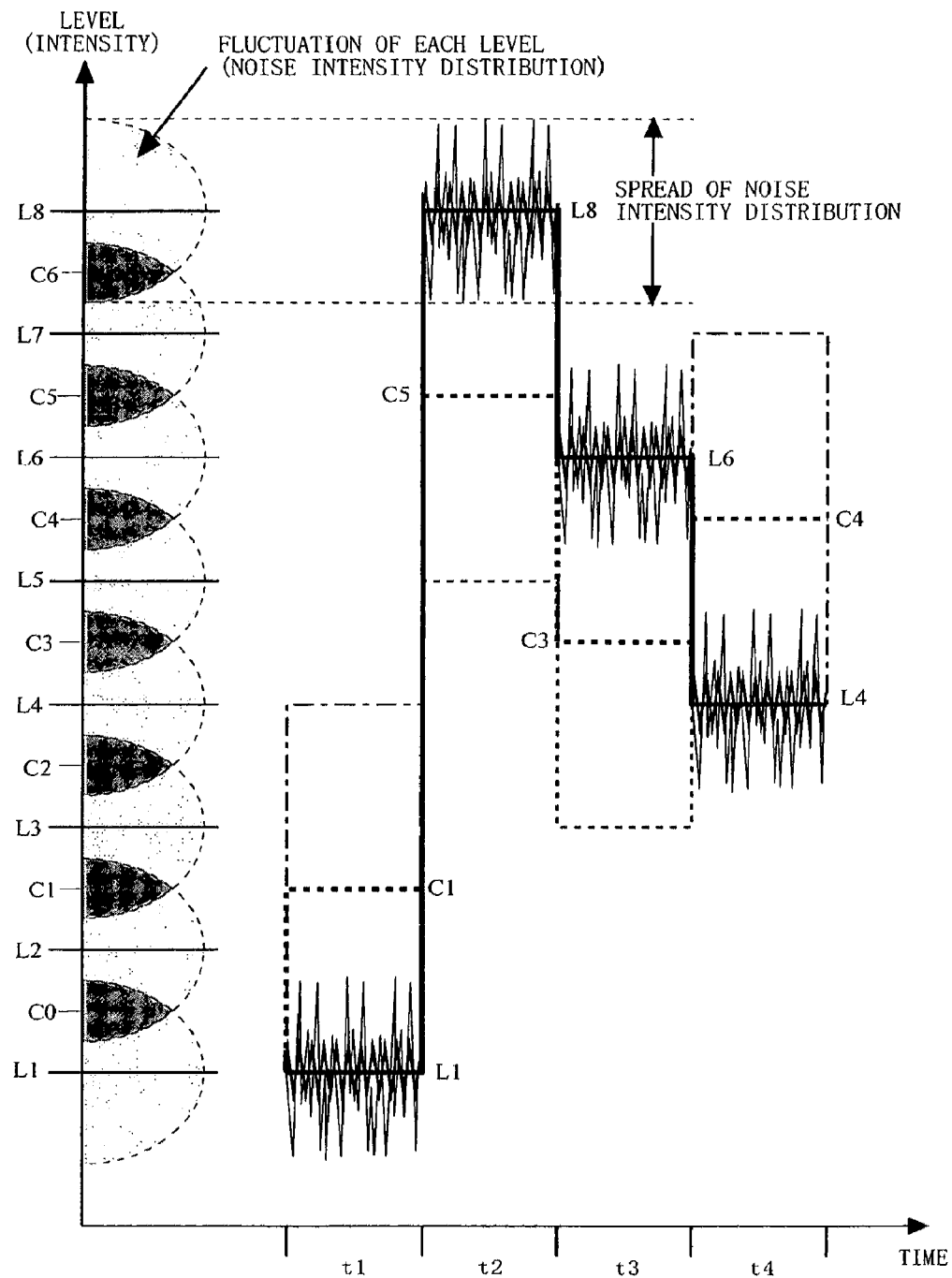
FIG. 4 is a schematic view explaining the transmission signal quality of the data communication apparatus according to the first embodiment of the present invention.

However, noise is caused by various factors in actual transmission systems, and by this noise being combined on the modulated signal, the level of the multi-level signal fluctuates with time and momentarily as shown in FIG. 4. In such a case, while the SN ratio (signal-to-noise intensity ratio) of the signal to be determined (multi-level signal) determined by the authorized receiver (data receiving apparatus 10201) depends on the ratio between the information amplitude and the noise amount of the multi-level signal, the SN ratio of the signal to be determined (multi-level signal) determined by the wiretapper data receiving apparatus depends on the ratio between the step width and the noise amount of the multi-level signal.

For this reason, under a condition where the noise level of the signal to be determined is the same, in the wiretapper receiving apparatus, the SN ratio of the signal to be determined is relatively low, so that the transmission characteristic (error rate) is deteriorated. That is, by using this characteristic, the data communication apparatus can make wiretapping difficult by inducing discrimination errors in the third party's brute force attack using all the threshold values. In particular, in the data communication apparatus, by setting the step width of the multi-level signal so as to be on the same order as or lower than the noise amplitude (the spread of the noise intensity distribution), the multi-level determination by third parties is made virtually impossible, so that ideal wiretapping prevention can be realized.

As the noise combined on the signal to be determined (the multi-level signal, or the modulated signal), when an electromagnetic wave such as a radio signal is used as the modulated signal, the thermal noise (Gaussian noise) that the spatial field, an electronic part or the like has may be used, and when a light wave is used, a photon number fluctuation (quantum noise) caused when photons are generated may be used in addition to the thermal noise. In particular, since signal processing such as recording and duplicating cannot be performed on the signals using the quantum noise, in the data communication apparatus, by setting the step width of the multi-level signal with reference to the noise amount, wiretapping by third parties is made impossible, so that the absolute safety of the data communication can be ensured.

As described above, according to the present embodiment, a safe data communication apparatus can be provided in which when the information data to be transmitted is encoded as a multi-level signal, by appropriately setting the inter signal point intervals of the multi-level signal with respect to the noise amount, a decisive deterioration is caused in the reception signal wiretapped by a third party to thereby make it difficult to decrypt and decode the reception signal.

(Second Embodiment)

Figure 5:
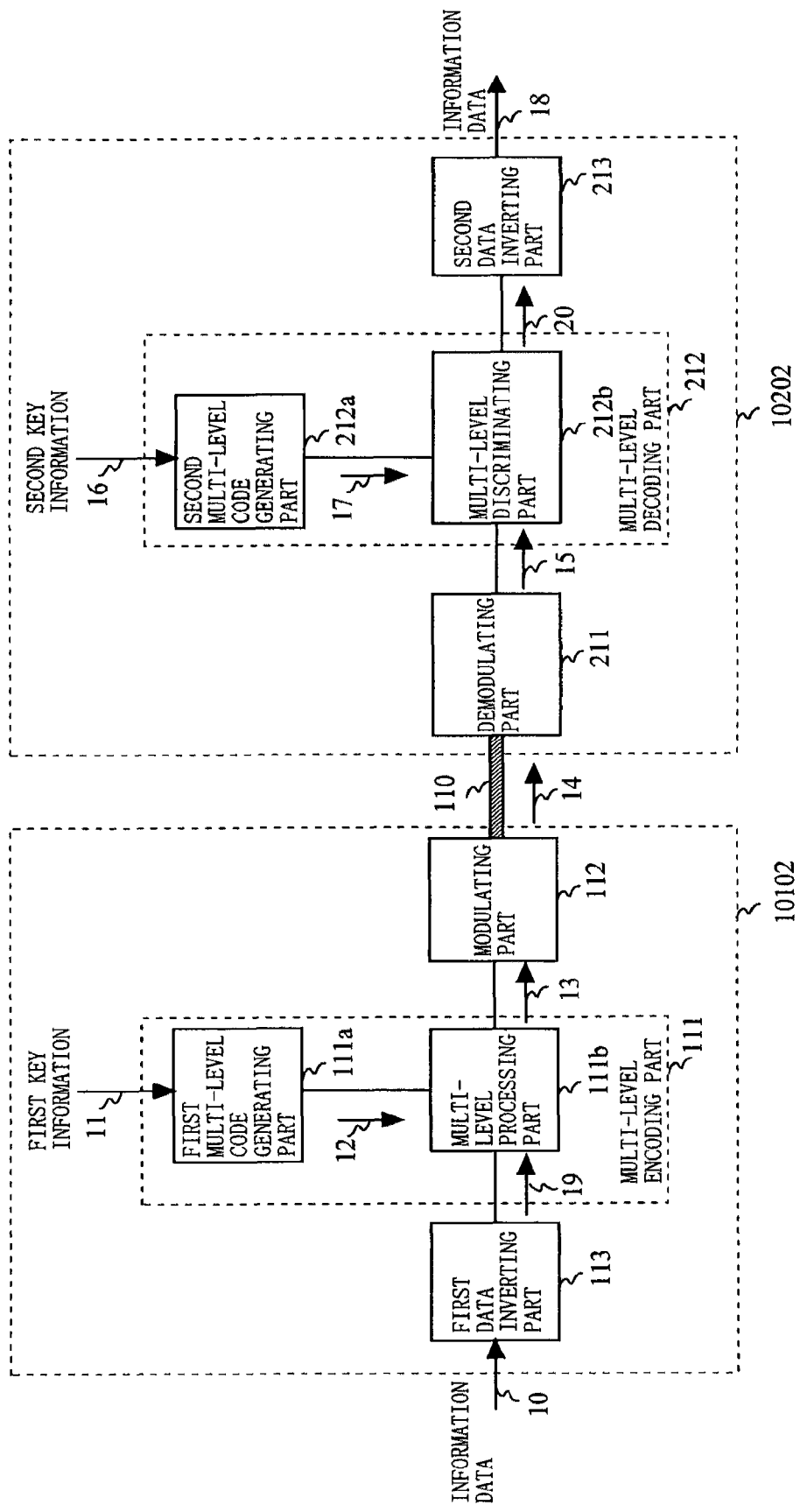
FIG. 5 is a block diagram showing the structure of a data communication apparatus according to a second embodiment of the present invention.

FIG. 5 is a block diagram showing the structure of a data communication apparatus according to a second embodiment of the present invention. In FIG. 5, in the data communication apparatus according to the second embodiment, compared with the data communication apparatus according to the first embodiment (FIG. 1), a data transmitting apparatus 10102 further has a first data inverting part 113, and a data receiving apparatus 10202 further has a second data inverting part 213. Hereinafter, the data communication apparatus according to the second embodiment will be explained. Since the structure of the present embodiment corresponds to that of the first embodiment (FIG. 1), the blocks performing the same operations are denoted by the same reference characters, and descriptions thereof are omitted.

The first data inverting part 113 does not fix the correspondence between the information of "0" and "1" that the information data has, and the Low level and the High level, and changes the correspondence substantially in a random fashion by a predetermined procedure. For example, like the multi-level encoding part 111, the first data inverting part 113 performs an exclusive OR operation with a random number series (pseudo-random number sequence) generated based on a predetermined initial value, and outputs the result of the operation to the multi-level encoding part 111. For the data outputted from the multi-level decoding part 212, the second data inverting part 213 changes the correspondence between "0" and "1", and "Low and High" in a procedure opposite to that of the first data inverting part 113. For example, the second data inverting part 213 shares the same initial value as the initial value that the first data inverting part 113 has, performs an exclusive OR operation with the bit-inverted random number series generated based on this, and reproduces the result as the information data.

As described above, according to the present invention, a safer data communication apparatus can be provided in which by inverting the information data to be transmitted substantially in a random fashion, the complexity of the multi-level signal as a cipher is increased to make the decryption and decoding by third parties more difficult.

(Third Embodiment)

FIG. 6 is a block diagram showing the structure of a data communication apparatus according to a third embodiment of the present invention. In FIG. 6, in the data communication apparatus according to the third embodiment, compared with the data communication apparatus according to the first embodiment (FIG. 1), a data communication apparatus 10103 further has a noise controlling part 114. The noise controlling part 114 includes a noise generating part 114a and a combining part 114b. Hereinafter, the data communication apparatus according to the third embodiment will be explained. Since the structure of the present embodiment corresponds to that of the first embodiment (FIG. 1), the blocks performing the same operations are denoted by the same reference characters, and descriptions thereof are omitted.

The noise generating part 114a generates a predetermined noise. The combining part 114b combines the multi-level signal 13 and the noise, and outputs the resultant signal to the modulating part 112. That is, the level fluctuation of the multi-level signal 13 described in FIG. 4 is deliberately caused, and the SN ratio of the multi-level signal 13 is controlled to an arbitrary value to thereby control the SN ratio of the signal to be determined inputted to the multi-level discriminating part 212b. As mentioned above, as the noise caused by the noise generating part 114a, the thermal noise, the quantum noise or the like is used. The multi-level signal where the noise is combined (superimposed) will be called a noise-combined multi-level signal.

As described above, according to the present embodiment, a safer data communication apparatus can be provided in which by encoding the information data to be transmitted as the multi-level signal and arbitrarily controlling the SN ratio thereof, a decisive deterioration is deliberately caused in the reception signal quality in wiretapping by third parties to thereby make the decryption and decoding of the reception signal more difficult.

(Fourth Embodiment)

Figure 7:
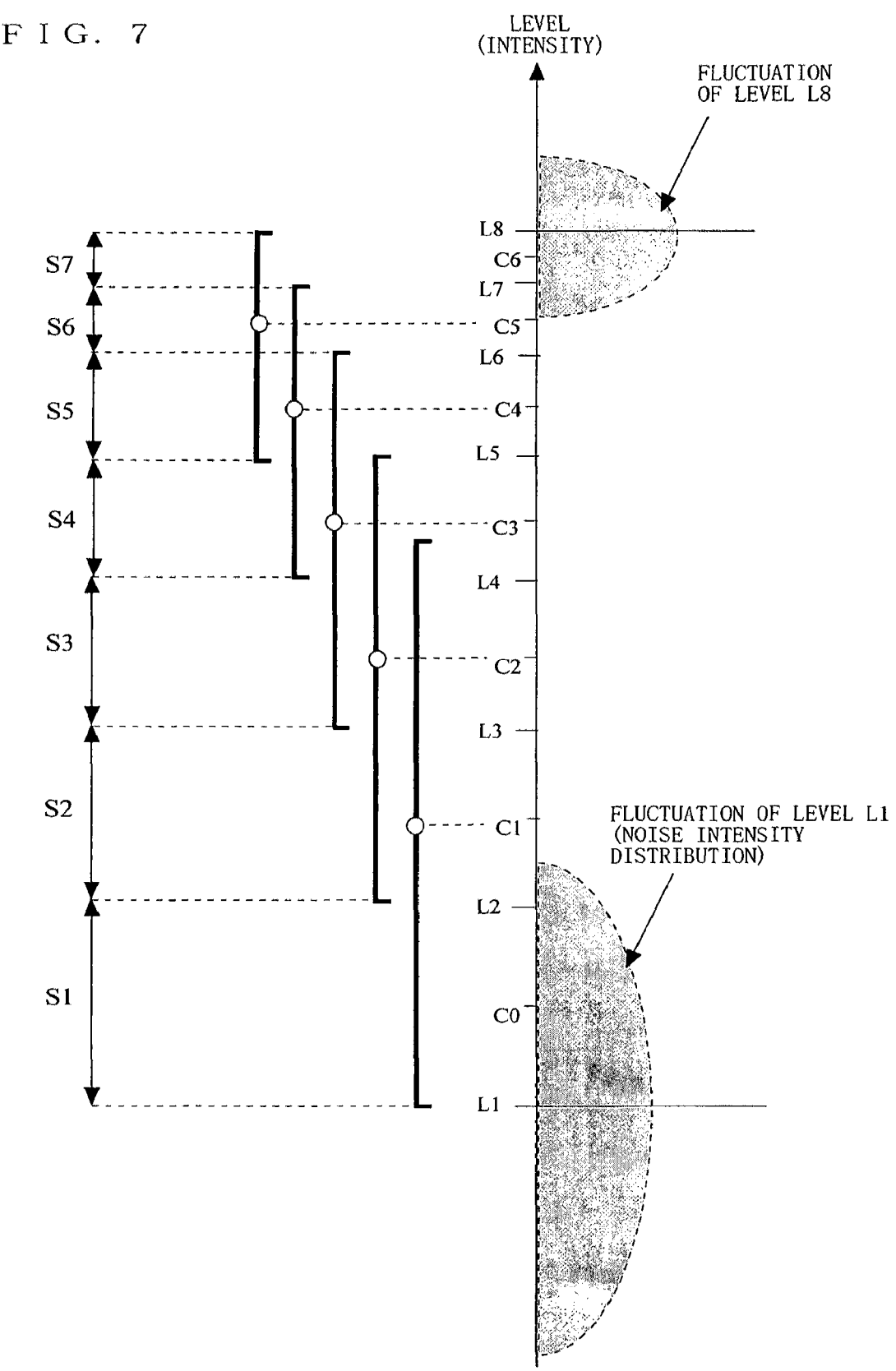
FIG. 7 is a schematic view explaining transmission signal parameters of a data communication apparatus according to a fourth embodiment of the present invention.

FIG. 7 is a schematic view explaining transmission signal parameters of a data communication apparatus according to a fourth embodiment of the present invention. The data communication apparatus according to the fourth embodiment has a structure corresponding to the structure of the first embodiment (FIG. 1) or the third embodiment (FIG. 6). Hereinafter, the data communication apparatus according to the fourth embodiment of the present invention will be explained by using FIG. 7.

Referring to FIG. 1 or FIG. 6, the multi-level encoding part 111 sets the step widths (S1 to S7) of the multi-level signal 13 in accordance with the fluctuation amount of each level (that is, the distribution of the intensity of the noise combined on each level) as shown in FIG. 7. Specifically, the multi-level encoding part 111 distributes the intervals between the two adjoining signal points of the signal to be determined inputted to the multi-level discriminating part 212b so that the SN ratios depending on the inter signal point intervals substantially coincide. When the noise amounts combined on the levels are the same, the step widths are set to be the same.

When an optical intensity modulated signal with a semiconductor laser (LD) as the light source is assumed as the modulated signal outputted from the modulating part 112, the fluctuation width (noise amount) varies depending on the level of the multi-level signal inputted to the LD. This is attributed to the fact that the semiconductor laser emits light based on the principle of stimulated emission with spontaneously emitted light as the "seed light," and the noise amount thereof is defined by the relative ratio of the spontaneously emitted light amount to the stimulatingly emitted light amount. Since the higher the pumping rate (corresponding to the bias current injected into the LD) is, the higher the ratio of the stimulatingly emitted light amount is, the noise amount thereof is small, and conversely, the lower the pumping rate is, the higher the ratio of the spontaneously emitted light amount is and the larger the noise amount is. Therefore, by nonlinearly setting the step widths so as to be large in areas where the level of the multi-level signal is low and to be small in areas where the level is high as shown in FIG. 7, the SN ratios of the intervals between the adjoining signal points of the signal to be determined are made to coincide.

Even when an optically modulated signal is used as the modulated signal, under a condition where the noise due to the spontaneously emitted light and the thermal noise used for the optical receiver are sufficiently low, the SN ratio of the reception signal is determined mainly by shot noise. Under this condition, since the higher the level of the multi-level signal is, the larger the noise amount is, by setting the step width so as to be small in areas where the level of the multi-level signal is low and to be large in areas where the level is high conversely to the case of FIG. 7, the SN ratios of the intervals between the adjoining signal points of the signal to be determined are made to coincide.

As described above, according to the present embodiment, a safer data communication apparatus can be provided in which by encoding the information data to be transmitted as the multi-level signal and substantially uniformly disposing the signal points within the multi-level signal amplitude or substantially uniformly setting the SN ratios of the intervals between the adjoining signal points irrespective of the momentary level, the reception signal quality in wiretapping by third parties is always deteriorated to make the decryption and decoding of the reception signal more difficult.

(Fifth Embodiment)

In the first embodiment, a data communication apparatus is explained in which the multi-level signal is generated by combining the information data to be transmitted and the multi-level code sequence generated from the information key. In the fifth embodiment shown below, a case will be explained where a multi-level signal the binary determination by wiretapping by third parties of which is significantly difficult is generated.

Figure 8:
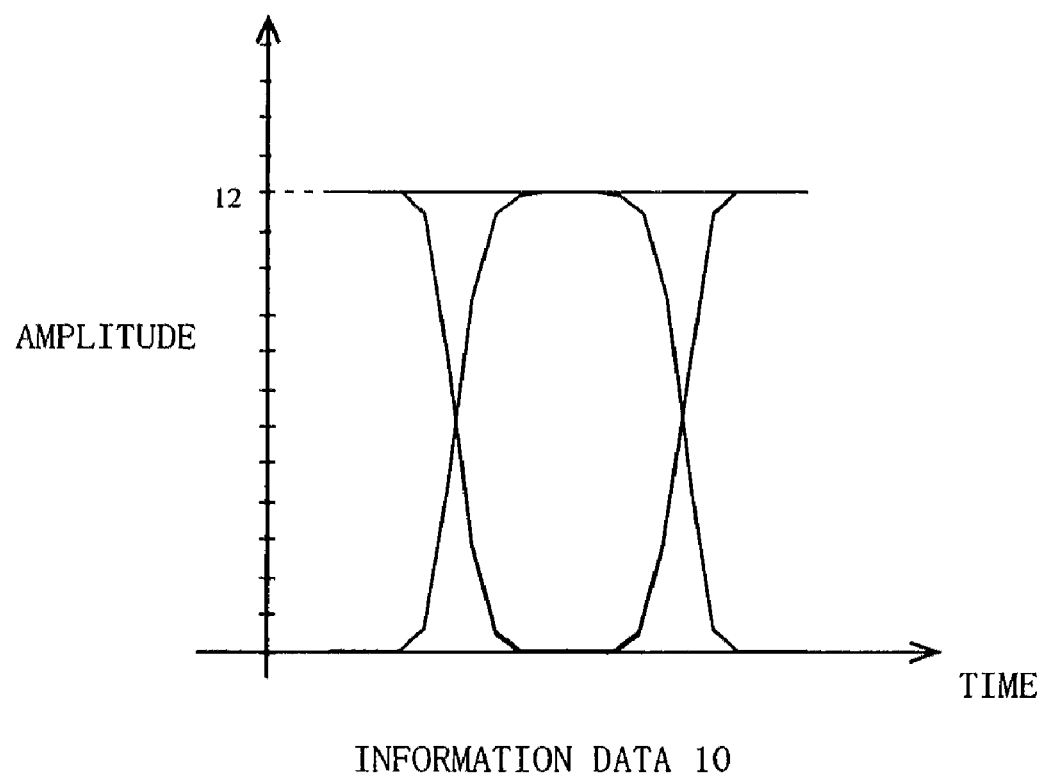
FIG. 8 is a view showing an example of the eye pattern of information data 10.
Figure 9:
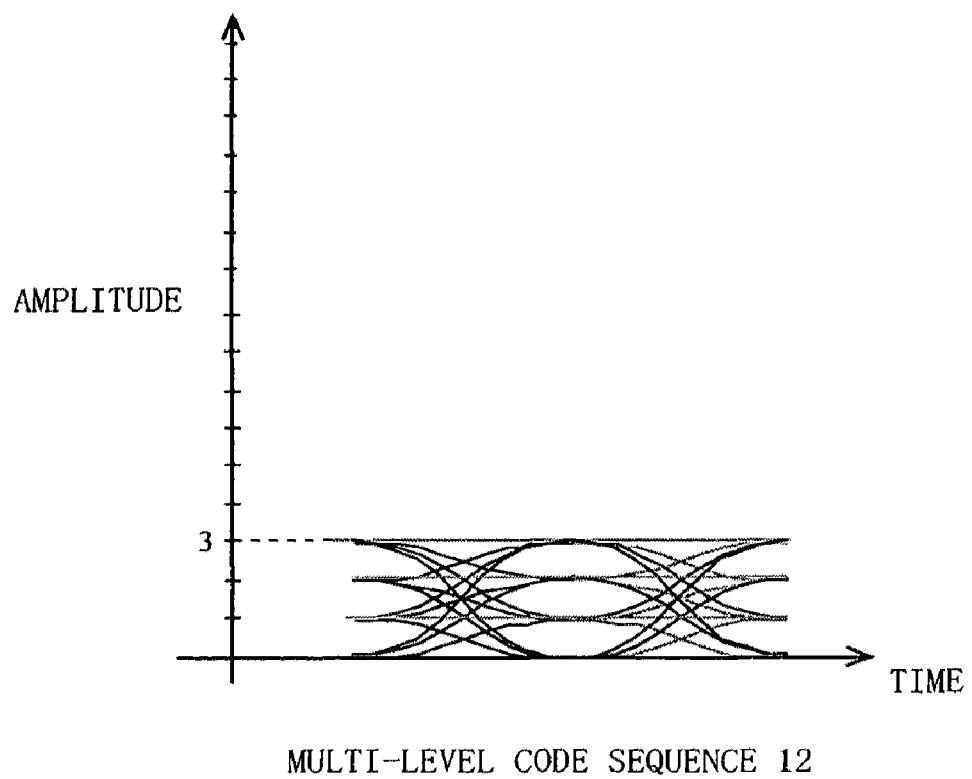
FIG. 9 is a view showing an example of the eye pattern of a multi-level code sequence 12.

First, a problem that arises with the first embodiment will be described by using FIGS. 1 and 8 to 12. In the explanation that follows, the "inter signal point interval" refers to the difference between an arbitrary signal level that the multi-level signal or the multi-level code sequence can take and the adjoining signal level. FIG. 8 is a view showing an example of the eye pattern of the information data 10 the information amplitude of which is "12." FIG. 9 is a view showing an example of the eye pattern of the multi-level code sequence 12 outputted form the first multi-level code generating part 111a. In the multi-level code sequence 12 shown in FIG. 9, the inter signal point intervals are substantially uniformly disposed. Moreover, the multi-level code sequence 12 shown in FIG. 9 is normalized by the inter signal point intervals, and the number of levels is "4" and the largest amplitude is "3."

Figure 10:
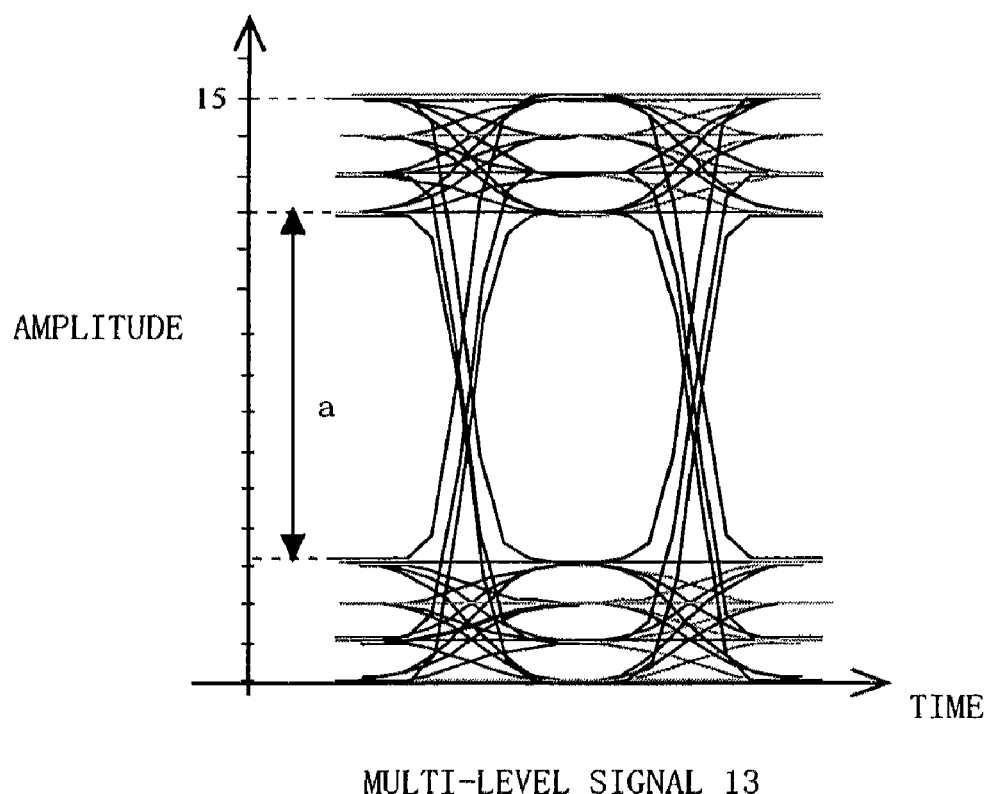
FIG. 10 is a view showing an example of the eye pattern of a multi-level signal 13.

The multi-level processing part 111b combines the information data 10 shown in FIG. 8 and the multi-level code sequence 12 shown in FIG. 9 by addition, and outputs the multi-level signal 13 having the eye pattern shown in FIG. 10. In the multi-level signal 13 shown in FIG. 10, the multi-level signal amplitude is "15," the information amplitude is "12," and the number of levels is "8." In the multi-level signal 13 shown in FIG. 10, an inter signal point interval "a" is larger than the other inter signal point intervals. That is, a condition occurs where the inter signal point intervals of the multi-level signal 13 are not uniform.

Figure 11:
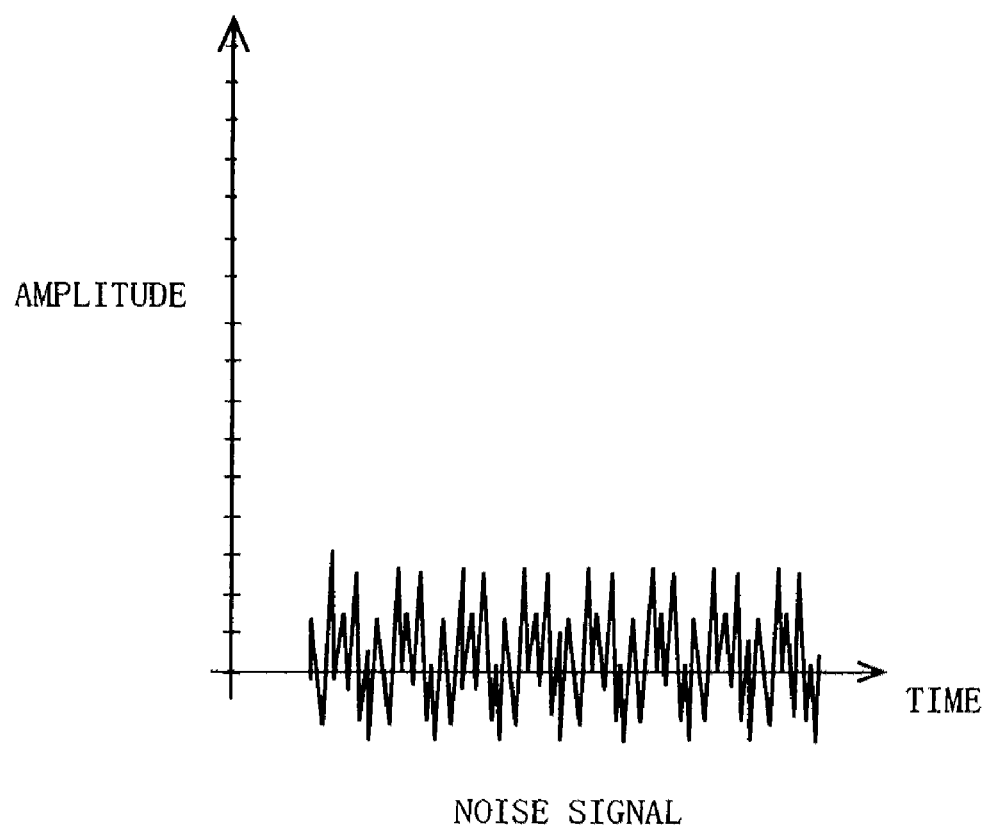
FIG. 11 is a view showing an example of a noise signal.
Figure 12:
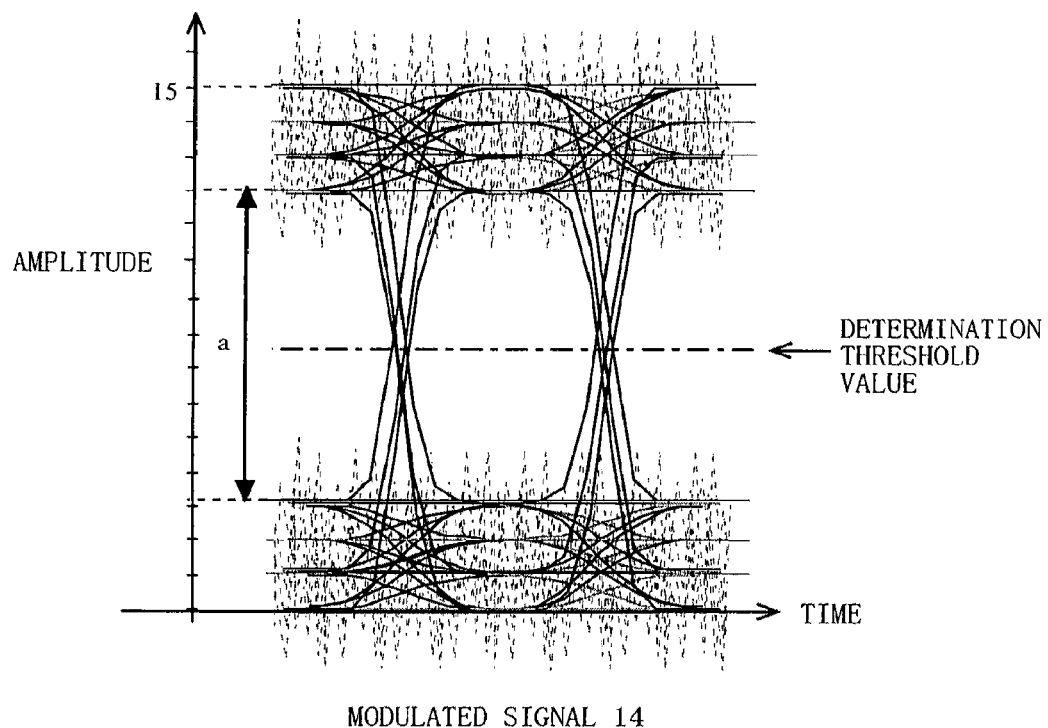
FIG. 12 is a view showing an example of the eye pattern of a modulated signal 14 when noise is combined.

The multi-level signal 13 shown in FIG. 10 is modulated into the modulated signal 14 by the modulating part 112, and transmitted to a receiving part 11102. A noise signal such as thermal noise or quantum noise, for example, as shown in FIG. 11 is combined on the modulated signal 14. FIG. 12 is a view showing the eye pattern of the modulated signal 14 when the noise signal shown in FIG. 11 is combined on the modulated signal 14.

Wiretapping of the modulated signal 14 by a third party will be explained. The third party intercepts the modulated signal 14 shown in FIG. 12, and demodulates the modulated signal 14 into a multi-level signal. The third party tries the binary determination on the modulated signal 14 shown in FIG. 12. In the modulated signal 14 shown in FIG. 12, the inter signal point interval "a" is larger than the amplitude of the noise signal combined on the modulated signal 14. Therefore, the third party can obtain an SN ratio sufficient for the binary determination of the multi-level signal. Consequently, the third party can easily decode the information data 10 from the modulated signal 14 without performing a brute force attack.

As described above, in the first embodiment, when the inter signal point intervals of the multi-level signal are not substantially uniform, wiretapping of the information data is easily performed by third parties. The fifth embodiment solves this problem.

Figure 13:
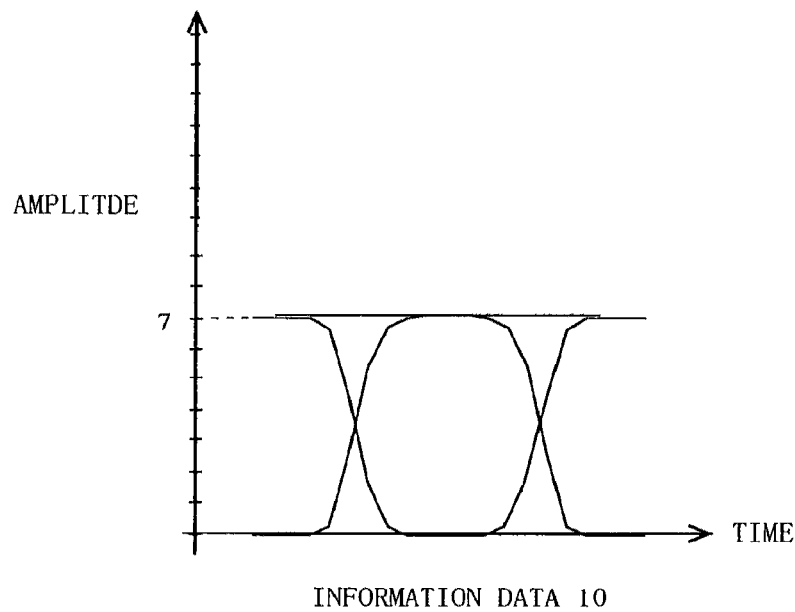
FIG. 13 is a view showing an example of the eye pattern of the information data 10.
Figure 14:
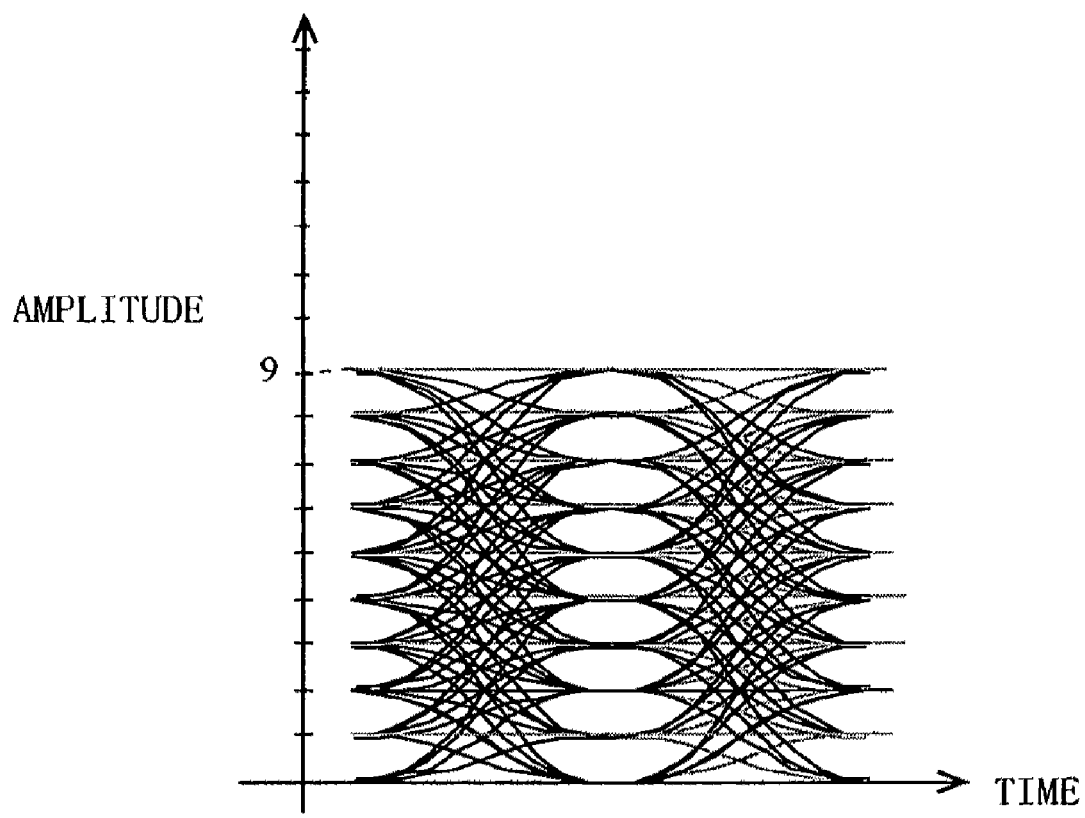
FIG. 14 is a view showing an example of the eye pattern of the multi-level code sequence 12.

The data communication apparatus according to the fifth embodiment of the present invention has a similar structure to the data communication apparatus according to the first embodiment (FIG. 1). Hereinafter, the data communication apparatus according to the fifth embodiment of the present invention will be explained by using FIGS. 1 and 13 to 19. FIG. 13 is a view showing an example of the eye pattern of the information data 10 the information amplitude of which is "7." The first multi-level code generating part 111a performs a conversion from the first key information 11 to the multi-level code sequence 12. The first multi-level code generating part 111a is constituted by using a random number generator such as a linear feedback register (LFSR). FIG. 14 is a view showing an example of the eye pattern of the multi-level code sequence 12 outputted from the first multi-level code generating part 111a. In the multi-level code sequence 12 shown in FIG. 14, the inter signal point intervals are substantially uniformly disposed. Moreover, the multi-level code sequence 12 shown in FIG. 14 is normalized by the inter signal point intervals, and the number of levels is "10" and the largest amplitude is "9." At this time, it is important that the maximum amplitude of the multi-level code sequence 12 shown in FIG. 14 be larger than the information amplitude of the information data 10 shown in FIG. 13.

Figure 15:
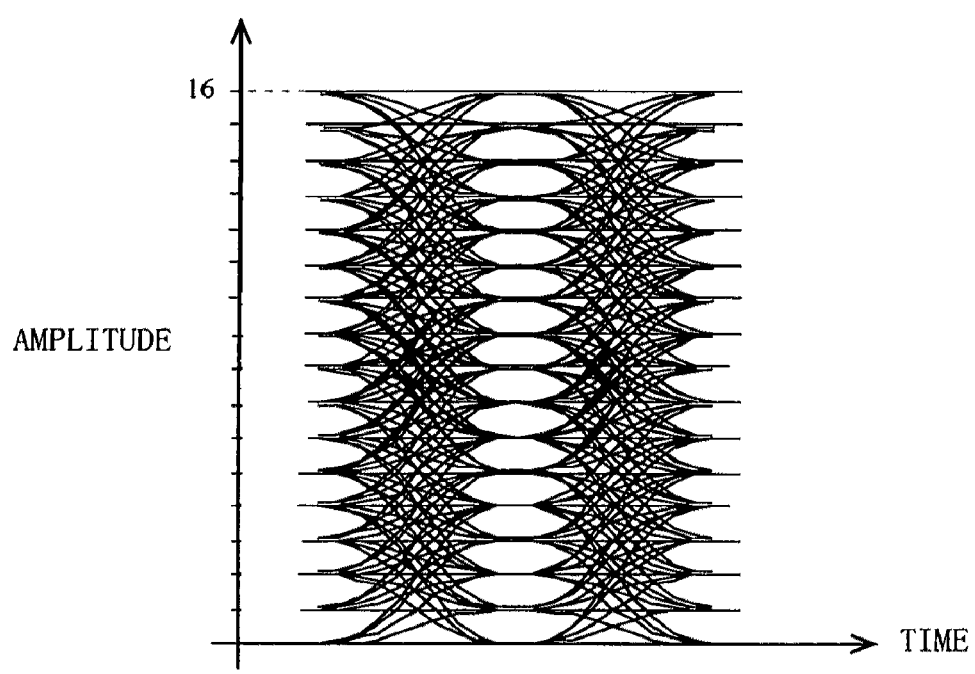
FIG. 15 is a view showing an example of the eye pattern of the multi-level signal 13.

The information data 10 shown in FIG. 13 and the multi-level code sequence 12 shown in FIG. 14 are inputted to the multi-level processing part 111*b*. The multi-level processing part 111*b* adds the amplitudes of the information data 10 and the multi-level code sequence 12, and outputs the multi-level signal 13. FIG. 15 shows the eye pattern of the multi-level signal 13 outputted from the multi-level processing part 111*b*. The multi-level signal amplitude of the multi-level signal 13 shown in FIG. 15 is "16." The multi-level signal amplitude of the multi-level signal 13 corresponds to the sum of the maximum amplitude of the information data 10 shown in FIG. 13 and the maximum amplitude of the multi-level code sequence 12 shown in FIG. 14. At this time, since the multi-level signal amplitude is "16," the amplitude of the multi-level signal 13 shown in FIG. 15 is equal to or larger than twice the information amplitude of the information data 10 shown in FIG. 13. As shown in FIG. 15, all the inter signal point intervals of the multi-level signal 13 are "1." Consequently, the multi-level signal b 13 shown in FIG. 15 is substantially uniform unlike the multi-level signal 13 shown in FIG. 13. The inter signal point intervals of the multi-level signal 13 shown in FIG. 15 are all smaller than the information amplitude "7" of the multi-level signal.

Figure 16:
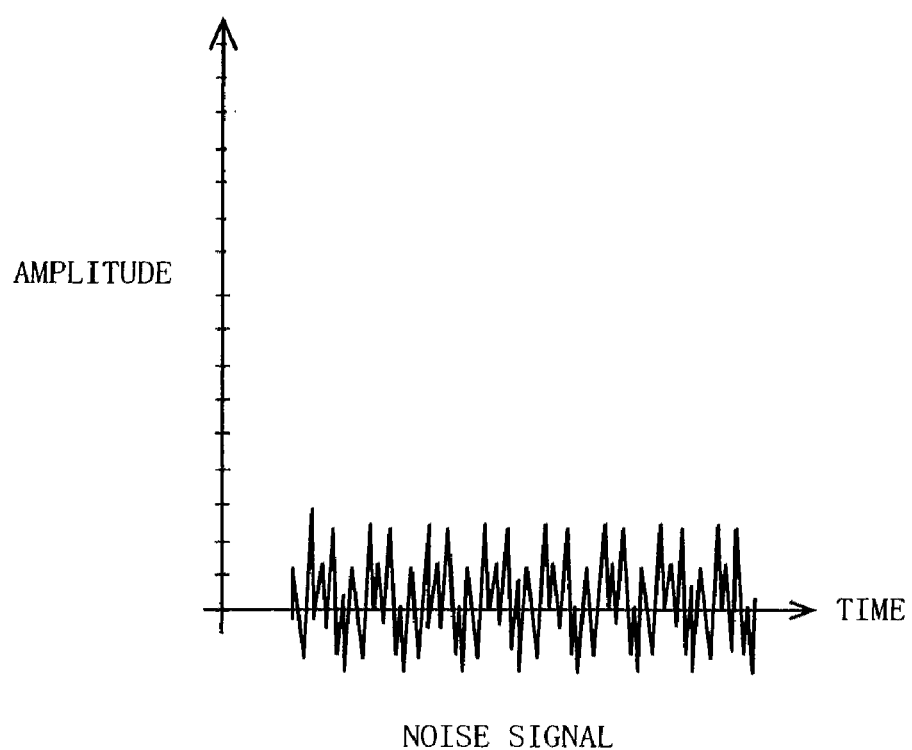
FIG. 16 is a view showing an example of the noise signal.
Figure 17:
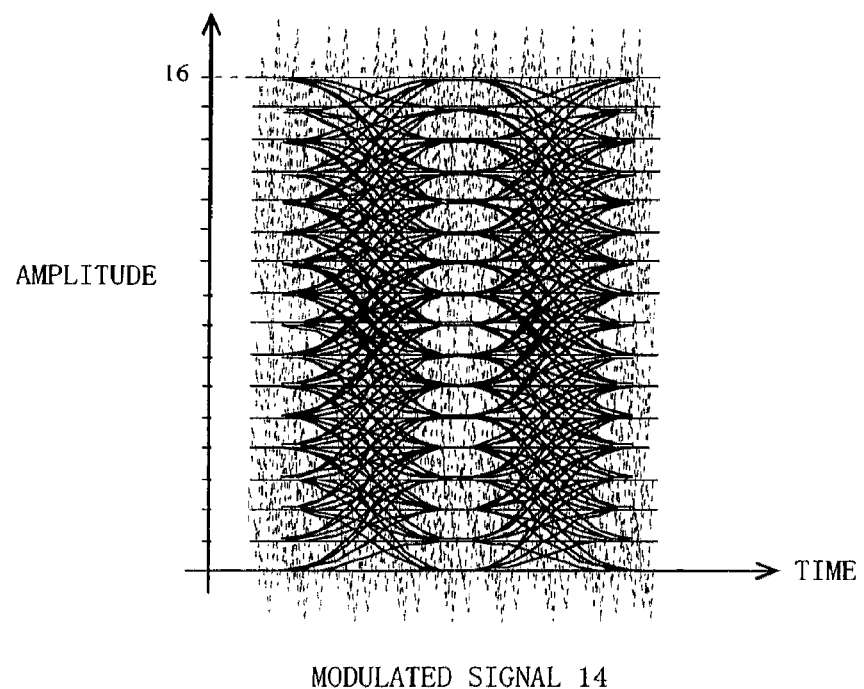
FIG. 17 is a view showing an example of the eye pattern of the modulated signal 14 on which the noise signal is combined.

The multi-level signal 13 is modulated by the modulating part 112, and transferred to the receiving part 11102 via the transmission path 110. At this time, for example, the noise signal shown in FIG. 16 is combined on the modulated signal 14. FIG. 17 is a view showing an example of the eye pattern of the modulated signal 14 on which the noise signal is combined. Since the amplitude of the noise signal is larger than the inter signal point intervals of the modulated signal 14 as shown in FIG. 17, the modulated signal 14 is in a condition where a signal of an arbitrary level and the signal of the adjoining level cannot be distinguished from each other.

Figure 18:
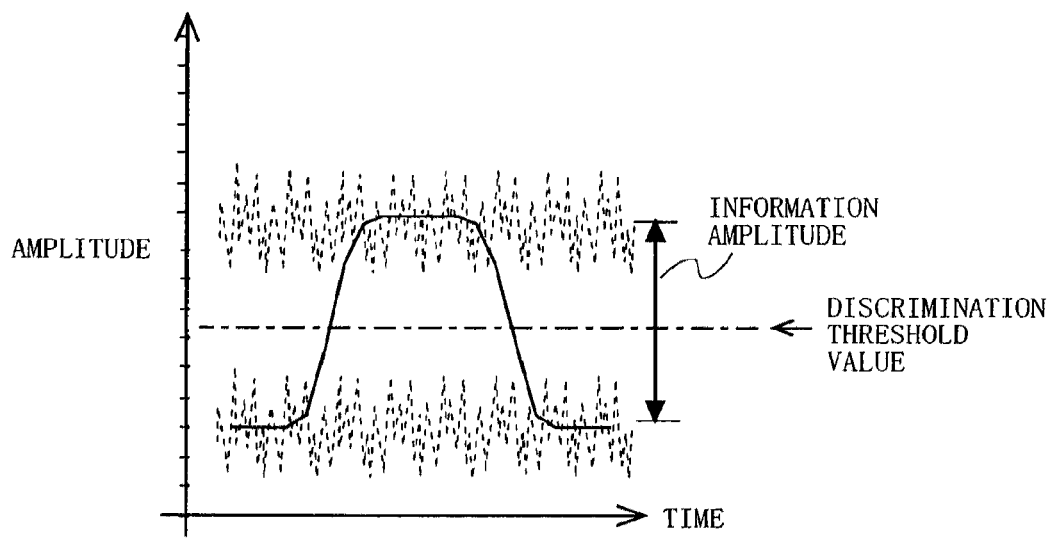
FIG. 18 is a view showing the relation between a multi-level signal 15 and the determination threshold value of the multi-level signal 15.

The receiving part 11102 receives the modulated signal 14 via the transmission path 110. The demodulating part 211 demodulates the modulated signal 14 to generate the multi-level signal 15, and inputs it to the multi-level discriminating part 212*b*. The second multi-level code generating part 212*a* generates the multi-level code sequence 17 by using the second key information 16, and inputs it to the multi-level discriminating part 212*b*. The multi-level code sequence 17 serves as the discrimination threshold value for the binary determination of the multi-level signal 15. The multi-level discriminating part 212*b* performs the binary determination of the multi-level signal 15 by using the multi-level code sequence 17. Consequently, the multi-level signal 15 is decoded into the information data 18 of a binary signal as shown in FIG. 13. FIG. 18 is a view showing the relation between the information amplitude of the multi-level signal 15 inputted to the multi-level discriminating part 212*b* and the discrimination threshold value for the decoding by the multi-level discriminating part 212*b*. The SN ratio of the modulated signal 14 to the information amplitude is deteriorated by the noise signal shown in FIG. 18. However, the amplitude of the noise signal does not exceed the discrimination threshold value of the information amplitude of the modulated signal. For this reason, in the receiving part 11102, the multi-level discriminating part 212*b* can perform the discrimination and reproduction of the information data.

Next, a case will be considered where as wiretapping, a third party intercepts the modulated signal 14 shown in FIG. 17, correctly reproduces the modulated signal 14 into the multi-level signal 15, and decodes the multi-level signal 15 into the information data 18. The third party cannot find the discrimination threshold value for performing the binary determination from the modulated signal 14 shown in FIG. 17 like the modulated signal 14 shown in FIG. 12. For this reason, the third party tries to decode the multi-level signal 15 by extracting the key information within a limited time by performing a round-robin computation using all the combinations of multi-level code sequence or a special analysis.

Figure 19:
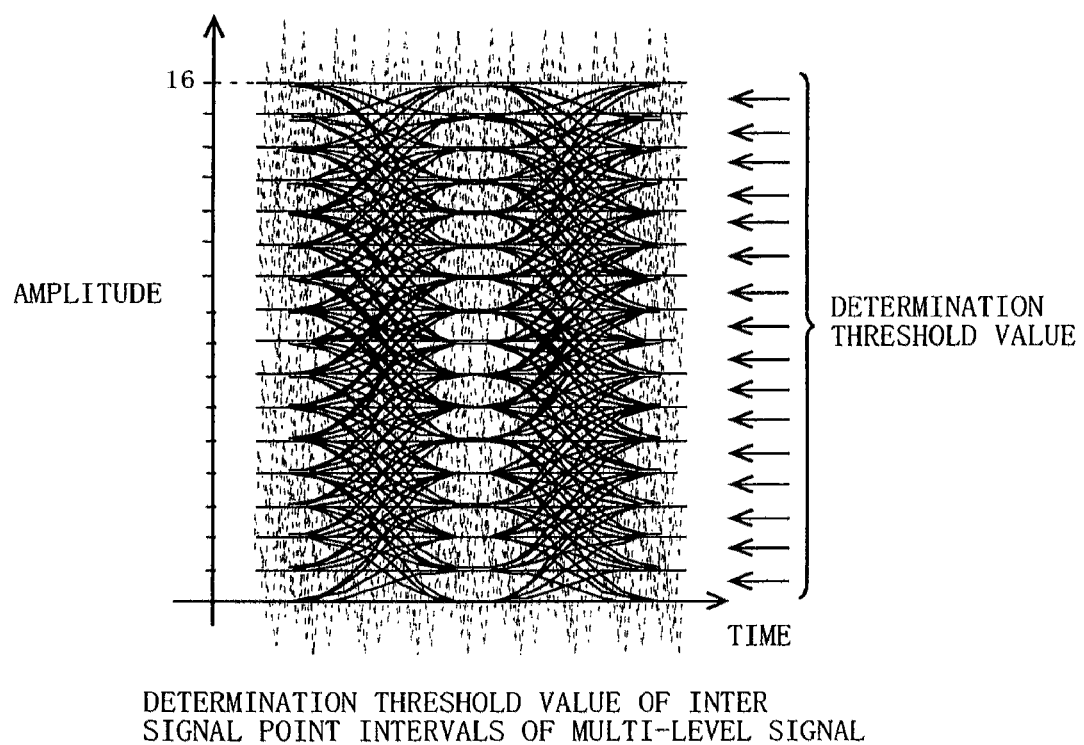
FIG. 19 is a view showing an example of the eye pattern of the multi-level signal 15.

A threshold value for discriminating the signal levels of the modulated signal 14 is used as the determination threshold value. FIG. 19 is a view showing the relation between the modulated signal 14 and the determination threshold value of the modulated signal 14. Since the first key information 11 is not shared between the third party and a transmitting part 11101, the third party cannot generate the multi-level code sequence 12 based on the first key information 11. Therefore, it is necessary for the third party to perform the signal level discrimination of the multi-level signal by using all the determination threshold values shown in FIG. 19. However, the inter signal point intervals of the multi-level signal are smaller than the information amplitude of the information data. For this reason, it is difficult for the third party to determine the determination threshold value. Further, since the discrimination between the signals of the adjoining signal levels cannot be made because of the noise signal combined on the modulated signal 14 as shown in FIG. 19, the third party cannot accurately perform the determination of the inter signal point intervals of the multi-level signal. Consequently, the third party cannot avoid a determination error of the level of the multi-level signal when determining the signal level of the multi-level signal. Further, since the third party tries the binary determination on the multi-level signal obtained by the erroneous determination, the third party cannot decode it into the correct information data.

As described above, in the invention according to the present invention, a multi-level signal is generated that is twice the information amplitude of the inputted information data and in which all the inter signal point intervals of the multi-level signal are substantially uniform. This multi-level signal makes it difficult for third parties to decode the information signal by the binary determination of the multi-level signal and accurately demodulate or determine the modulated signal. Consequently, the invention according to the present embodiment is capable of providing a transmitting apparatus that enables the realization of information transmission with high stealthiness.

While in the present embodiment, the multi-level signal 13 is generated by the addition of the information data 10 and the multi-level code sequence 12 by the multi-level processing part 111*b*, the multi-level signal 13 may be generated by a different method. For example, a table on the memory may be referred to.

(Sixth Embodiment)

Figure 20A:
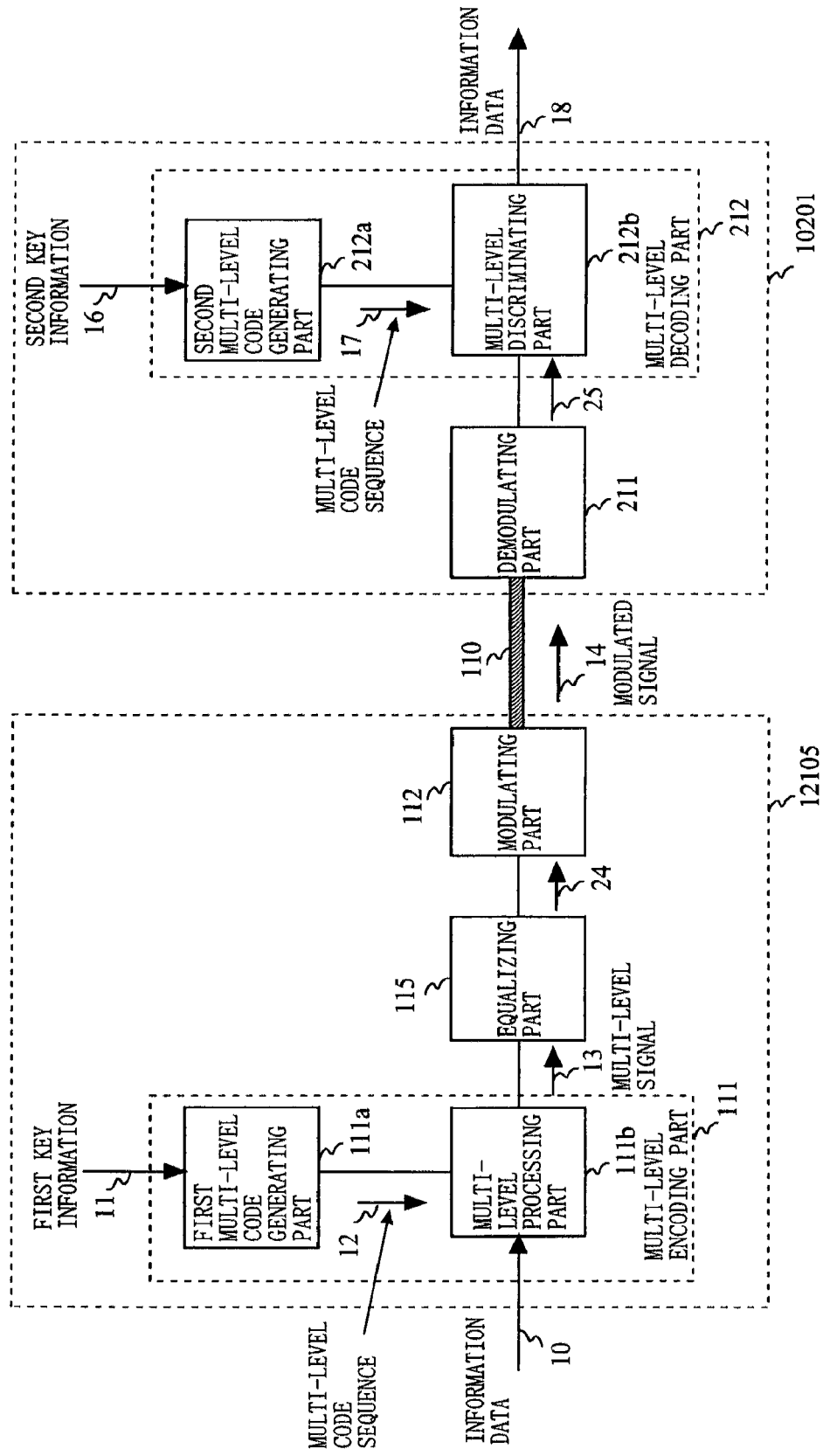
FIG. 20A is a block diagram showing an example of the structure of a data communication apparatus according to a sixth embodiment of the present invention.

FIG. 20A is a block diagram showing the structure of a data communication apparatus according to a sixth embodiment of the present invention. In FIG. 20A, the data communication apparatus according to the sixth embodiment is constituted by connecting a data transmitting apparatus 12105 and the data receiving apparatus 10201 via the transmission path 110. The data transmitting apparatus 12105 has the multi-level encoding part 111, the modulating part 112 and an equalizing part 115. The multi-level encoding part 111 includes the first multi-level code generating part 111*a* and the multi-level processing part 111*b*. The data receiving apparatus 10201 has the demodulating part 211 and the multi-level decoding part 212. The multi-level decoding part 212 includes the second multi-level code generating part 212*a* and the multi-level discriminating part 212*b*. That is, the data transmitting apparatus 12105 according to the twelfth embodiment is different from the data transmitting apparatus 10101 according to the first embodiment (FIG. 1) in that the equalizing part 115 is further provided.

Hereinafter, the data communication apparatus according to the sixth embodiment will be explained with respect mainly to the equalizing part 115. Since the structure of the present embodiment corresponds to that of the first embodiment (FIG. 1), the blocks performing the same operations are denoted by the same reference characters, and descriptions thereof are omitted.

Figure 21:
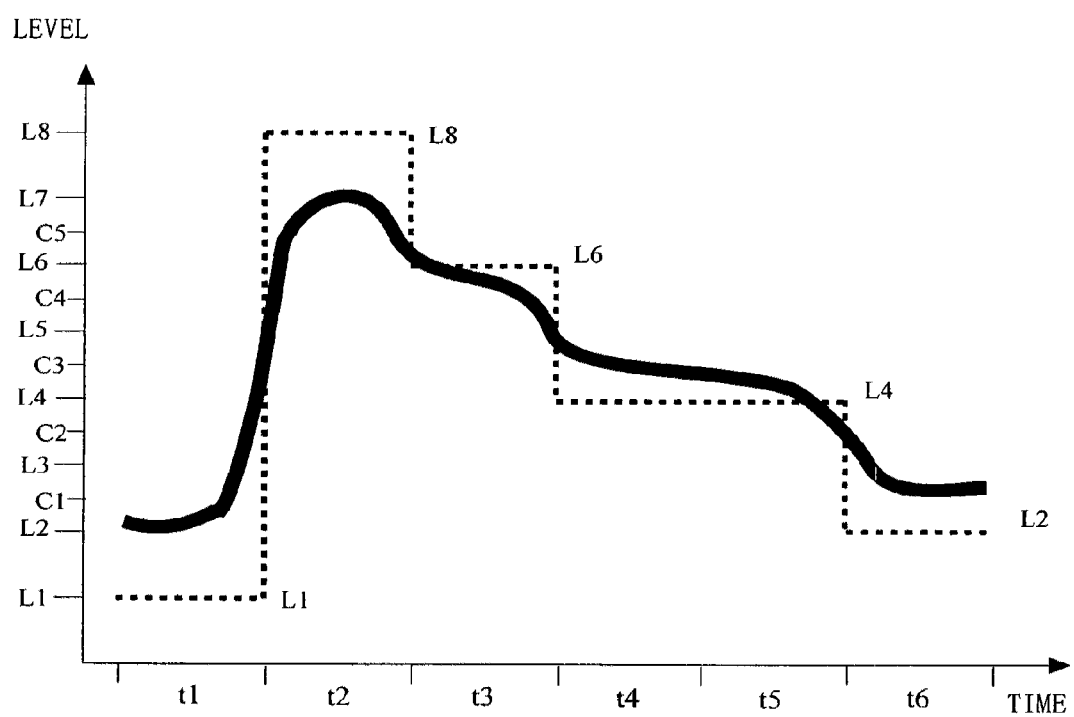
FIG. 21 is a view showing an example of the waveform of an equalized multi-level signal 24 outputted by an equalizing part 115.

In the data transmitting apparatus 12105, the multi-level signal 13 (see FIG. 2(*c*)) is inputted to the equalizing part 115. The equalizing part 115 waveform-equalizes the inputted multi-level signal 13 by using predetermined means, and outputs an equalized multi-level signal 24. FIG. 21 is a view showing an example of the waveform of the equalized multi-level signal 24 outputted by the equalizing part 115. In FIG. 21, the dotted line represents the waveform of the multi-level signal 13 inputted to the equalizing part 115. As the equalizing part 115, a filter such as a low-pass filter is used. When a low-pass filter is used as the equalizing part 115 and the high-frequency region of the multi-level signal 13 is bandwidth-shaped, an intersymbol interference occurs because the response time related to the transition between the multiple levels of the multi-level signal 13 is limited. In such a case, the equalized multi-level signal 24 cannot transit to the multiple levels (L1, L8, L6, L4, L4, and L2) of the multi-level signal 13 at the predetermined time slots (t1, t2, t3, t4, t5, and t6) as shown in FIG. 21, and is outputted from the equalizing part 115 as a signal where a level fluctuation occurs. The equalized multi-level signal 24 is inputted to the modulating part 112.

The modulating part 112 converts the equalized multi-level signal 24 into a signal format suitable for the transmission path 110, and transmits the modulated signal 14 to the transmission path 110. For example, when the transmission path 110 is an optical transmission line, the modulating part 112 converts the equalized multi-level signal 24 into an optical signal.

Figure 22:
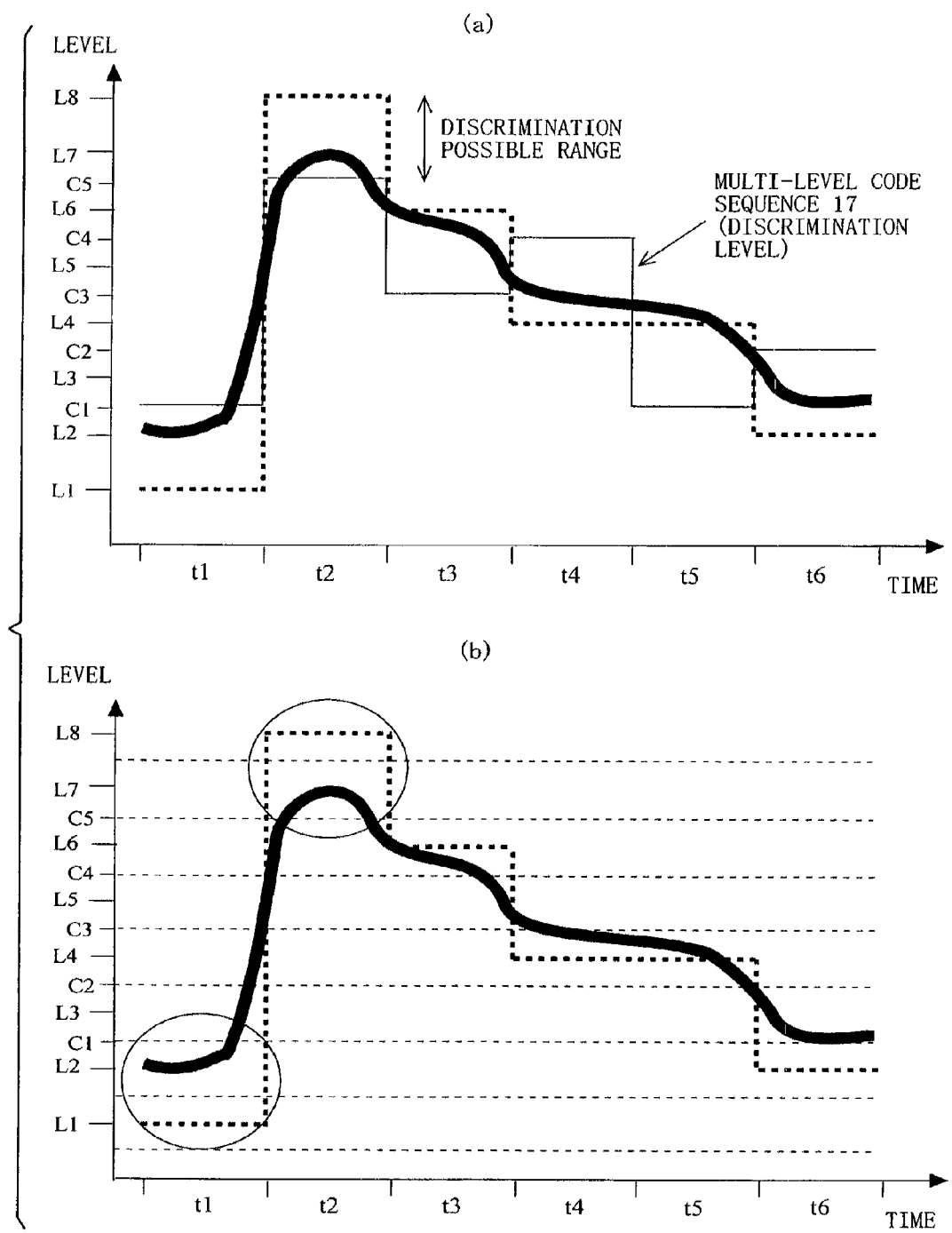
FIG. 22 is a view explaining the discrimination of an equalized multi-level signal 25.

In the data receiving apparatus 10201, the demodulating part 211 receives the modulated signal 14 via the transmission path 110. The demodulating part 211 demodulates the modulated signal 14, and outputs an equalized multi-level signal 25. The equalized multi-level signal 25 is inputted to the multi-level discriminating part 212*b*. The multi-level discriminating part 212*b* performs the discrimination of the equalized multi-level signal 25 by using the multi-level code sequence 17. FIG. 22(*a*) is a view explaining the discrimination of the equalized multi-level signal 25 in the multi-level discriminating part 212*b*. In FIG. 22(*a*), the thick solid line represents an example of the waveform of the equalized multi-level signal 25, the thin solid line represents an example of the waveform of the multi-level code sequence 17, and the dotted line represents an example of the waveform of the multi-level signal 13.

Referring to FIG. 22(*a*), the multi-level discriminating part 212*b* performs the discrimination (binary determination) of the equalized multi-level signal 24 with the multi-level code sequence 17 as the threshold value, and reproduces the information data 18. That is, the multi-level discriminating part 212*b* can discriminate the multi-level signal 13, within a range where the deterioration (the amount of level fluctuation) of the equalized multi-level signal 25 does not exceed the discrimination level, with the multi-level code sequence 17 as the discrimination level also when the multi-level signal 13 where a level fluctuation occurs due to the intersymbol interference involved in the bandwidth shaping (that is, the equalized multi-level signal 25) is received.

Next, wiretapping of the modulated signal 14 by a third party will be explained. It is considered that like the case explained in the first embodiment, the third party receives and decrypts the modulated signal 14 by using a structure corresponding to the data receiving apparatus 10201 that the authorized user has or a higher-performance data receiving apparatus (wiretapper data receiving apparatus). However, since the first key information 11 is not shared between the wiretapper data receiving apparatus and the data transmitting apparatus 10101, the wiretapper data receiving apparatus cannot perform the discrimination (binary determination) of the equalized multi-level signal 25 with reference to the multi-level code sequence 17 generated from the key information like the data receiving apparatus 10201.

In such a case, it is considered that the wiretapper data receiving apparatus tries to reproduce the correct key information or the information data 18 by discriminating the equalized multi-level signal 25 by using a brute force attack. FIG. 22(*b*) is a view explaining the discrimination of the equalized multi-level signal 25 by the wiretapper data receiving apparatus. In FIG. 22(*b*), the thick solid line represents an example of the waveform of the equalized multi-level signal 25, the thick dotted line represents an example of the waveform of the multi-level signal 13, and the thin dotted lines represent a plurality of discrimination levels for discriminating the multi-level signal 13.

When a brute force attack is performed, since the wiretapper data receiving apparatus does not know the discrimination level of the equalized multi-level signal 25 based on the multi-level code sequence 17, it is necessary for it to accurately discriminate and reproduce the multi-level signal 13 from the equalized multi-level signal 25 by using the discrimination levels represented by the thin dotted lines in FIG. 22(*b*) and then, analyze the correct key information and the information data 18. However, in the equalized multi-level signal 25, a level fluctuation occurs due to the intersymbol interference involved in the bandwidth shaping, for example, in the circled parts in FIG. 22(*b*), and a multi-level transition different from that of the multi-level signal 13 is exhibited. For this reason, when the equalized multi-level signal 25 is discriminated and reproduced by the wiretapper data receiving apparatus by using a plurality of discrimination levels, a symbol error (or a code error) for the multi-level signal 13 is unavoidable, and further, it is difficult to analyze the correction key information and the information data 18.

As described above, according to the present embodiment, a level fluctuation is caused in the multi-level signal 13 by the multi-level signal 15, and the equalized multi-level signal 24 is outputted. Consequently, third parties (wiretapper data receiving apparatuses) not sharing the key information (the first key information 11 and the second key information 16) cannot accurately discriminate and reproduce the multi-level signal 13 from the equalized multi-level signal 25 which is the modulated signal 14 that is demodulated, so that the decryption by a brute force attack or the like is difficult. Therefore, the invention according to the present embodiment is capable of providing a data communication apparatus that enables information transmission with higher stealthiness than the data communication apparatus according to the first embodiment.

Figure 20B:
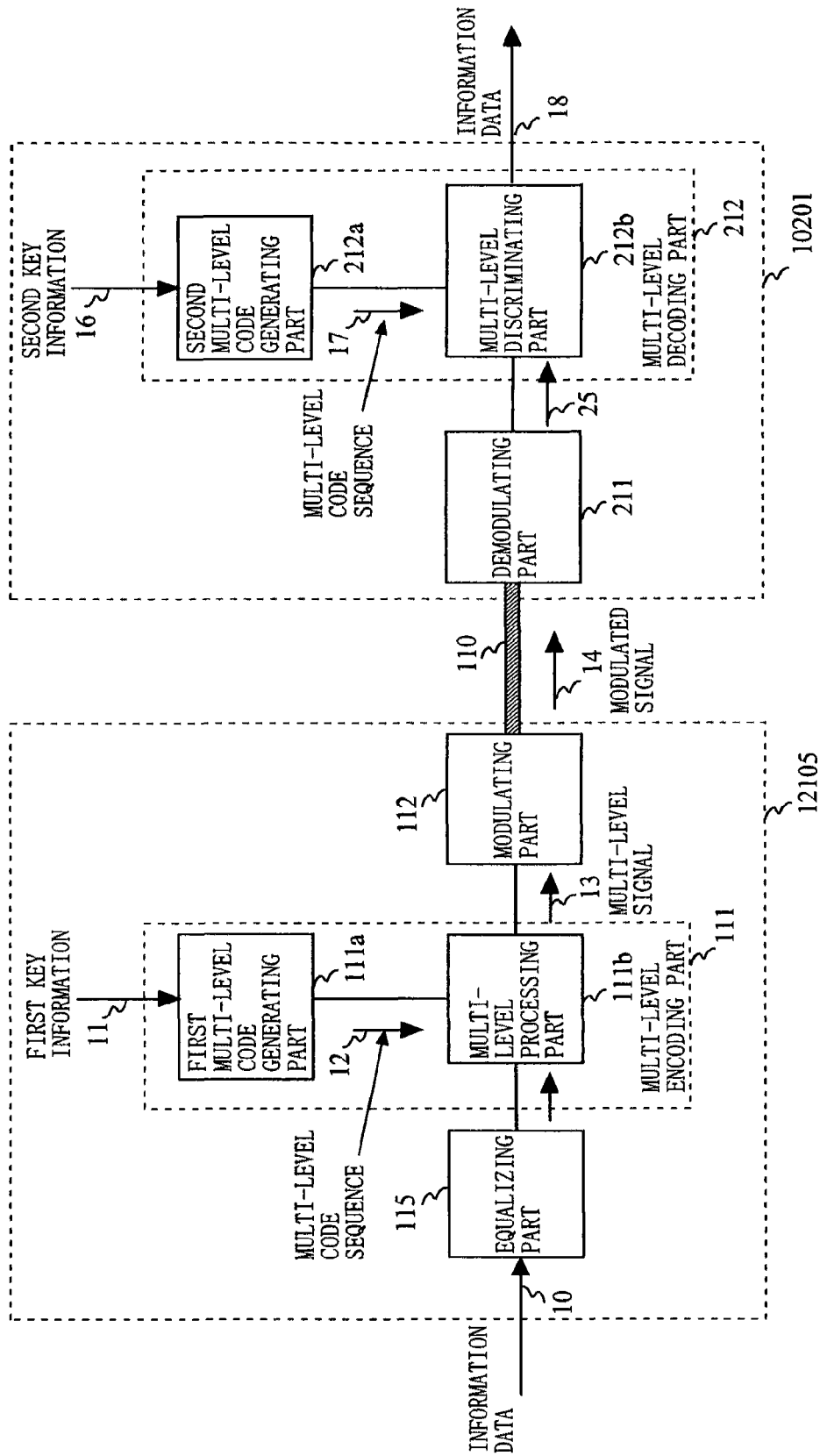
FIG. 20B is a block diagram showing another example of the structure of the data communication apparatus according to the sixth embodiment of the present invention.

While in the present embodiment, the equalizing part 115 is connected between the multi-level encoding part 111 and the modulating part 112, the connection position is not limited thereto. For example, the equalizing part 115 may be connected to the input side of the information data 10 of the multi-level processing part 111*b* so that the waveform-equalized information data 10 is outputted to the multi-level processing part 111*b* (see FIG. 20B).

Figure 20D:
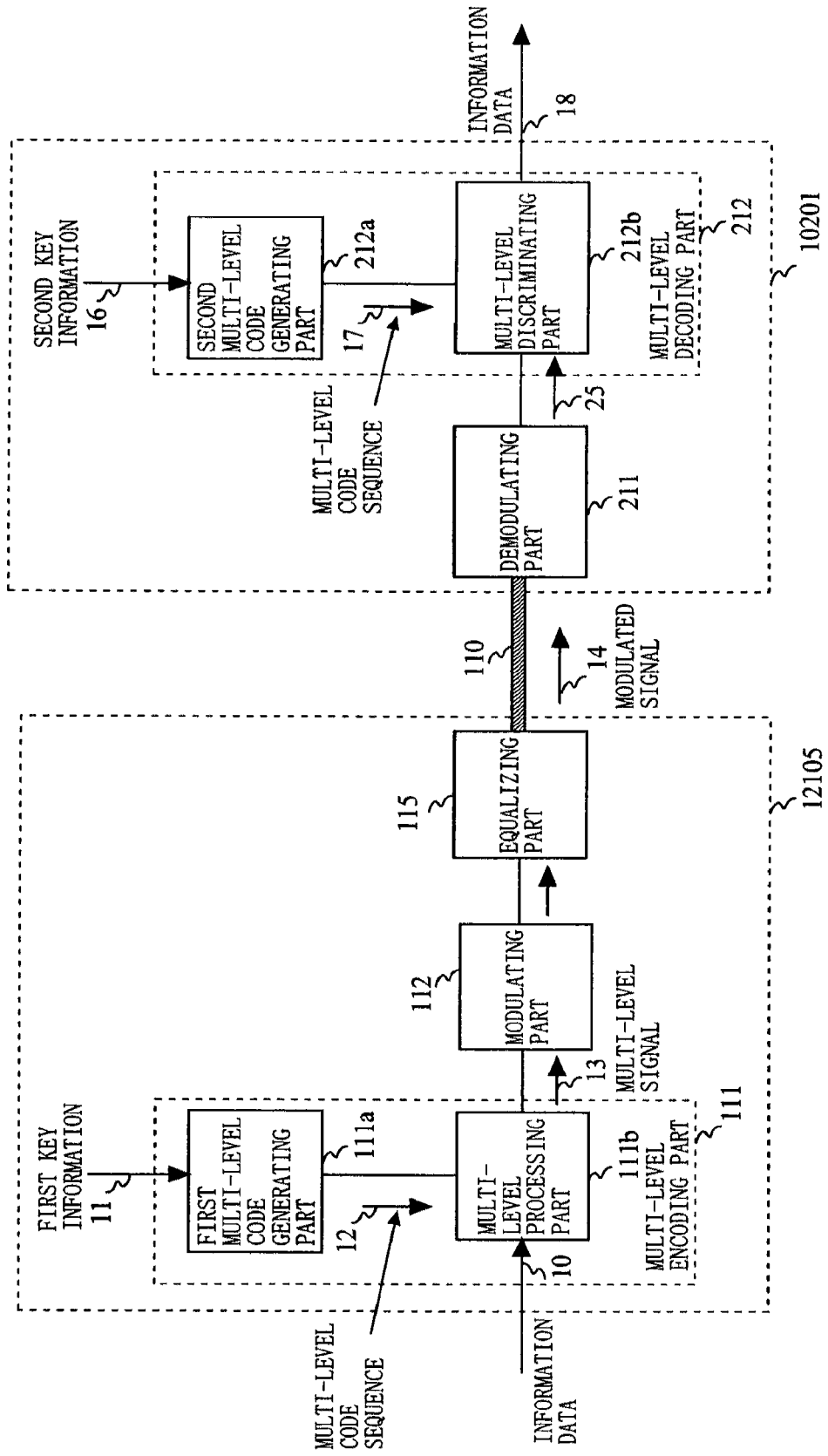
FIG. 20D is a block diagram showing another example of the structure of the data communication apparatus according to the sixth embodiment of the present invention.

Moreover, the equalizing part 115 may be connected between the first multi-level code generating part 111a and the multi-level processing part 111b (see FIG. 20C). In this case, the equalizing part 115 waveform-equalizes the multi-level code sequence 12, and outputs the equalized multi-level code sequence 12 to the multi-level processing part 111b. Moreover, the equalizing part 115 may be connected to the output side of the modulating part 112 and waveform-equalize the modulated signal 14 (see FIG. 20D). The data communication apparatus according to the present embodiment is capable of performing information transmission with high stealthiness when the equalizing part 115 is connected to any of the positions mentioned above.

It is desirable that the low-pass filter used as the equalizing part 115 be a low-pass filter that filters signal components of equal to or lower than half the frequency band of the inputted signal. For example, when a signal component of equal to or higher than half the inputted multi-level signal 13 is filtered, the equalizing part 115 (low-pass filter) outputs the equalized multi-level signal 24 where the multiple levels are largely fluctuated due to the intersymbol interference. In this case, it is difficult for the data receiving apparatus 10201 to discriminate the equalized multi-level signal 25 demodulated from the modulated signal 14.

Moreover, a high-pass filter may be used as the equalizing part 115. In this case, the data communication apparatus according to the present embodiment can produce similar effects to those produced when a low-pass filter is used, by intercepting the direct-current component or a low-frequency component of the signal inputted to the equalizing part 115 to thereby cause an intersymbol interference involved in the drifting of the average value in the signal outputted from the equalizing part 115.

Moreover, a band-pass filter may be used as the equalizing part 115. In this case, the data communication apparatus according to the present embodiment can produce similar effects to those produced when a low-pass filter is used, by filtering the signal component of a predetermined frequency band of the signal inputted to the equalizing part 115.

(Seventh Embodiment)

Figure 23:
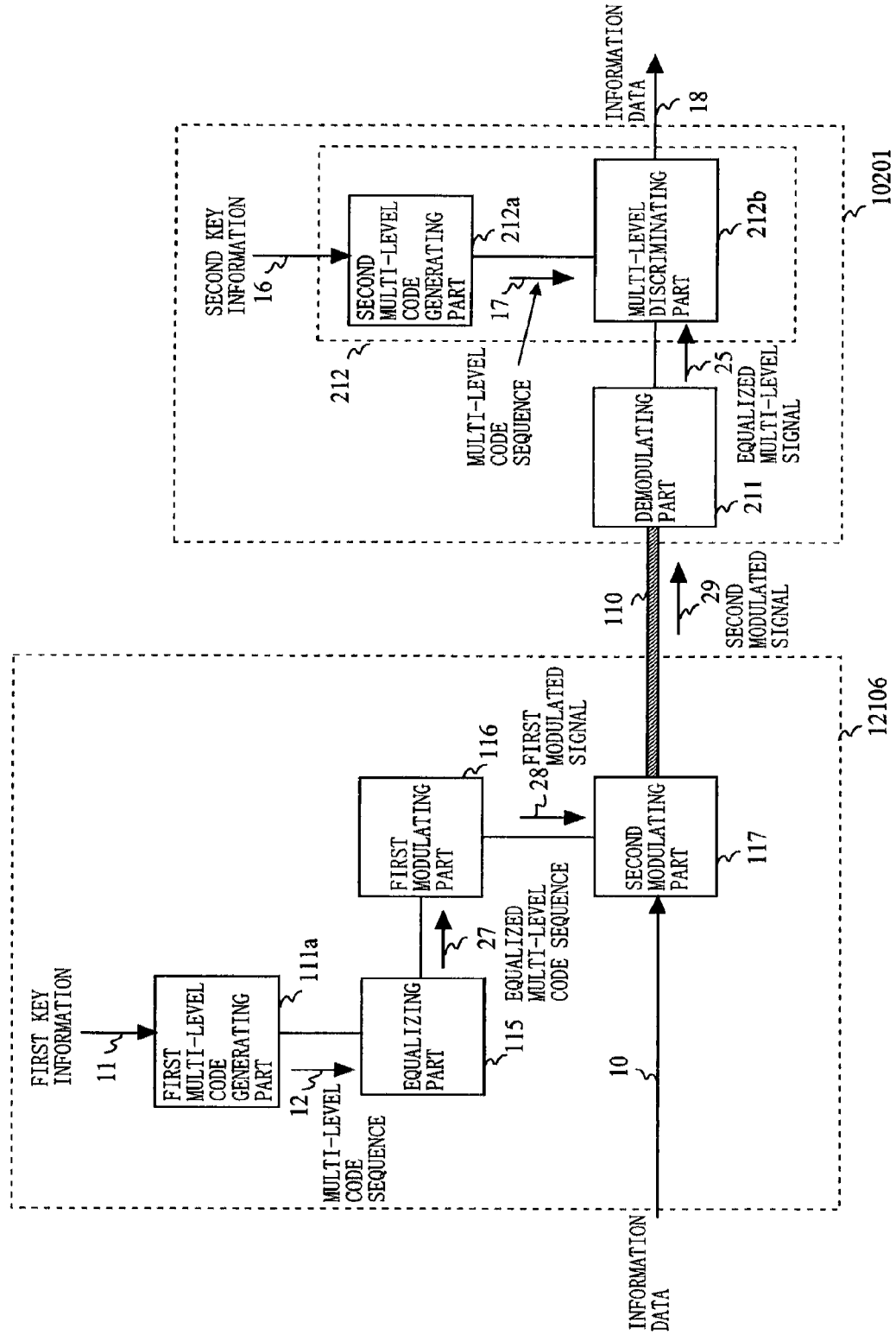
FIG. 23 is a block diagram showing an example of the structure of a data communication apparatus according to a seventh embodiment of the present invention.

FIG. 23 is a block diagram showing an example of the structure of a data communication apparatus according to a seventh embodiment of the present invention. In FIG. 23, the data communication apparatus according to the seventh embodiment is different from that according to the sixth embodiment in the structure of a data transmitting apparatus 12106. The data transmitting apparatus 12106 according to the seventh embodiment has the first multi-level code generating part 111a, the equalizing part 115, a first modulating part 116, and a second modulating part 117. Since the structure of the present embodiment corresponds to that of the sixth embodiment (FIG. 20A), the blocks performing the same operations are denoted by the same reference characters, and descriptions thereof are omitted.

In FIG. 23, to the equalizing part 115, the multi-level code sequence 12 is inputted from the first multi-level code generating part 111a. The equalizing part 115 waveform-equalizes the multi-level code sequence 12 by predetermined means, and outputs an equalized multi-level code sequence 27. The equalized multi-level code sequence 27 is inputted to the first modulating part 116. The first modulating part 116 modulates the equalized multi-level code sequence 27 in a predetermined modulation format, and outputs a first modulated signal 28. Specifically, the first modulating part 116, for example, amplitude-modulates the equalized multi-level code sequence 27 to thereby output the first modulated signal 28.

The first modulated signal 28 is inputted to the second modulating part 117. Moreover, the information data 10 is inputted to the second modulating part 117. The second modulating part 117 modulates the first modulated signal 28 and the information data 10 in a predetermined modulation format, and outputs a second modulated signal 29. For example, the second modulating part 117 adds the first modulated signal 28 and the information data 10 or amplitude-modulates the level of the first modulated signal 28 by the information data 10 to output the second modulated signal 29.

As described above, according to the present embodiment, the equalizing part 115 causes a level fluctuation in the multi-level code sequence 12 by the intersymbol interference, and outputs the equalized multi-level code sequence 27. Then, the first modulating part 116 outputs the first modulated signal 28 of the predetermined modulation format based on the equalized multi-level code sequence 27, and the second modulating part 117 modulates the first modulated signal 28 based on the information data 10 and outputs the second modulated signal 29 of the predetermined modulation format. Consequently, it is more difficult for third parties not sharing the key information (the first key information 11 and the second key information) to extract the information data 10 from the equalized multi-level signal 25 which is the equalized multi-level signal 25 that is demodulated. Thus, the invention according to the present embodiment is capable of providing a data communication apparatus that enables information transmission with high stealthiness like the data transmitting apparatus according to the fifth embodiment.

Figure 24:
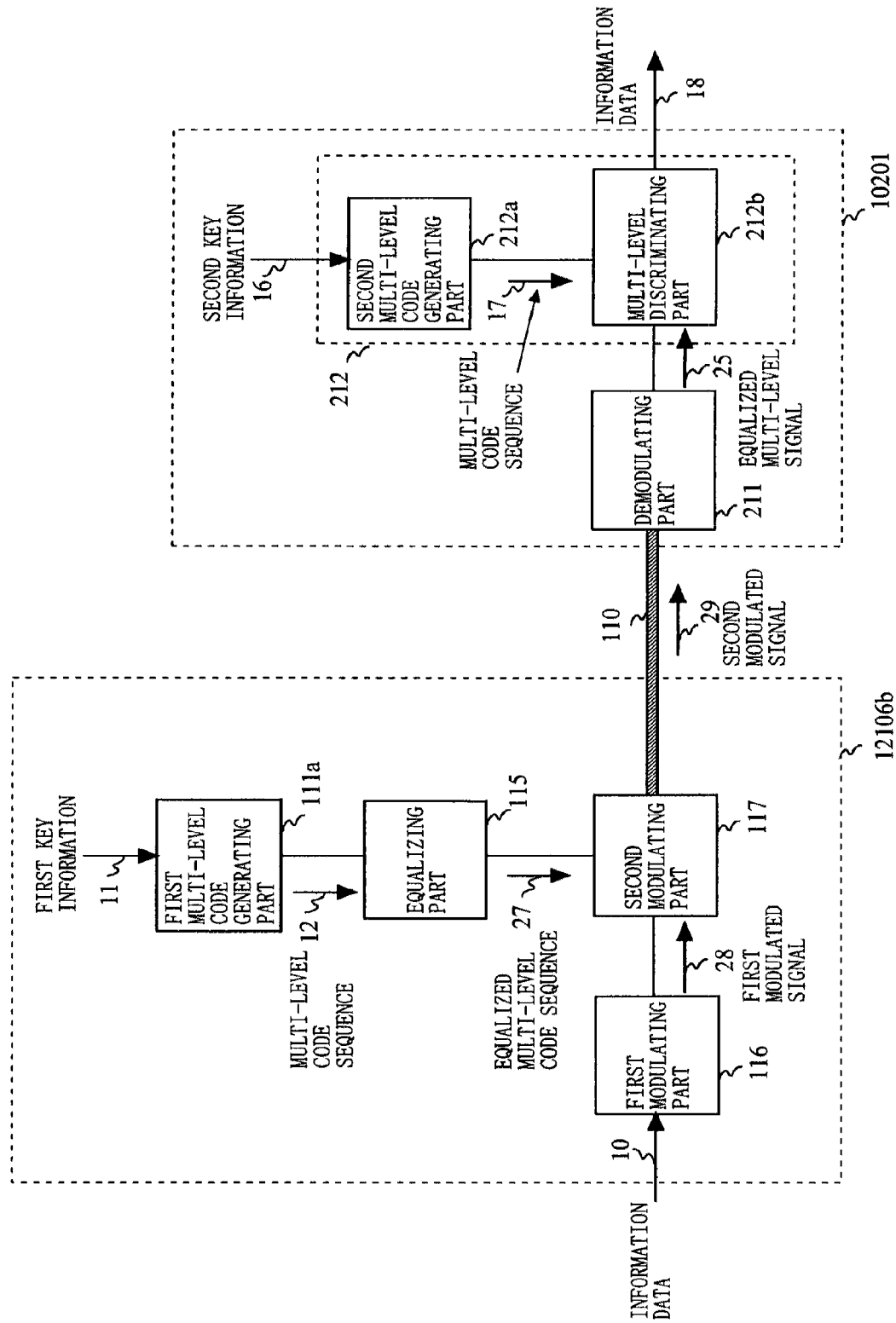
FIG. 24 is a block diagram showing another example of the structure of the data communication apparatus according to the seventh embodiment of the present invention.

The data communication apparatus according to the seventh embodiment (FIG. 23) may have a different structure. FIG. 24 is a block diagram showing another example of the structure of the data communication apparatus according to the seventh embodiment of the present invention. In FIG. 24, to the equalizing part 115, the multi-level code sequence 12 is inputted from the first multi-level code generating part 111a. The equalizing part 115 waveform-equalizes the multi-level code sequence 12 by predetermined means, and outputs the equalized multi-level code sequence 27. The first modulating part 116 modulates the information data 10, and outputs the first modulated signal 28 of the predetermined modulation format. The equalized multi-level code sequence 27 and the first modulated signal 28 are inputted to the second modulating part 117. The second modulating part 117 outputs the second modulated signal 29 of the predetermined format based on the equalized multi-level code sequence 27 and the first modulated signal 28. Specifically, the second modulating part 117 adds the equalized multi-level code sequence 27 and the first modulated signal 28 or amplitude-modulates the level of the first modulated signal 28 by the equalized multi-level code sequence 27 to output the second modulated signal 29. In this case, the invention according to the present embodiment is also capable of providing a data communication apparatus that enables information transmission with high stealthiness like the data communication apparatus according to the sixth embodiment.

In the data communication apparatus according to the seventh embodiment (FIGS. 23 and 24), like the sixth embodiment, as long as a level fluctuation is caused in the equalized multi-level signal 25, the equalizing part 115 may be inserted or connected in any position of the data transmitting apparatuses 12106 and 12106b. In FIG. 23, the data transmitting apparatus 12106 may have a structure such that the equalizing part 115 is connected in the preceding stage of the second modulating part 117 to cause a predetermined level fluctuation in the information data 10. Moreover, the data transmitting apparatus 12106 may have a structure such that the equalizing part 115 is connected in the succeeding stage of the first modulating part 116 to cause a predetermined level fluctuation in the first modulated signal 28. 117 to cause a predetermined level fluctuation in the second Moreover, in FIG. 24, the data transmitting apparatus 12106*b* may have, for example, a structure such that the equalizing part 115 is connected in the preceding stage of the first modulating part 116 to cause a predetermined level fluctuation in the information data 10. Moreover, the data transmitting apparatus 12106*b* may have a structure such that the equalizing part 115 is connected in the succeeding stage of the second modulating part 117 to cause a predetermined level fluctuation in the second modulated signal 29. In any of the structures, the data communication apparatus according to the seventh embodiment can make it difficult to discriminate the equalized multi-level signal 25 discriminated by wiretapper receiving apparatuses.

(Eighth Embodiment)

Figure 25:
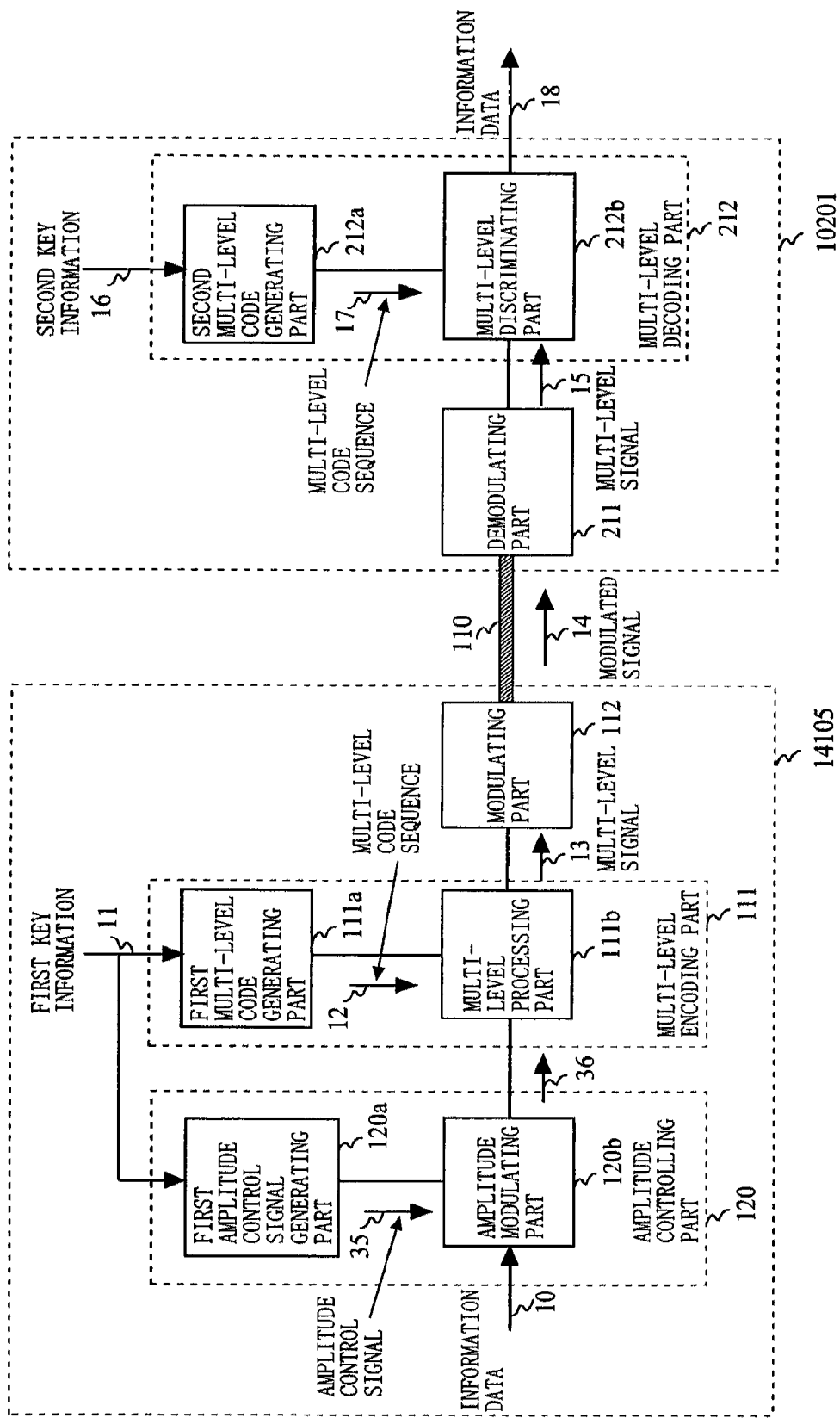
FIG. 25 is a block diagram showing an example of the structure of a data communication apparatus according to an eighth embodiment of the present invention.

FIG. 25 is a block diagram showing an example of the structure of a data communication apparatus according to an eighth embodiment of the present invention. In FIG. 25, the data communication apparatus according to the eighth embodiment is different from the data communication apparatus according to the first embodiment (FIG. 1) in that a data transmitting apparatus 14105 further has an amplitude controlling part 120. The amplitude controlling part 120 includes a first amplitude control signal generating part 120*a* and an amplitude modulating part 120*b*.

Figure 26:
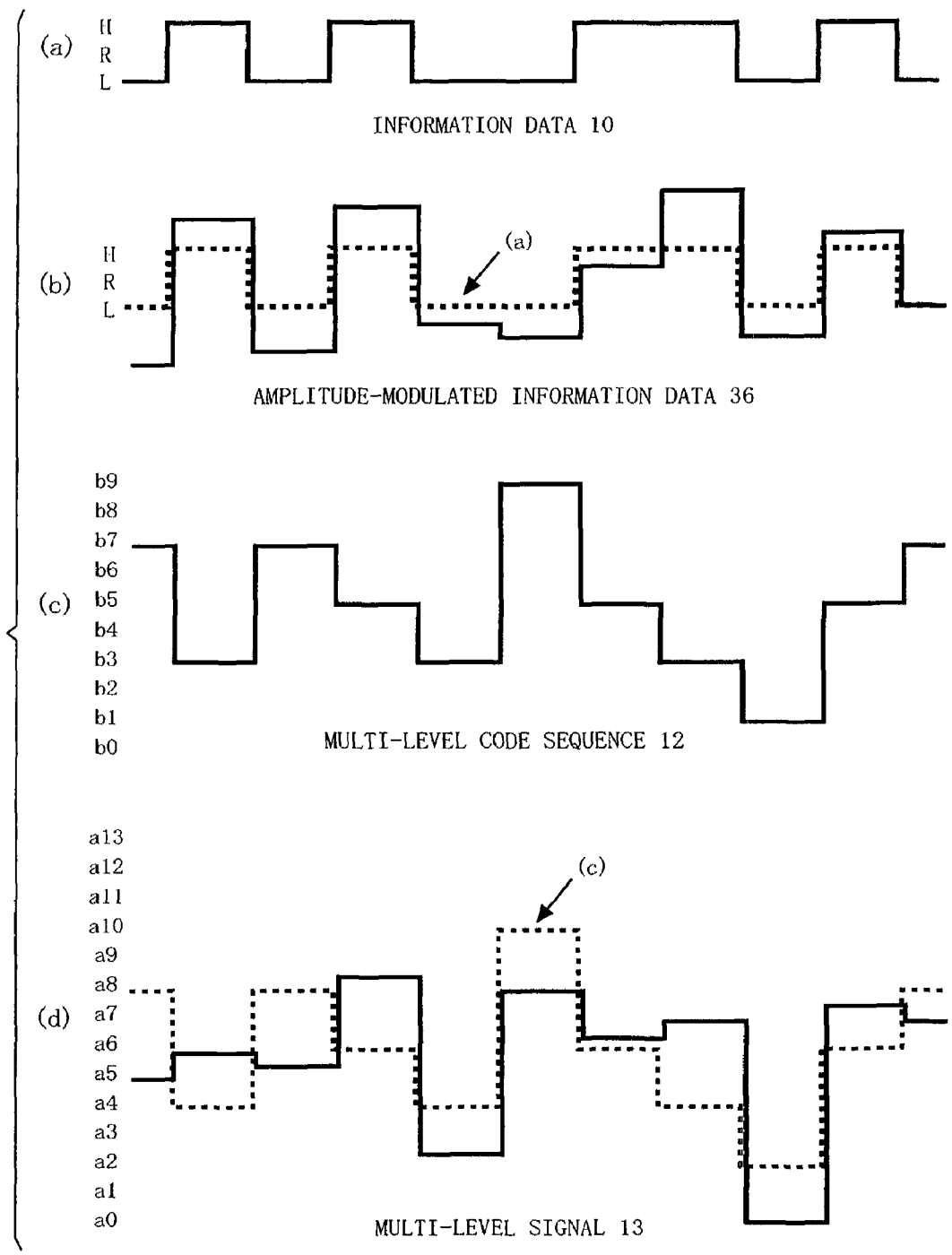
FIG. 26 is a schematic view for explaining the signal waveforms of parts of the data communication apparatus according to the eighth embodiment of the present invention.

FIG. 26 is a schematic view for explaining the signal waveforms of parts of the data communication apparatus according to the eighth embodiment of the present invention. FIG. 26(*a*) shows an example of the waveform of the information data 10. FIG. 26(*b*) shows an example of the waveform of amplitude-modulated information data 36 outputted from the amplitude modulating part 120*b*. The dotted line in FIG. 26(*b*) represents the waveform of the information data 10 shown in FIG. 26(*a*). FIG. 26(*c*) shows an example of the waveform of the multi-level code sequence 12 outputted from the first multi-level code generating part 111*a*. FIG. 26(*d*) shows an example of the waveform of the multi-level signal 13 outputted from the multi-level processing part 111*b*. The dotted line in FIG. 26(*d*) represents the waveform of the multi-level signal 13 shown in FIG. 26(*c*). The operation of the data communication apparatus according to the eighth embodiment will be explained by using FIG. 26. Since the structure of the present embodiment corresponds to that of the first embodiment (FIG. 1), the blocks performing the same operations are denoted by the same reference characters, and descriptions thereof are omitted.

In the data transmitting apparatus 14105, the first key information 11 is inputted to the first amplitude control signal generating part 120*a*. Based on the first key information 11, the first amplitude control signal generating part 120*a* generates an amplitude control signal 35 the value of which varies substantially like a random number. The amplitude control signal 35 is inputted to the amplitude modulating part 120*b*. The information data 10 (FIG. 26(*a*)) is inputted to the amplitude modulating part 120*b*. The amplitude modulating part 120*b* performs a substantially random amplitude modulation on the information data 10 (FIG. 26(*a*)) based on the amplitude control signal 35, and outputs the amplitude-modulated information data 36 (FIG. 26(*b*)). As shown in FIGS. 26(*a*) and 26(*b*), by using, as the reference level R, the amplitude center level of the information data 10 which is the original signal, the amplitude modulating part 120*b* performs the amplitude modulation within a range not changing the polarity.

The amplitude-modulated information data 36 (FIG. 26(*b*)) and the multi-level code sequence 12 (FIG. 26(*c*)) are inputted to the multi-level processing part 111*b*. The multi-level processing part 111*b* generates the multi-level signal 13 (FIG. 26(*d*)) by regarding the level of the multi-level code sequence 12 as the bias level for the reference level R of the amplitude-modulated information data 36 and adding the multi-level code sequence 12 and the amplitude-modulated information data 36.

In the data receiving apparatus 10201, the multi-level discriminating part 212*b* receives the multi-level signal 15 from the demodulating part 211. The multi-level discriminating part 212*b* performs the discrimination (binary determination) of the multi-level signal 15 by using, as the threshold value (reference level), the multi-level code sequence 17 generated based on the second key information 16 the same as the first key information 11 (the same as FIG. 26(*c*)). Here, the amplitude modulating part 120*b* does not change the polarity of the original signal (information data 10) as mentioned above. For this reason, the multi-level discriminating part 212*b* can correctly reproduce the information data 18 by performing the discrimination with reference to the multi-level code sequence 17 equal to the multi-level code sequence 12.

Next, wiretapping of the modulated signal by a third party will be explained. As mentioned above, it is considered that the third party decrypts the modulated signal by using a structure corresponding to the data receiving apparatus 10201 or a higher-performance data receiving apparatus (wiretapper data receiving apparatus). The wiretapper data receiving apparatus reproduces the multi-level signal by demodulating the modulated signal 14. However, since the key information is not shared between the wiretapper data receiving apparatus and the data transmitting apparatus 10101, the wiretapper data receiving apparatus cannot generate the multi-level code sequence from the key information like the data receiving apparatus 10201. For this reason, the wiretapper data receiving apparatus cannot perform the binary determination of the multi-level signal with reference to the multi-level code sequence.

Wiretapping considered to be performed in such a case includes simultaneously discriminating all the levels of the multi-level signal (generally called "brute force attack"). That is, the wiretapper data receiving apparatus is provided with threshold values for all the inter signal point intervals that the multi-level signal can take, performs the simultaneous determination of the multi-level signal, and analyzes the result of the determination to thereby try to extract the correct key information or information data. For example, the wiretapper data receiving apparatus tries to extract the correct key information or information data by performing the multi-level determination on the multi-level signal by using, as the threshold values, the levels $c0$, $c1$, $c2$, $c3$, $c4$, $c5$ and $c6$ of the multi-level code sequence 12 shown in FIG. 2.

Figure 27:
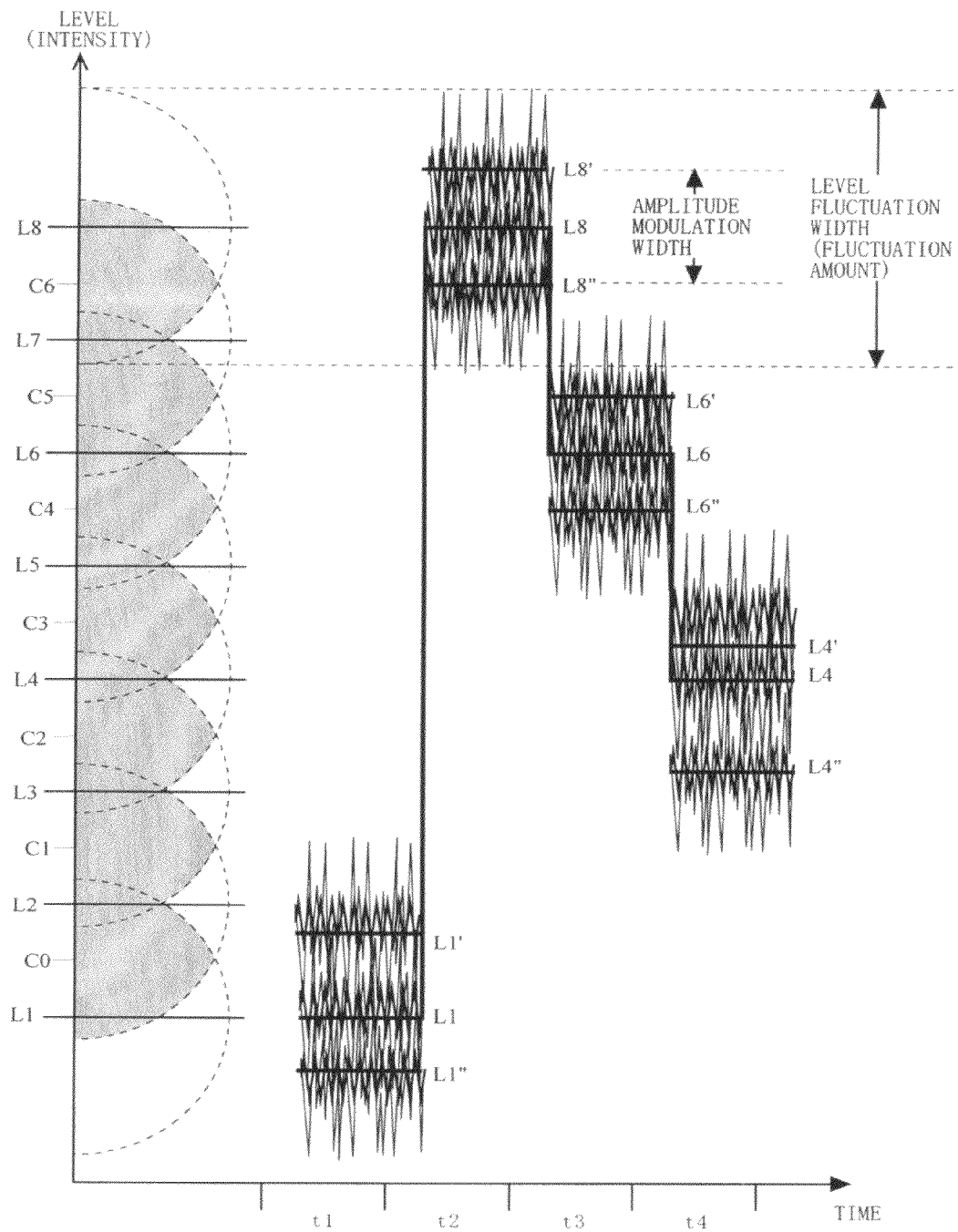
FIG. 27 is a schematic view explaining the transmission signal quality of the data communication apparatus according to the eighth embodiment of the present invention.

However, as mentioned above, noise is caused by various factors in actual transmission systems, and since this noise is combined on the modulated signal, the level of the multi-level signal fluctuates with time and momentarily as shown in FIG. 4. In addition, in the present embodiment, the substantially random amplitude modulation is performed on the multi-level signal based on the first key information 11 (that is, the amplitude control signal 35). FIG. 27 is a schematic view explaining the transmission signal quality of the data communication apparatus according to the eighth embodiment of the present invention. As shown in FIG. 27, the level fluctuation width (fluctuation amount) of the multi-level signal received by the data receiving apparatus 10201 and the wiretapper data receiving apparatus is larger than that in the first embodiment.

Since the SN ratio of the signal to be determined (multi-level signal) determined by the wiretapper data receiving apparatus depends on the ratio between the step width and the fluctuation amount of the multi-level signal, the SN ratio is further reduced by the effect of the amplitude modulation performed based on the amplitude control signal 35. Consequently, the data communication apparatus according to the present embodiment can make wiretapping difficult by inducing a large number of discrimination errors in the third party's brute force attack using all the threshold values. In particular, in the data communication apparatus, by setting the level fluctuation width by the amplitude modulation so as to be equal to or larger than the step width of the multi-level signal, the multi-level determination by third parties is made virtually impossible to thereby realize ideal wiretapping prevention, so that absolute safety in data communication can be ensured.

Figure 28:
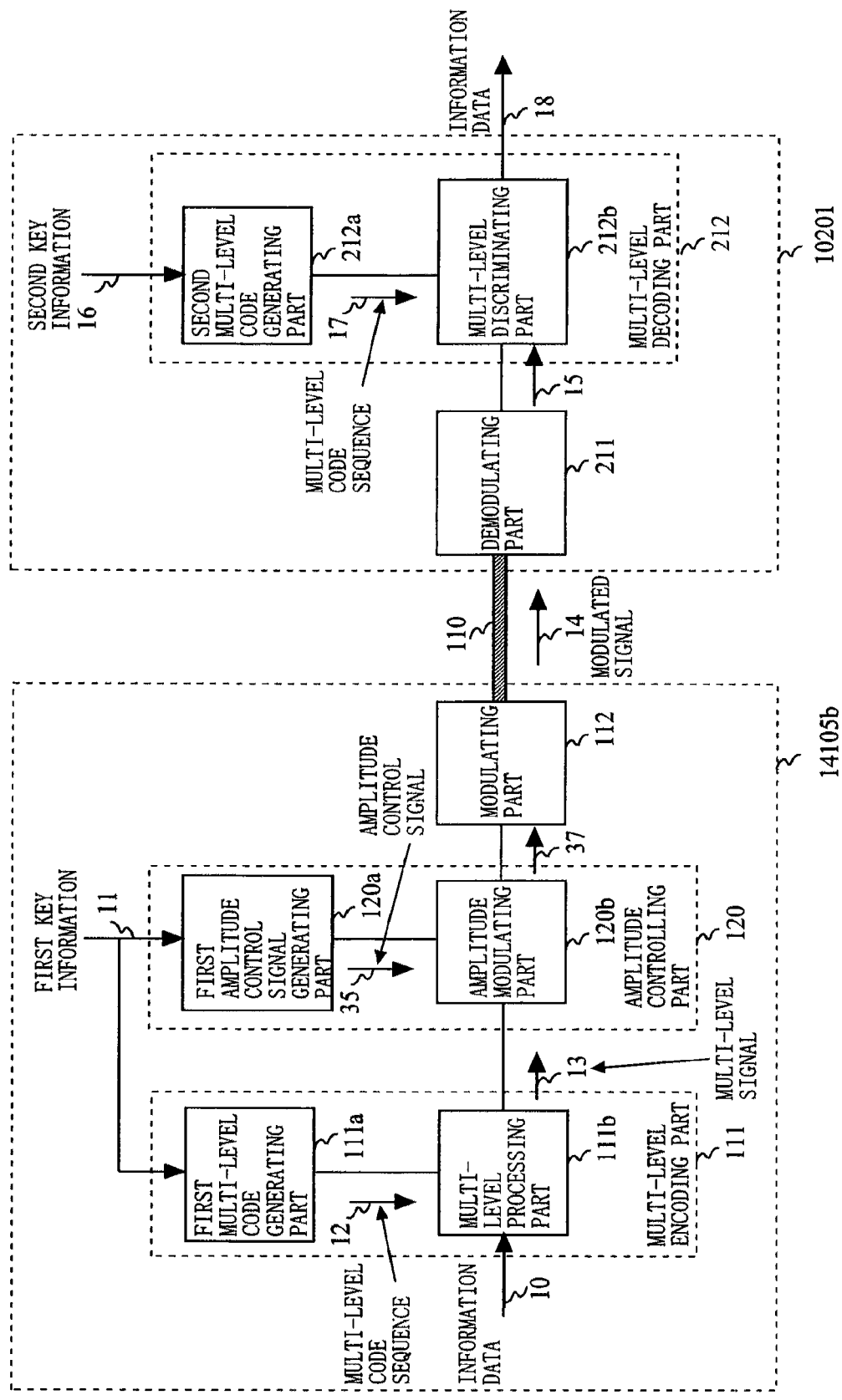
FIG. 28 is a block diagram showing a second example of the structure of the data communication apparatus according to the eighth embodiment of the present invention.

The amplitude controlling part 120 may be inserted or connected in any position different from that of FIG. 25 as long as a level fluctuation is caused in the multi-level signal 15 determined by the wiretapper data receiving apparatus and the SN ratio can be controlled. For example, as shown in FIG. 28, the data communication apparatus may have a structure such that the amplitude controlling part 120 is inserted between the multi-level encoding part 111 and the modulating part 112 to cause a predetermined level fluctuation in the multi-level signal 13.

Figure 29:
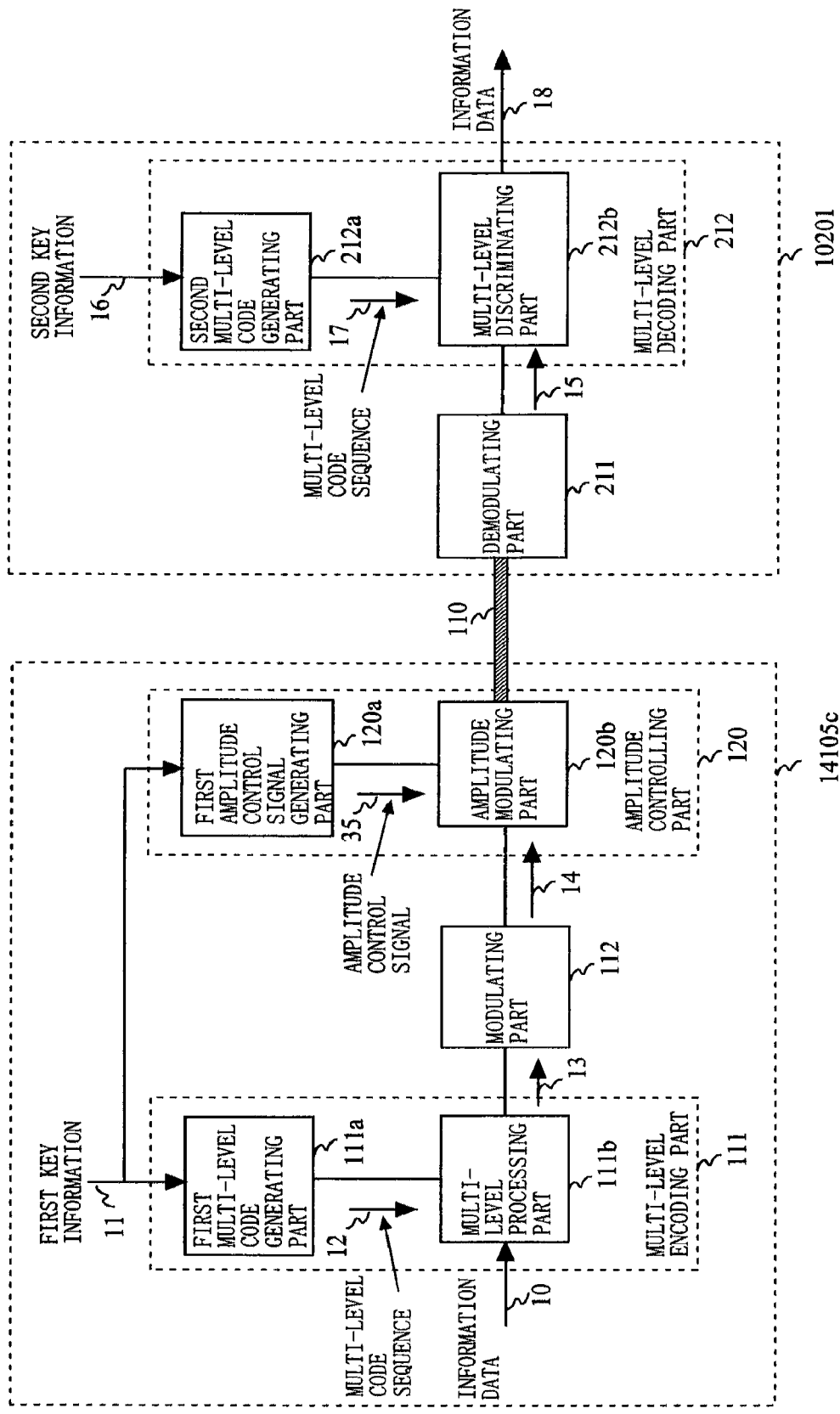
FIG. 29 is a block diagram showing a third example of the structure of the data communication apparatus according to the eighth embodiment of the present invention.

Moreover, for example, as shown in FIG. 29, the data communication apparatus may have a structure such that the amplitude controlling part 120 is connected in the succeeding stage of the modulating part 112 to cause a level fluctuation in the modulated signal 14. In this case, the amplitude modulating part 120b amplitude-modulates or intensity-modulates the modulated signal 14 according to the kind of the signal transmitted via the transmission path 110. In any of the structures, the data communication apparatus according to the eighth embodiment is capable of controlling the SN ratio of the signal to be determined (multi-level signal) at the time of the multi-level determination to a given value.

Figure 30:
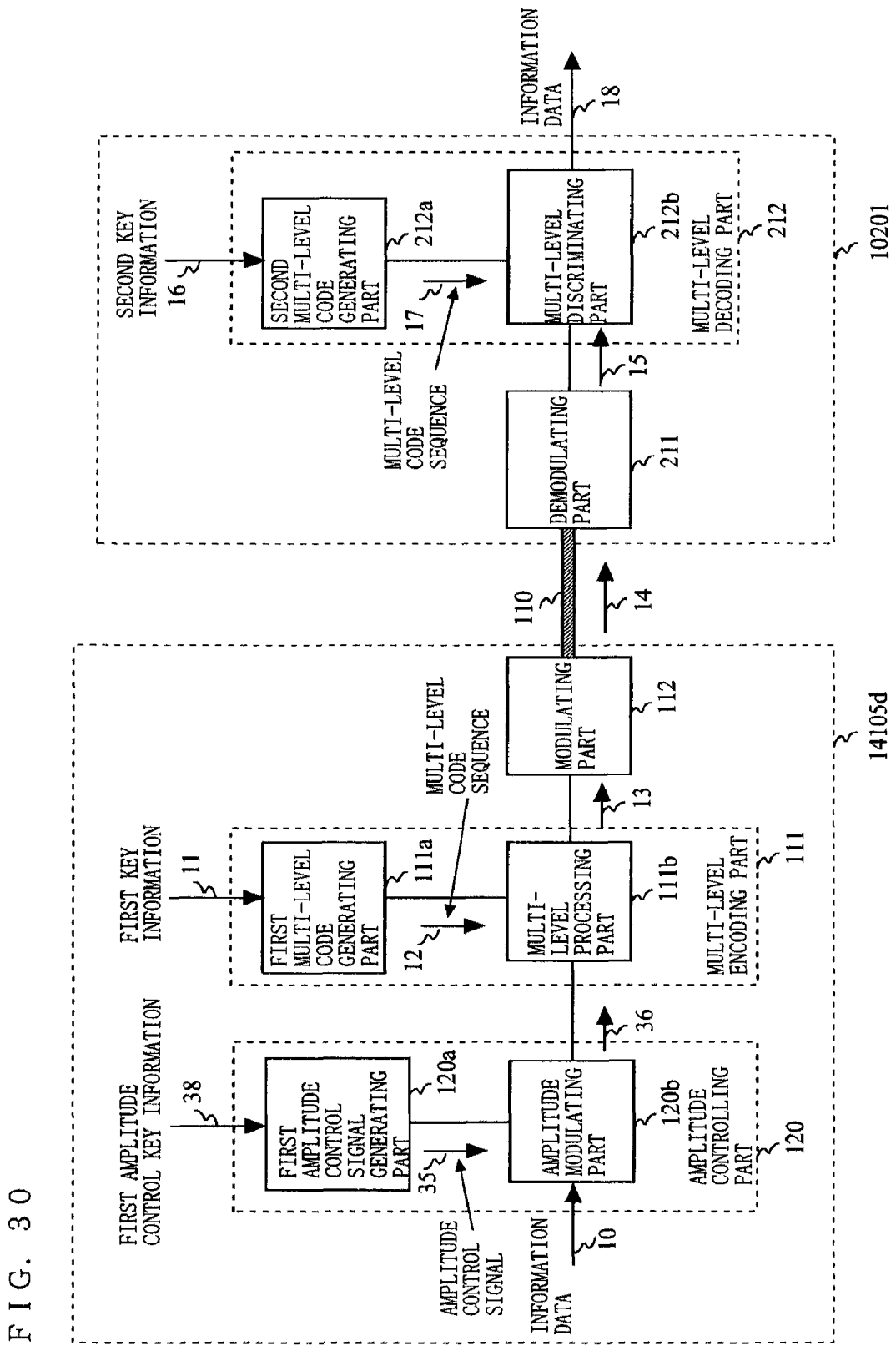
FIG. 30 is a block diagram showing a fourth example of the structure of the data communication apparatus according to the eighth embodiment of the present invention.

While the first amplitude control signal generating part 120a generates the amplitude control signal 35 based on the first key information 11 inputted to the first multi-level code generating part 111a in FIG. 25, it may generate the amplitude control signal 35 based on predetermined first amplitude control key information 38 different from the first key information 11 as shown in FIG. 30. Thereby, the correlation between the level change of the multi-level code sequence 12 and the amplitude modulation by the amplitude modulating part 120b is suppressed to thereby make the level change of the multi-level signal 13 more random, so that more ideal discrimination errors can be induced in the multi-level determination by the wiretapper data receiving apparatus.

Figure 31:
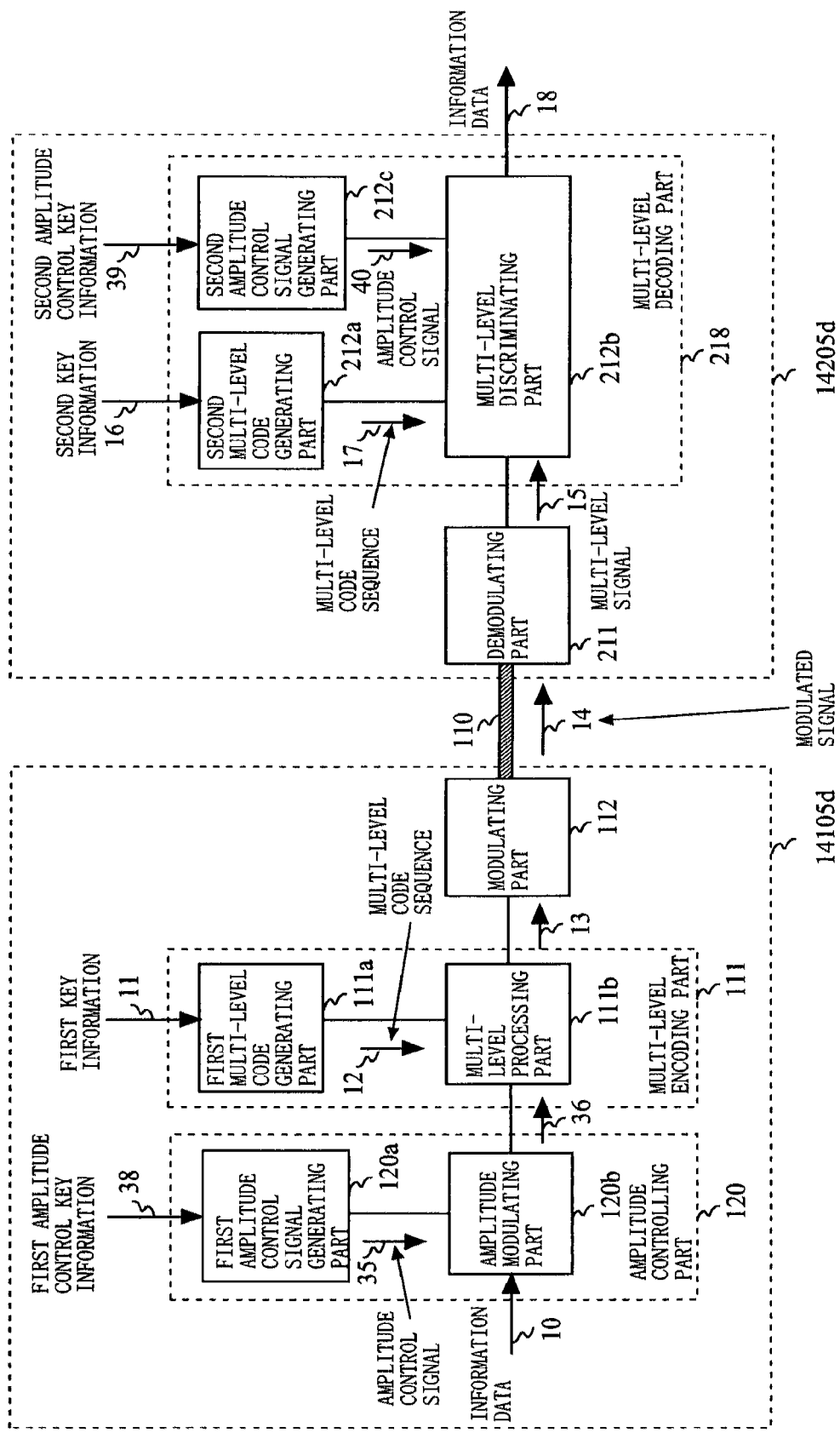
FIG. 31 is a block diagram showing a fifth example of the structure of the data communication apparatus according to the eighth embodiment of the present invention.

In actuality, there are cases where the amplitude modulation by the amplitude modulating part 120b deteriorates the SN ratio of the signal to be determined the discrimination (binary determination) of which is performed by the data receiving apparatus 10201 of the authorized receiver. To suppress such an effect of the amplitude modulation, the structure of the data receiving apparatus 10201 may be changed. For example, as shown in FIG. 31, in a data receiving apparatus 14205d, a multi-level decoding part 218 may include a second amplitude control signal generating part 212c in addition to the second multi-level code generating part 212a and the multi-level discriminating part 212b. That is, the second amplitude control signal generating part 212c previously shares second amplitude control key information 39 the same as the first amplitude control key information 38, and generates an amplitude control signal 40 corresponding to the amplitude control signal 35 based on the second amplitude control key information 39. The multi-level discriminating part 212b performs the optimum discrimination (binary determination) of the multi-level signal 15 by using as the threshold value the multi-level code sequence 17 outputted from the second multi-level code generating part 212a and while monitoring the momentary level or the SN ratio of the multi-level signal 15 by the amplitude control signal 40, thereby reproducing the information data 18.

As described above, according to the present embodiment, a safer data communication apparatus can be provided in which by encoding the information data to be transmitted as the multi-level signal and arbitrarily controlling the fluctuation level (fluctuation amount) thereof, a decisive deterioration is deliberately caused in the reception signal quality in wiretapping by third parties to thereby make the decryption and decoding of the reception signal more difficult.

(Ninth Embodiment)

FIG. 32A is a block diagram showing an example of the structure of the data communication apparatus according to a ninth embodiment of the present invention. The data communication apparatus according to the present embodiment realizes, by a different structure, the conversion to the modulated signal 14 based on the multi-level code sequence 12 and the amplitude-modulated information data 36 which conversion is performed by the multi-level processing part 111b and the modulating part 112 (see FIG. 25) in the eighth embodiment. In FIG. 32A, the data communication apparatus according to the ninth embodiment is constituted by connecting a data transmitting apparatus 14106 and the data receiving apparatus 10201 via the transmission path 110. The data transmitting apparatus 14106 has the first multi-level code generating part 111a, the amplitude controlling part 120, a first modulating part 122, a second modulating part 123, and a multiplexing part 124. The amplitude controlling part 120 includes the first amplitude control signal generating part 120a and the amplitude modulating part 120b.

Since the structure of the present embodiment corresponds to that of the eighth embodiment (FIG. 25), the blocks performing the same operations are denoted by the same reference characters, and descriptions thereof are omitted. In FIG. 32A, with the multi-level code sequence 12 outputted from the first multi-level code generating part 111a as the original data, the first modulating part 122 converts it into a predetermined modulation format, and outputs a first modulated signal 41. With the amplitude-modulated information data 36 outputted from the amplitude modulating part 120b as the original data, the second modulating part 123 converts it into a predetermined modulation format, and outputs a second modulated signal 42. The first modulated signal 41 and the second modulated signal 42 are inputted to the multiplexing part 124. The multiplexing part 124 amplitude—or intensity—combines the first modulated signal 41 and the second modulated signal 42, and transmits the composite signal to the transmission path 110. That is, the data communication apparatus according to the ninth embodiment realizes a circuit structure with high flexibility by performing the conversion to the modulated signal 14 based on the multi-level code sequence 12 and the amplitude-modulated information data 36 which conversion is performed by the multi-level processing part 111b and the modulating part 112 in FIG. 25, by the first modulating part 122, the second modulating part 123 and the multiplexing part 124 at the modulated signal level.

Figure 32B:
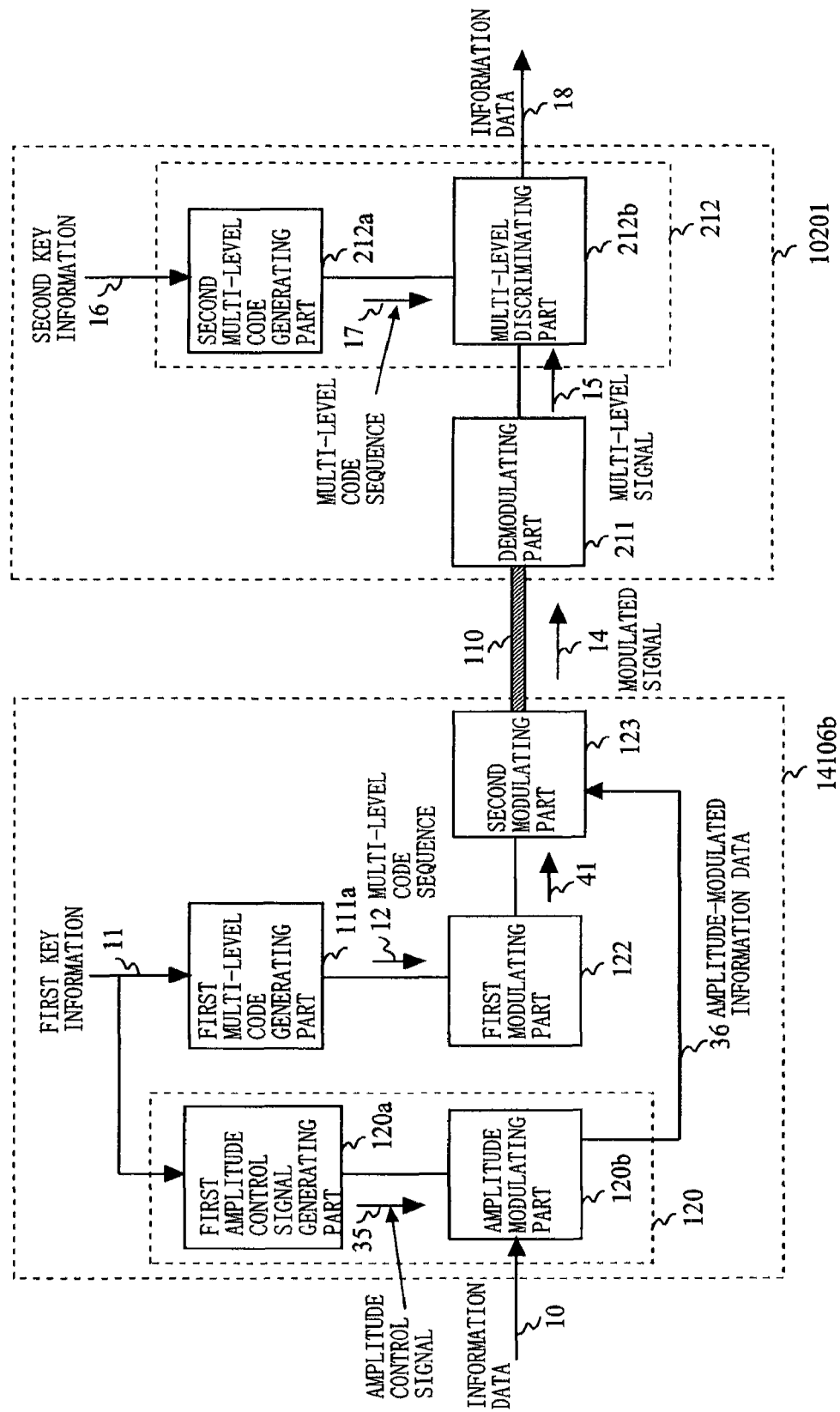
FIG. 32B is a block diagram showing another example of the structure of the data communication apparatus according to the ninth embodiment of the present invention.

While in the data communication apparatus according to the ninth embodiment (FIG. 32A), the first modulating part 122 and the second modulating part 123 are placed in parallel and the first modulated signal 41 and the second modulated signal 42 are multiplexed, a different structure may be adopted. FIG. 32B is a block diagram showing another example of the structure of the data communication apparatus according to the ninth embodiment of the present invention. As shown in FIG. 32B, the data communication apparatus according to the present embodiment may have a structure such that the first modulating part 122 and the second modulating part 123 are connected in series and the same carrier wave is modulated by the first modulating part 122 and the second modulating part 123. The first modulating part 122 modulates the carrier wave by the multi-level code sequence 12 and outputs the first modulated signal 41, and the second modulating part 123 modulates the first modulated signal 41 by the amplitude-modulated information data 36. That is, the data communication apparatus of this structure performs the conversion to the modulated signal 14 based on the multi-level code sequence 12 and the amplitude-modulated information data 36 which conversion is performed by the multi-level processing part 111b and the modulating part 112 in FIG. 25, by the first modulating part 122 and the second modulating part 123 at the modulated signal level.

In the data transmitting apparatus 14106 of FIG. 32A, the first modulated signal 41 and the second modulated signal 42 are added together by the multiplexing part 124. On the contrary, in a data transmitting apparatus 14106b of FIG. 32B, the signals are integrated together by the first modulating part 122 and the second modulating part 123. For this reason, although in the data transmitting apparatus 14106b of FIG. 32B, the waveform of the generated modulated signal 14 is slightly different from that in the data transmitting apparatus 14106 of FIG. 32A, a substantially similar effect can be obtained in that the level that the amplitude-modulated information data 36 has is combined with reference to the level of the multi-level code sequence 12.

Figure 33A:
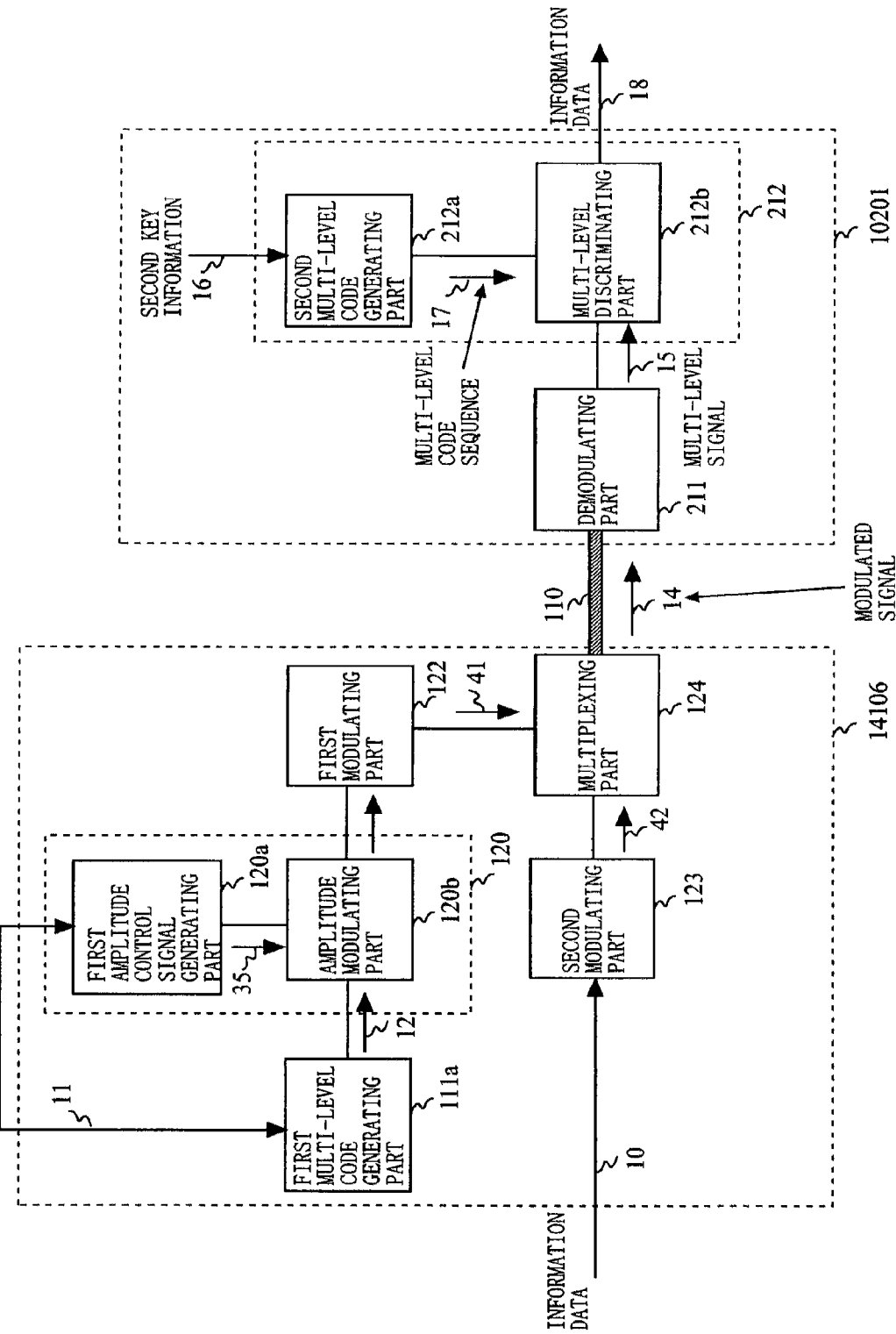
FIG. 33A is a block diagram showing another example of the structure of the data communication apparatus according to the ninth embodiment of the present invention.
Figure 33B:
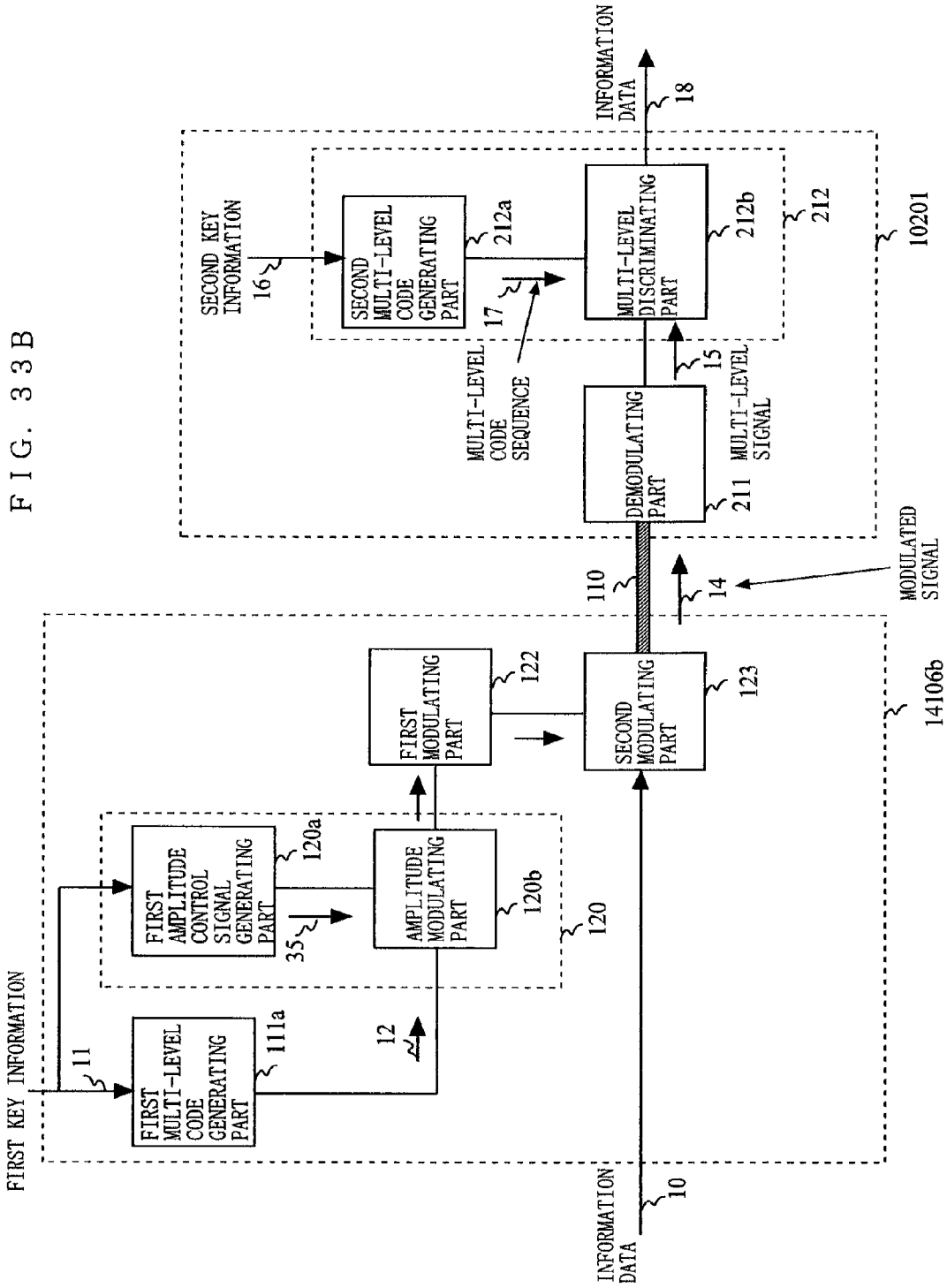
FIG. 33B is a block diagram showing another example of the structure of the data communication apparatus according to the ninth embodiment of the present invention.

Moreover, in the data communication apparatus according to the ninth embodiment, like the eighth embodiment, as long as a level fluctuation is caused in the multi-level signal 15 determined by the wiretapper data receiving apparatus and the SN ratio of the multi-level signal can be controlled, the amplitude controlling part 120 may be inserted or connected in any position different from that in FIG. 32A or 33B. For example, in FIG. 32A or 32B, the data communication apparatus according to the ninth embodiment may have a structure such that the amplitude controlling part 120 is inserted in the preceding stage of the first modulating part 122 to cause a predetermined level fluctuation in the multi-level code sequence 12 (see FIGS. 33A and 33B). Moreover, the data communication apparatus according to the ninth embodiment may have a structure such that the amplitude controlling part 120 is connected in the succeeding stage of the first modulating part 122 or the second modulating part 123 or in the succeeding stage of the multiplexing part 124 to cause a level fluctuation in the first modulated signal 41 and the second modulated signal 42, or a composite signal thereof. In any of the structures, the data communication apparatus according to the ninth embodiment is capable of controlling the SN ratio of the signal to be determined (multi-level signal) at the time of the multi-level determination to a given value.

Further, in the data communication apparatus according to the ninth embodiment, the first amplitude control signal generating part 120a may generate the amplitude control signal 35 based on the predetermined first amplitude control key information 38 different from the first key information 11 like FIG. 30. Thereby, in the data communication apparatus according to the ninth embodiment, the correlation between the level change of the multi-level code sequence 12 and the amplitude modulation by the amplitude modulating part 120b is suppressed to thereby make the level change of the multi-level signal 15 more random, so that more ideal discrimination errors can be induced in the multi-level determination by the wiretapper data receiving apparatus.

As described above, according to the present embodiment, a safer data communication apparatus can be provided in which by encoding the information data to be transmitted as the multi-level signal and arbitrarily controlling the fluctuation level (fluctuation amount) thereof and by providing an individual modulating part for each of the information data and the multi-level code sequence, a decisive deterioration is deliberately caused in the reception signal quality in wiretapping by third parties with a more flexible structure to thereby make the decryption and decoding of the reception signal more difficult.

(Tenth Embodiment)

Figure 34:
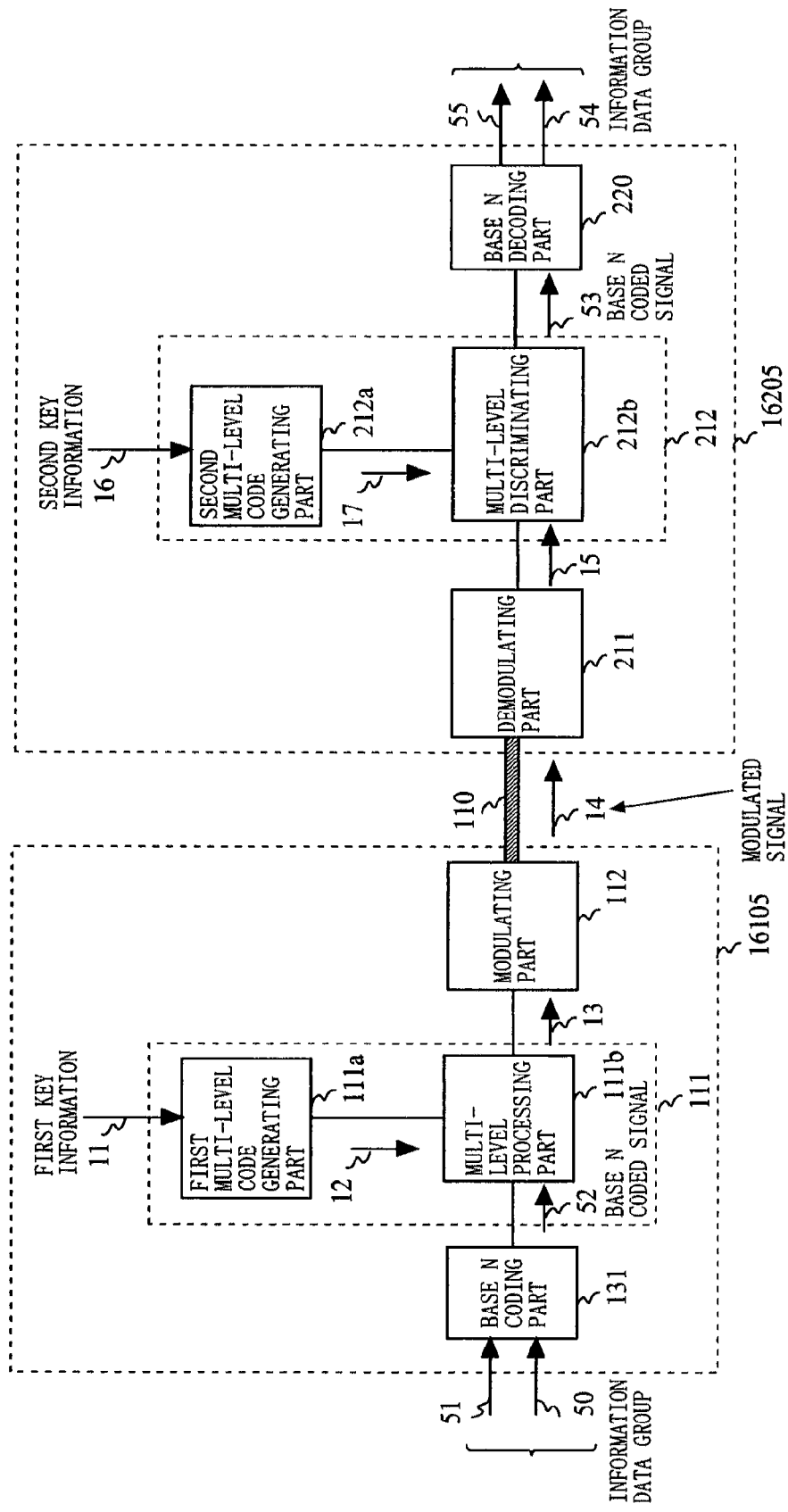
FIG. 34 is a block diagram showing the structure of a data communication apparatus according to a tenth embodiment of the present invention.

FIG. 34 is a block diagram showing the structure of a data communication apparatus according to a tenth embodiment of the present invention. In FIG. 34, the data communication apparatus according to the tenth embodiment is different from the data communication apparatus according to the first embodiment (FIG. 1) in that a data transmitting apparatus 16105 further has a base N encoding part 131 and a data receiving apparatus 106205 further has a base N decoding part 220.

Hereinafter, the data communication apparatus according to the tenth embodiment will be explained with respect mainly to the base N encoding part 131 and the base N decoding part 220. Since the structure of the present embodiment corresponds to that of the first embodiment (FIG. 1), the blocks performing the same operations are denoted by the same reference characters, and descriptions thereof are omitted.

Figure 35:
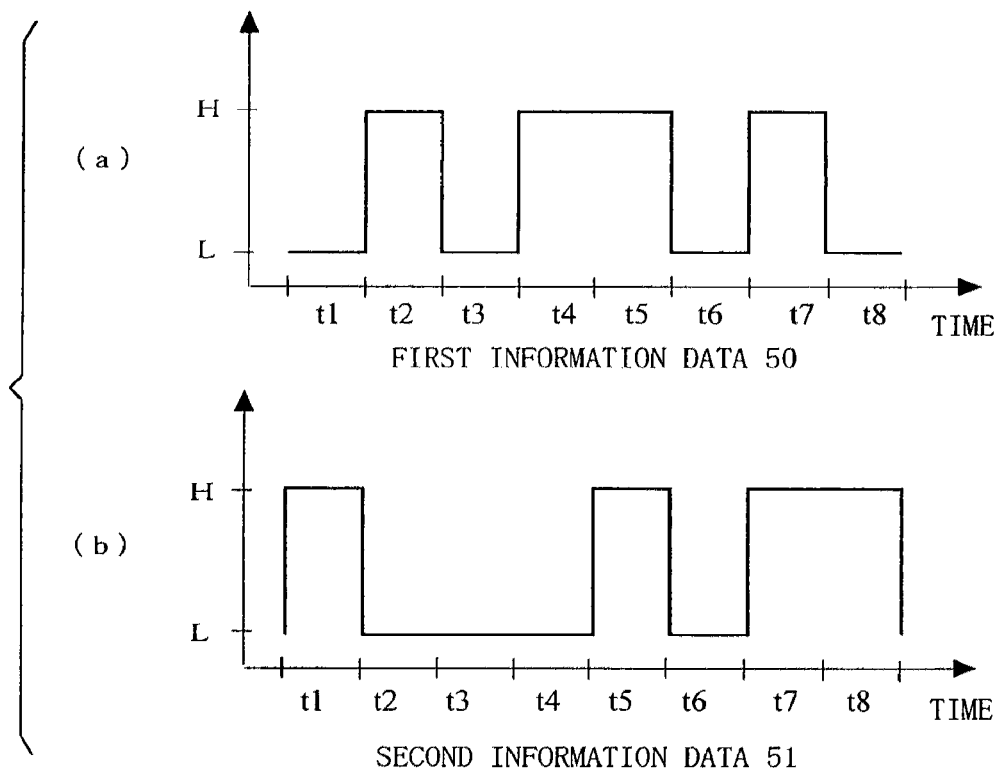
FIG. 35 is a view showing examples of the waveform of information data group inputted to a base N encoding part 131.

In the data transmitting apparatus 16105, an information data group including a plurality of pieces of information data is inputted to the base N encoding part 131. It is assumed that first information data 50 and second information data 51 are inputted as the information data group. FIG. 35 is a view showing examples of the waveform of the information data group inputted to the base N encoding part 131. FIG. 35(a) shows the first information data 50 inputted to the base N encoding part 131. FIG. 35(b) shows the second information data 51 inputted to the base N encoding part 131.

Figure 36:
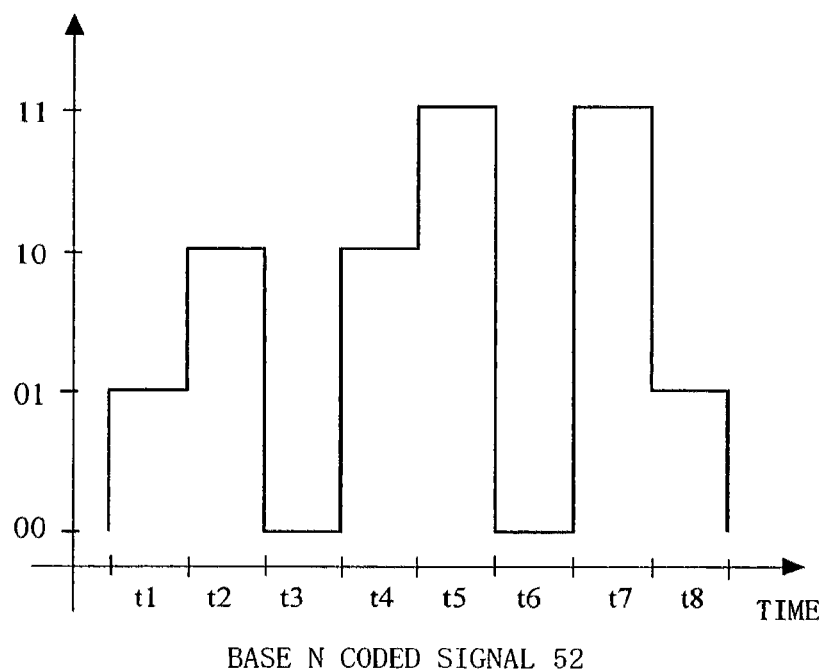
FIG. 36 is a view showing an example of the waveform of a base N encoded signal 52 outputted from the base N encoding part 131.

The base N encoding part 131 encodes the first information data 50 and the second information data 51 into a base N (in this example, N=4) number to thereby output them as a base N encoded signal 52 having predetermined multiple levels. N is an arbitrary natural number. Thereby, the base N encoding part 131 can increase, by log 2N times, the amount of information that can be transmitted per time slot. FIG. 36 is a view showing an example of the waveform of the base N encoded signal 52 outputted from the base N encoding part 131. Referring to FIG. 36, for example, the base N encoding part 131 can output the base N encoded signal 52 having multiple levels of four steps by assigning a multiple level 00 when the combination of logics in the first information data 50 and the second information data 51 is {L, L}, a multiple level 01 when the combination is {L, H}, a multiple level 10 when the combination is {H, L}, and a multiple level 11 when the combination is {H, H}. The base N encoded signal 52 outputted from the base N encoding part 131 and the multi-level code sequence 12 outputted from the first multi-level code generating part 111*a* (see FIG. 2(*b*)) are inputted to the multi-level processing part 111*b*.

Figure 37:
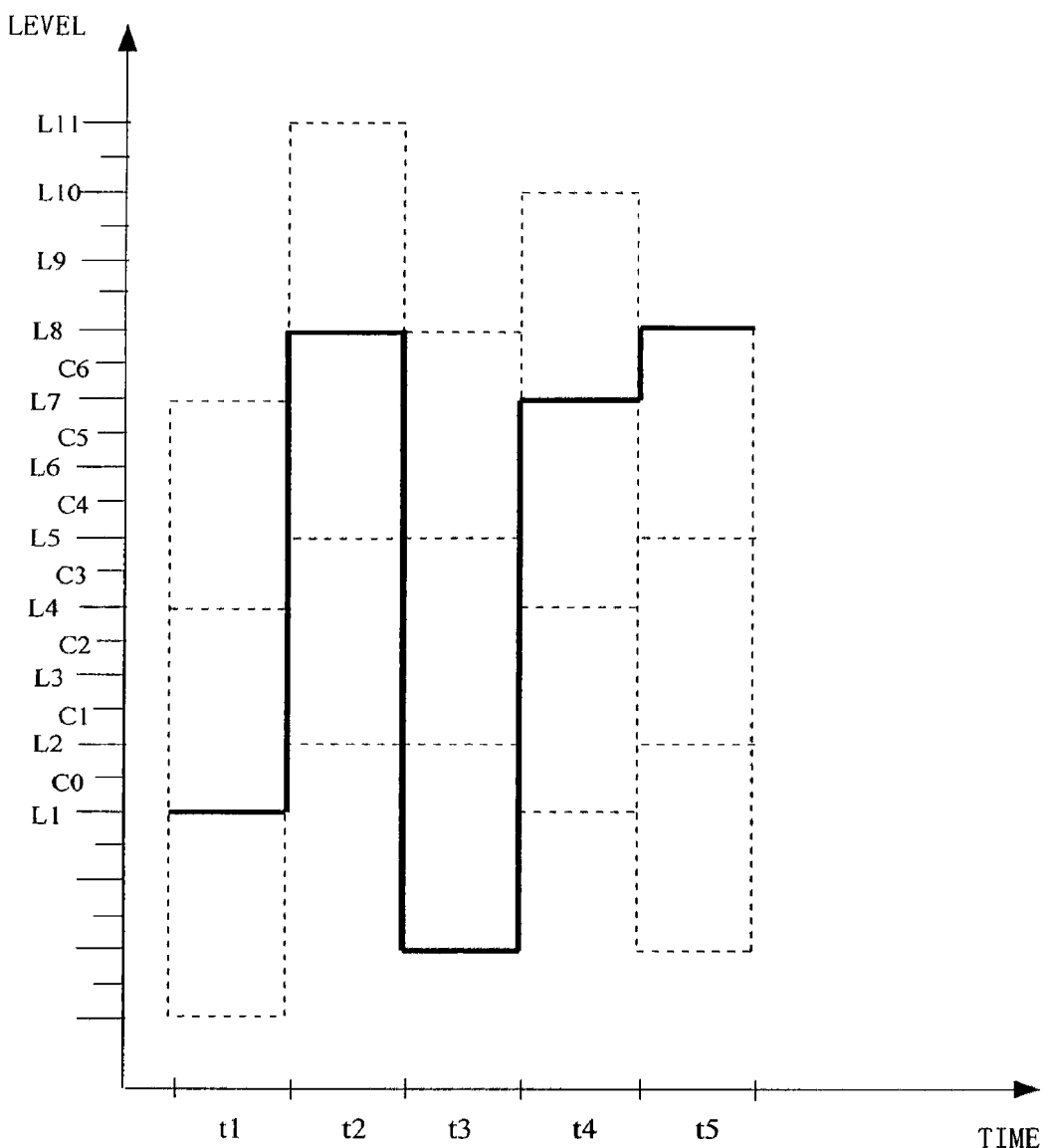
FIG. 37 is a view showing an example of the waveform of the multi-level signal 13 outputted from a multi-level processing part 111$b$.

The multi-level processing part 111*b* combines the base N encoded signal 52 and the multi-level code sequence 12 by a predetermined procedure, and outputs the composite signal as the multi-level signal 13. For example, the multi-level processing part 111*b* generates the multi-level signal 13 by adding the base N encoded signal 52 with the level of the multi-level code sequence 12 as the bias level. Alternatively, the multi-level processing part 111*b* may generate the multi-level signal 13 by amplitude-modulating the multi-level code sequence 12 by the base N encoded signal 52. FIG. 37 is a view showing an example of the waveform of the multi-level signal 13 outputted from the multi-level processing part 111*b*. In FIG. 37, the multiple levels of the multi-level signal 13 fluctuate in four steps at predetermined level intervals (in this case, intervals of three levels). The dotted lines show the ranges where the multiple levels of the multi-level signal 13 fluctuate, with reference to the bias level (multi-level code sequence 12).

The multi-level signal 13 outputted from the multi-level processing part 111*b* is inputted to the modulating part 112. The modulating part 112 modulates the multi-level signal 13 into a signal format suitable for the transmission path 110, and transmits the modulated signal to the transmission path 110 as the modulated signal 14. For example, when the transmission path 110 is an optical transmission line, the modulating part 12 converts the multi-level signal 13 into an optical signal.

Figure 38:
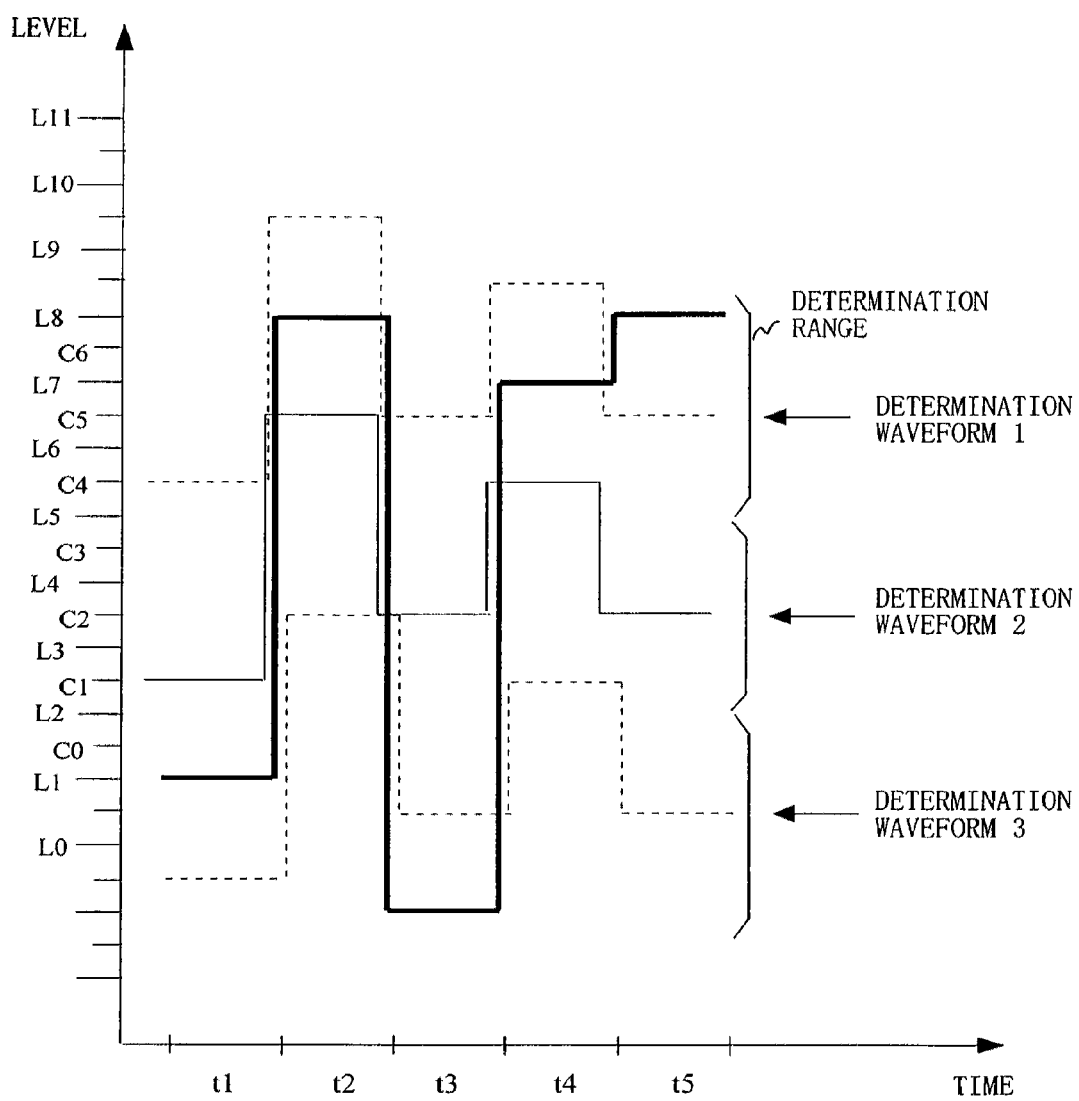
FIG. 38 is a view explaining an example of the discrimination of the multi-level signal 15 by a multi-level discriminating part 212$b$.

In a data receiving apparatus 16205, the demodulating part 211 receives the modulated signal 14 via the transmission path 110. The demodulating part 211 demodulates the modulated signal 14, and outputs the multi-level signal 15. The multi-level signal 15 is inputted to the multi-level discriminating part 212*b*. The multi-level discriminating part 212*b* discriminates the multi-level signal 15 by use of the multi-level code sequence 17 outputted from the second multi-level code generating part 212*a* to thereby output a base N encoded signal 53. FIG. 38 is a view explaining an example of the discrimination of the multi-level signal 15 by the multi-level discriminating part 212*b*. In FIG. 38, the thick solid line represents the waveform of the multi-level signal 15, and the thin solid line and the dotted lines represent the determination waveforms for discriminating the multi-level signal 15. The thin solid line (determination waveform 2 ) is the waveform of the multi-level code sequence 17.

Referring to FIG. 38, the multi-level discriminating part 212*b* generates a waveform (determination waveform 1) which is the multi-level code sequence 17 that is shifted upward by a predetermined level interval with the multi-level code sequence 17 (determination waveform 2) as the center and a waveform (determination waveform 3) which is the multi-level code sequence 17 that is shifted downward by the predetermined level interval with the multi-level code sequence 17 as the center. The predetermined level interval is predetermined between the multi-level discriminating part 212*b* and the multi-level processing part 111*b* in the data transmitting apparatus 16105, and in this example, it is an interval of three levels. The multi-level discriminating part 212*b* discriminates the multi-level signal 151 by using the determination waveforms 1 to 3.

At the time slot t1, the multi-level discriminating part 212*b* compares the determination waveform 1 and the multi-level signal 15, and determines that the multi-level signal 15 is lower in level than the determination waveform 1. Moreover, the multi-level discriminating part 212*b* compares the determination waveform 2 and the multi-level signal 15, and determines that the multi-level signal 15 is lower in level than the determination waveform 2. Moreover, the multi-level discriminating part 212*b* compares the determination waveform 3 and the multi-level signal 15, and determines that the multi-level signal 15 is higher in level than the determination waveform 3. That is, the multi-level discriminating part 212*b* determines that the multi-level signal 15 is {Low, Low, High} at the time slot t1. Likewise, at the time slot t2, the multi-level discriminating part 212*b* determines that the multi-level signal 15 is {Low, High, High} at the time slot t2, and determines that the multi-level signal 15 is {Low, Low, Low} at the time slot t3. Although omitted, the operations at the time slot t4 and subsequent time slots are similar.

Then, the multi-level discriminating part 212*b* associates the numbers of Low's and High's in the determination with the multiple levels of the base N encoded signal 52 to thereby reproduce the base N encoded signal 52. For example, by associating {Low, Low, Low} with the multiple level 00, {Low, Low, High} with the multiple level 01, {Low, High, High} with the multiple level 10, and {High, High, High} with the multiple level 11, the multi-level discriminating part 212*b* can reproduce the base N encoded signal 53. The base N encoded signal 53 reproduced by the multi-level discriminating part 212*b* is inputted to the base N decoding part 220.

The base N decoding part 220 decodes the base N encoded signal 52, and outputs it as the information data group. Specifically, the base N decoding part 220 performs an operation opposite to that performed by the base N encoding part 131 to thereby output first information data 54 and second information data 55 from the base N encoded signal 52.

Figure 39:
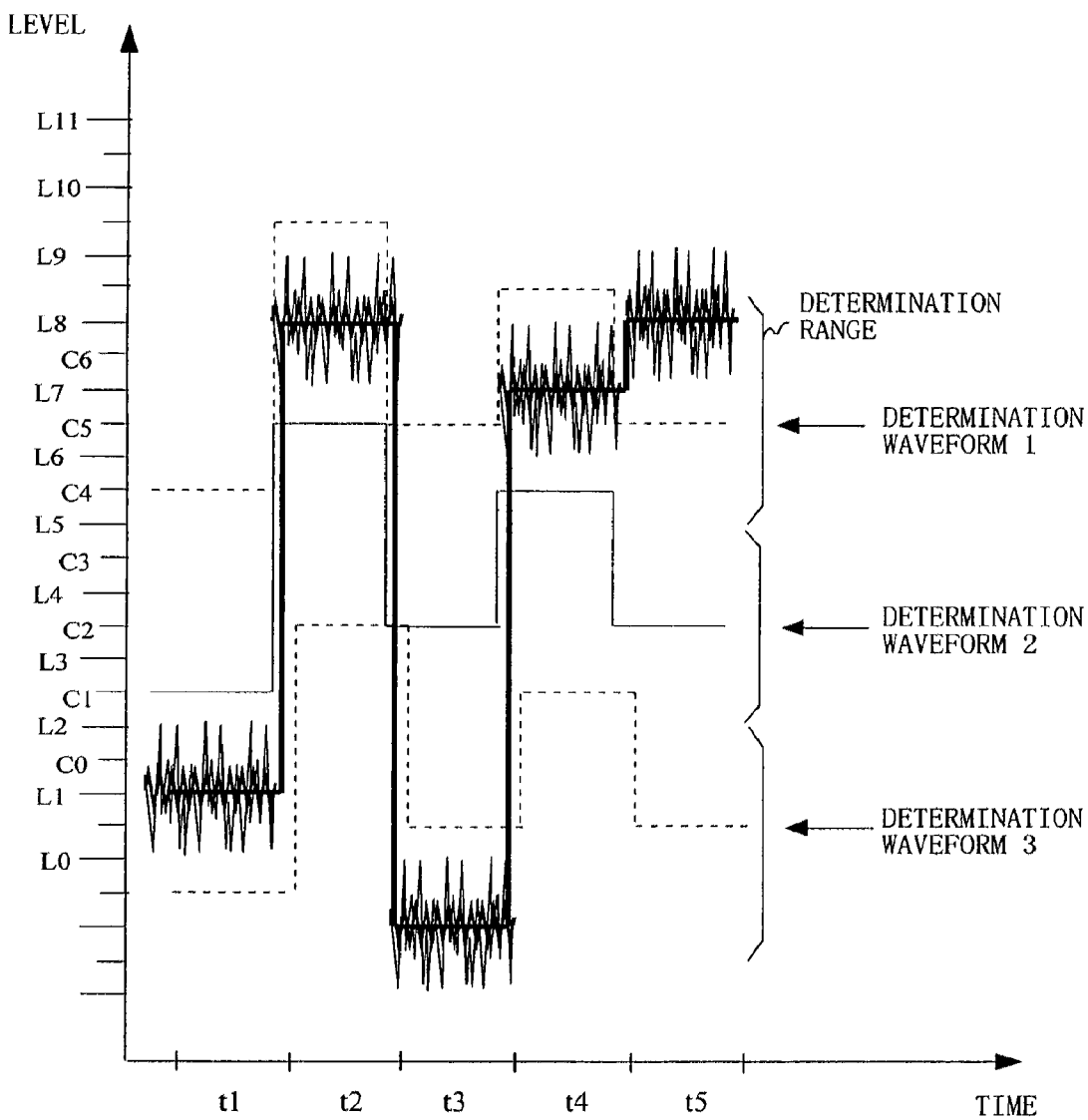
FIG. 39 is a view showing the waveform of the multi-level signal 15 on which noise is combined.

Next, wiretapping of the modulated signal 14 by a third party will be explained. Since the first key information 11 is not shared between the third party and the data transmitting apparatus 16105 like the case described in the first embodiment, the third party cannot reproduce the first information data 54 and the second information data 55 from the wire-tapped modulated signal 14. In actual transmission systems, noise is caused by various factors, and this noise is combined on the modulated signal 14. That is, noise is combined also on the multi-level signal 15 which is the modulated signal 14 that is demodulated. FIG. 39 is a view showing the waveform of the multi-level signal 15 on which noise is combined. Referring to FIG. 39, the data communication apparatus according to the tenth embodiment can make wiretapping more difficult by inducing discrimination errors in the third party's brute force attack using all the threshold values because of the noise combined on the multi-level signal 15 like the case described in the first embodiment.

As described above, according to the present invention, the base N encoding part 131 converts the information data group all together into the base N encoded signal 52, and the base N decoding part 220 reproduces the information data group all together from the base N encoded signal 53. Thereby, in the data communication apparatus according to the present embodiment, the amount of information that can be transmitted per time slot can be made larger than in the data communication apparatus according to the first embodiment. Moreover, by converting the information data group into the base N encoded signal 52, data transmission with higher stealthiness can be realized.

(Eleventh Embodiment)

Figure 40:
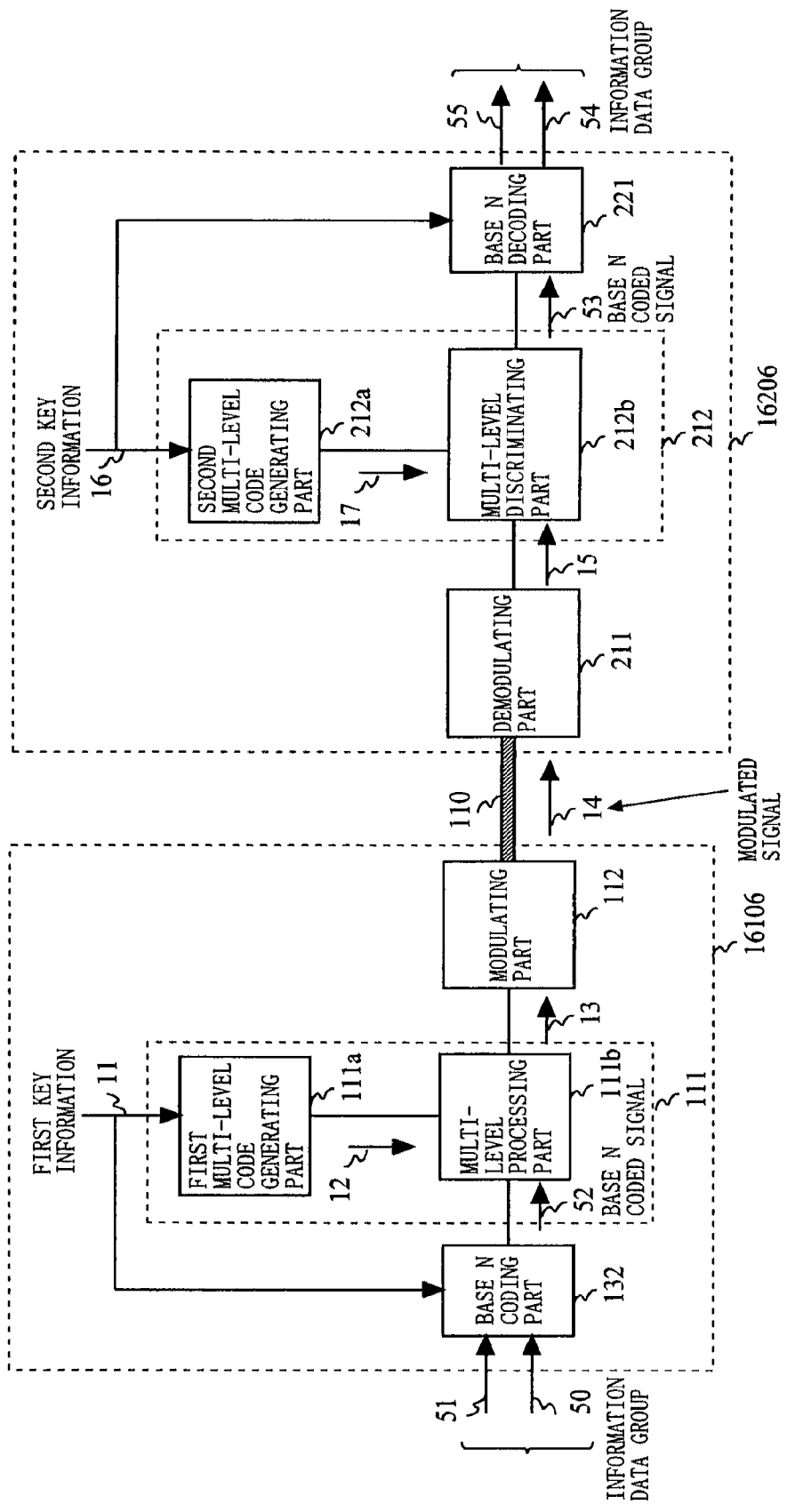
FIG. 40 is a view showing an example of the structure of a data communication apparatus according to an eleventh embodiment of the present invention.

FIG. 40 is a block diagram showing an example of the structure of a data communication apparatus according to an eleventh embodiment of the present invention. In FIG. 40, the data communication apparatus according to the eleventh embodiment is different from that of the tenth embodiment (FIG. 34) in the operations of the base N encoding part 132 and the base N decoding part 221. In the eleventh embodiment, the base N encoding part 132 generates the base N encoded signal 52 from the information data group based on the first key information 11. Moreover, the base N decoding part 221 generates the information data group from the base N encoded signal 53 based on the second key information 16. Hereinafter, the data communication apparatus according to the eleventh embodiment will be explained with respect mainly to the base N encoding part 132 and the base N decoding part 221. Since the structure of the present embodiment corresponds to that of the tenth embodiment (FIG. 34), the blocks performing the same operations are denoted by the same reference characters, and descriptions thereof are omitted.

In a data transmitting apparatus 16106, the first key information 11 is inputted to the base N encoding part 132. The base N encoding part 132 generates the base N encoded signal 52 from the information data group based on the first key information 11. For example, the base N encoding part 132 changes the correspondence between the combination of logics in the first information data 50 and the second information data 51 and the multiple levels of the base N encoded signal 52 by the first key information 11. The base N encoded signal 52 outputted from the base N encoding part 132 is inputted to the multi-level processing part 111b.

In a data receiving apparatus 16206, the base N encoded signal 53 outputted from the multi-level discriminating part 212b is inputted to the base N decoding part 221. Moreover, the second key information 16 is inputted to the base N decoding part 221. The base N decoding part 221 outputs the information data group from the base N encoded signal 53 based on the second key information 16. Specifically, the base N decoding part 221 performs an operation opposite to that performed by the base N encoding part 132 to thereby output the first information data 54 and the second information data 55 from the base N encoded signal 53.

As described above, according to the present embodiment, the base N encoding part 132 generates the base N encoded signal 52 from the information data group based on the first key information 11, and the base N decoding part 221 reproduces the information data group from the base N encoded signal 53 based on the second key information 16 by the operation opposite to that performed by the base N encoding part 132. Thereby, the data communication apparatus according to the present embodiment can realize data communication the wiretapping of which is more difficult than in the data communication apparatus according to the tenth embodiment.

Figure 41:
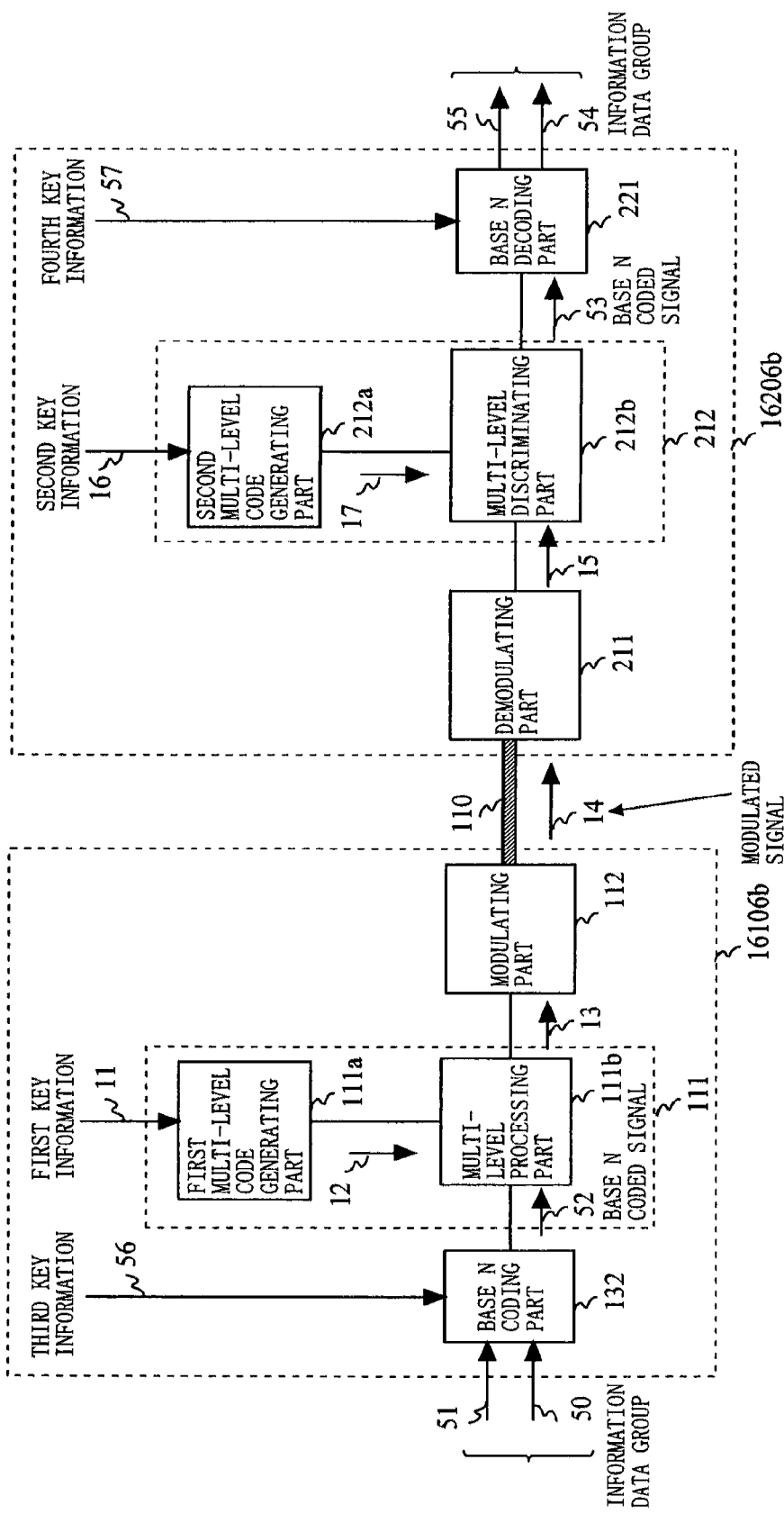
FIG. 41 is a block diagram showing another example of the structure of the data communication apparatus according to an eleventh embodiment of the present invention.

In the data communication apparatus according to the eleventh embodiment, the base N encoding part 132 may generate the base N encoded signal 52 from the information data group by using third key information 56 different from the first key information 11. Likewise, the base N decoding part 221 may reproduce the information data group from the base N encoded signal 53 by using fourth key information 57 different from the second key information 16 (see FIG. 41). Here, the third key information 56 and the fourth key information 57 are the same key information. Thereby, in the data communication apparatus according to the present embodiment, the key information used by the multi-level processing part 111b and the key information used by the base N encoding part 132 can be made separate, so that data communication the wiretapping of which is more difficult can be realized.

(Twelfth Embodiment)

Figure 42:
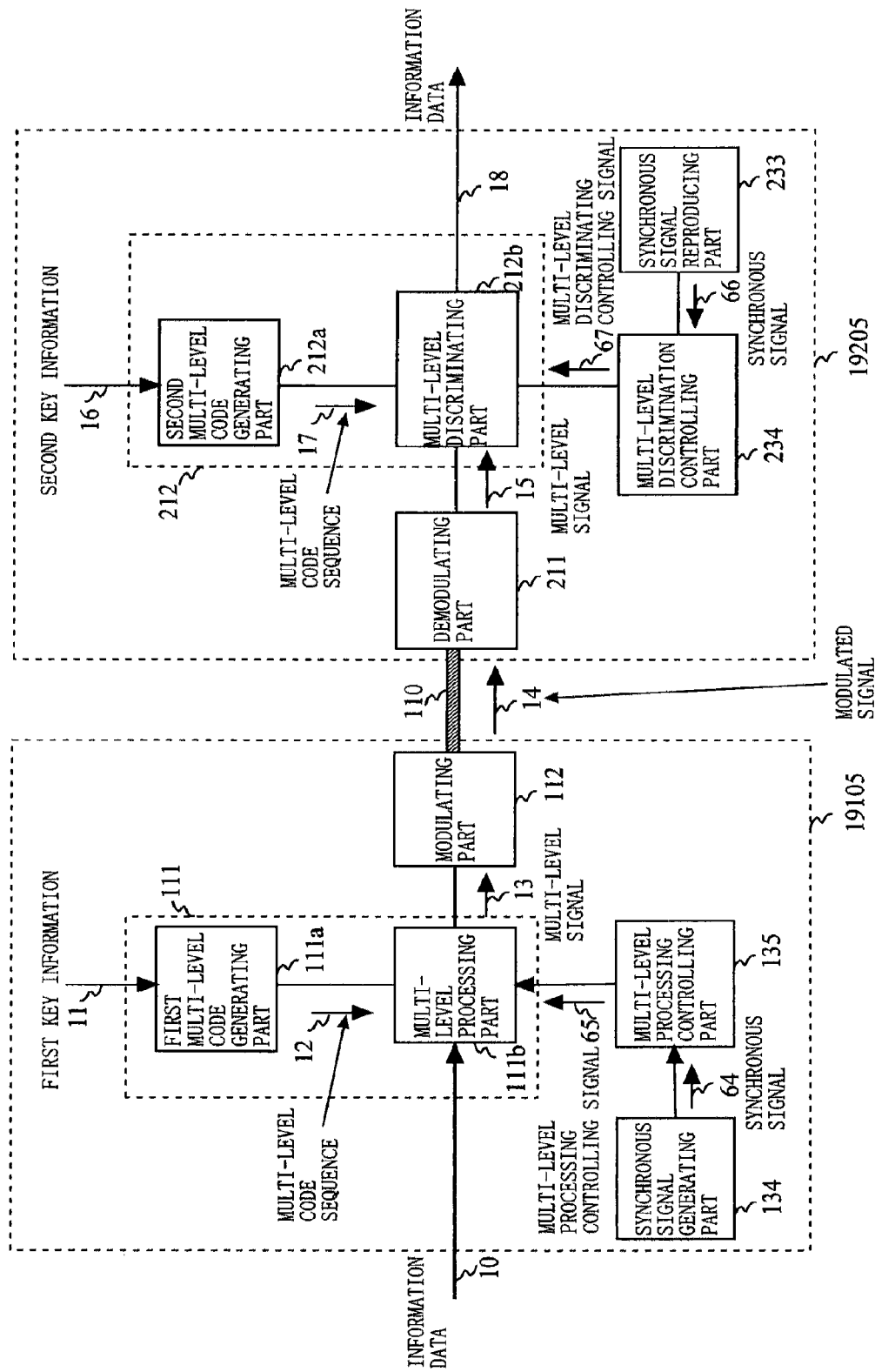
FIG. 42 is a block diagram showing the structure of a data communication apparatus according to a twelfth embodiment of the present invention.

FIG. 42 is a block diagram showing the structure of a data communication apparatus according to a twelfth embodiment of the present invention. In FIG. 42, the data communication apparatus according to the twelfth embodiment is different from that of the first embodiment (FIG. 1) in that a data transmitting apparatus 19105 further has a synchronous signal generating part 134 and a multi-level processing controlling part 135 and a data receiving apparatus 19205 further has a synchronous signal reproducing part 233 and a multi-level discrimination controlling part 234.

Figure 43:
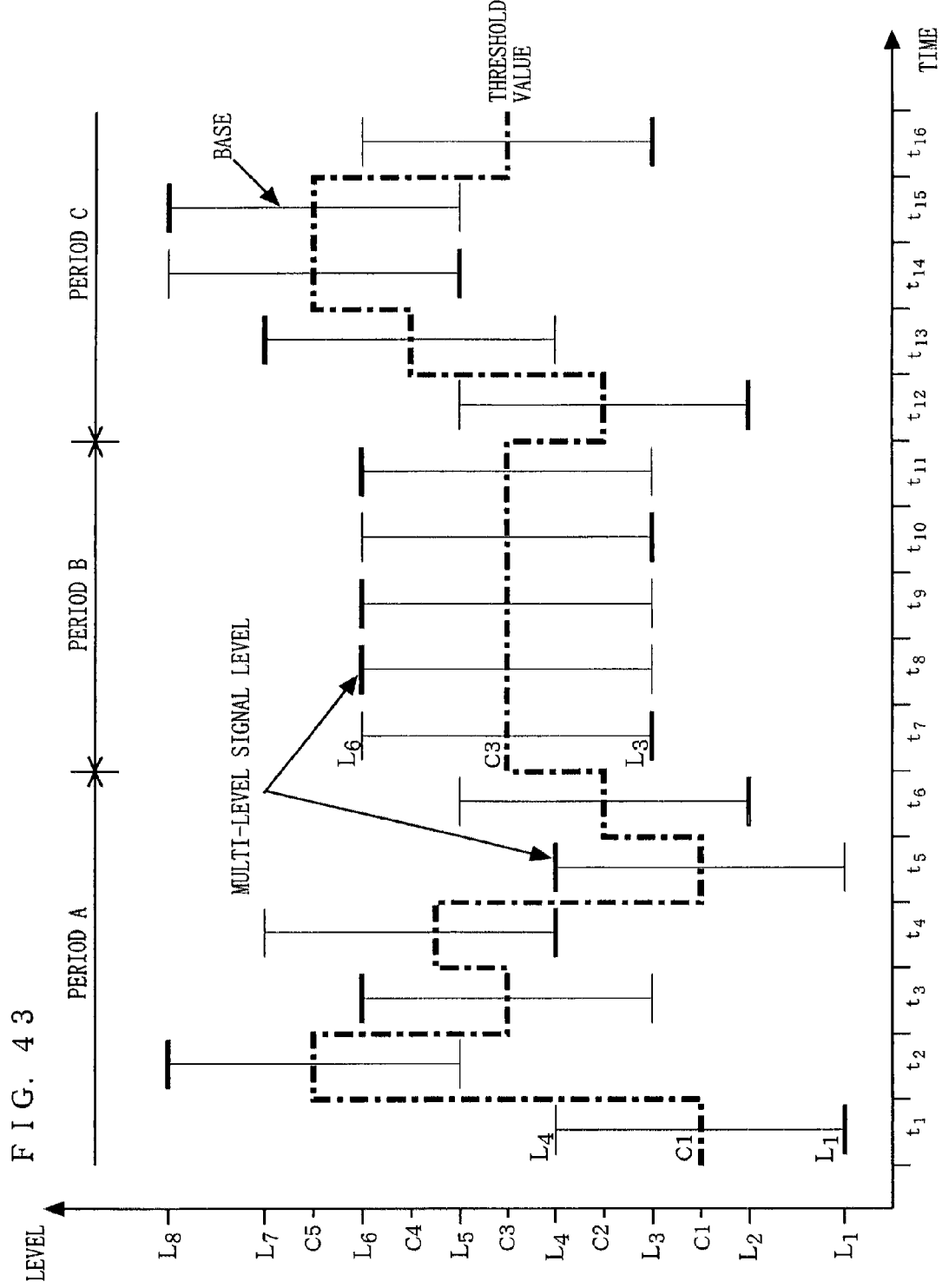
FIG. 43 is a schematic view for explaining the signal waveform outputted from a multi-level encoding part 111.

FIG. 43 is a schematic view for explaining the signal waveform outputted from the multi-level encoding part 111. Hereinafter, the data communication apparatus according to the fifth embodiment will be explained by using FIGS. 42 and 43. Since the structure of the present embodiment corresponds to that of the first embodiment (FIG. 1), the blocks performing the same operations are denoted by the same reference characters, and descriptions thereof are omitted.

In FIG. 42, the synchronous signal generating part 134 generates a synchronous signal 64 of a predetermined period, and outputs it to the multi-level processing controlling part 135. The multi-level processing controlling part 135 generates a multi-level processing control signal 65 based on the synchronous signal 64, and outputs it to the multi-level processing part 111b. The multi-level processing control signal 65 is a signal that specifies the number of levels (hereinafter, referred to as level number) of the multi-level signal 13 outputted by the multi-level processing part 111b. The multi-level processing part 111b generates a multi-level signal from the information data 10 based on the multi-level processing control signal 65 and the multi-level code sequence 12, and outputs, as the multi-level signal 13, a signal which is the generated multi-level signal the level number of which has been switched. For example, as shown in FIG. 43, the multi-level processing part 111b outputs a multi-level signal of the level number "8" in the periods A and C, and outputs a signal of a level number "2" in the period B. More specifically, the multi-level processing part 111b may output a composite signal of the information data 10 and the multi-level code sequence 12 in the periods A and C and output the information data 10 as it is in the period B.

The synchronous signal reproducing part 233 reproduces a synchronous signal 66 corresponding to the synchronous signal 64, and outputs it to the multi-level discrimination controlling part 234. The multi-level discrimination controlling part 234 generates a multi-level discrimination control signal 67 based on the synchronous signal 66, and outputs it to the multi-level discriminating part 212b. The multi-level discriminating part 212b performs discrimination based on the multi-level discrimination control signal 67 while switching the threshold value (multi-level code sequence 17) for the multi-level signal 15 outputted from the demodulating part 211, and reproduces the information data 18. For example, as shown in FIG. 43, the multi-level discriminating part 212b discriminates the multi-level signal of the level number "8" in the periods A and C by using, as the threshold value, the multi-level code sequence 17 the level of which successively changes, and discriminates the binary signal based on a predetermined fixed threshold value in the period B.

While in FIG. 43, the threshold value (average level) for the binary signal in the period B coincides with the average level (C3) of the multi-level signals in the periods A and C, the present invention is not limited thereto; it may be set to any level. While in FIG. 43, the amplitude of the binary signal in the period B coincides with the amplitude (information amplitude) of the information data 10, the present invention is not limited thereto; it may be set to any amplitude as long as it has a magnitude that can be discriminated by a fixed threshold value by the multi-level discriminating part 212b. While in FIG. 43, the transfer rates in the periods A and C and in the period B are the same, the present invention is not limited thereto; they may be different transfer rates. In particular, it is preferable that the smaller the level number is, the higher the transfer rate is.

Moreover, in FIG. 43, the multi-level processing part 111b outputs the multi-level signal 13 where switching is made between the multi-level signal of the level number "8" and the binary signal. However, the combination of level numbers of the multi-level signal 13 is not limited thereto; it may be any combination of level numbers. For example, the multi-level processing part 111b may output the multi-level signal 13 where switching is made between the multi-level signal of the level number "8" and a multi-level signal of the level number "4." Further, in the data communication apparatus shown in FIG. 42, the transfer rates of the pieces of information data 10 and 18, the multi-level code sequences 12 and 17, and the multi-level signals 13 and 15 may be changed according to the value of the level number.

As described above, according to the present embodiment, by causing a decisive deterioration in the reception signal quality in wiretapping by third parties by encoding the information data to be transmitted as a multi-level signal, a safe communication channel only for specific receivers is ensured, and by reducing the level number as appropriate, communication not requiring safety is selectively realized. Thereby, a stealth communication service and a general communication service can both be provided by using the same modulating and demodulating systems and transmitting system, and an efficient communication apparatus can be provided.

(Thirteenth Embodiment)

Figure 44:
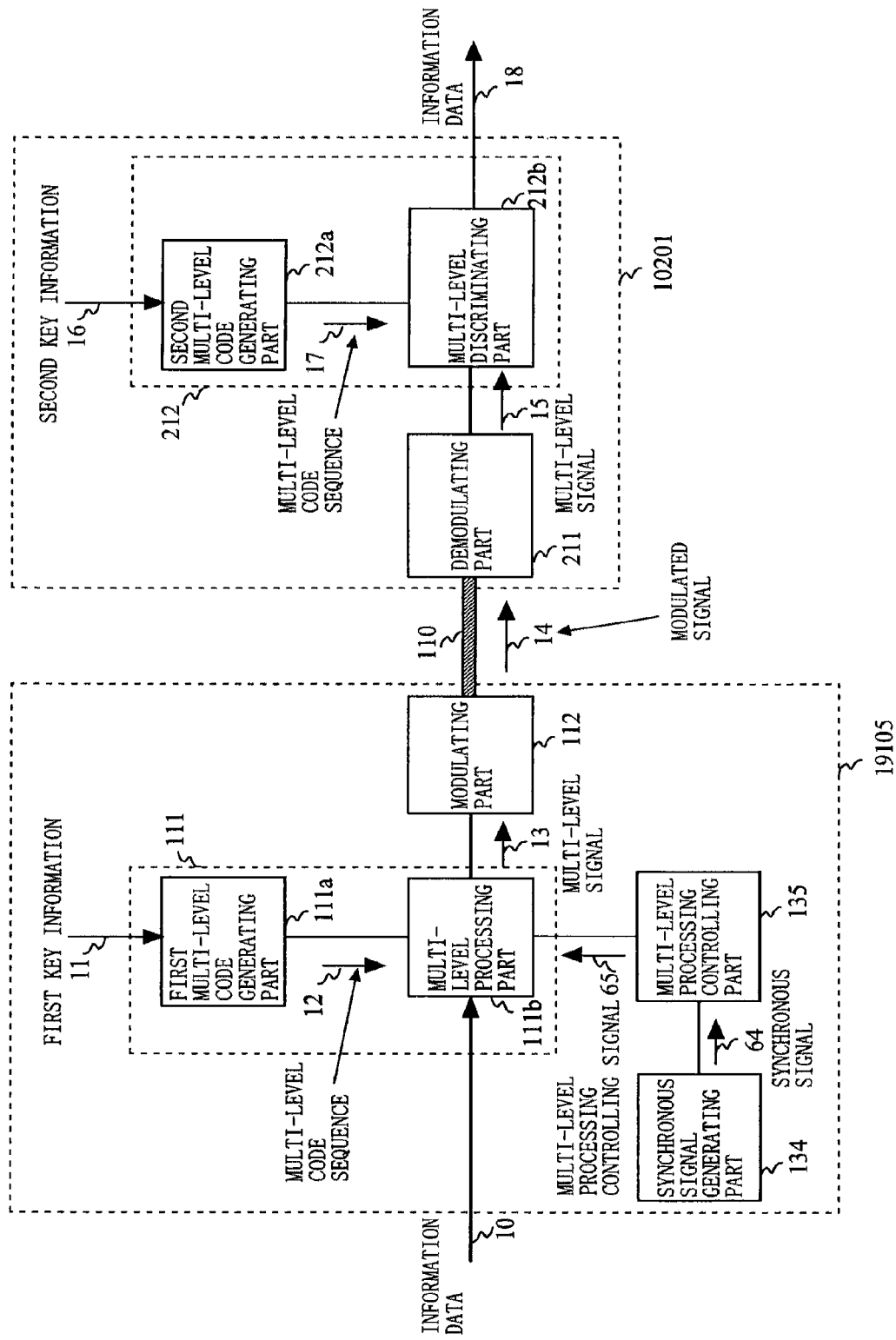
FIG. 44 is a block diagram showing the structure of a data communication apparatus according to a thirteenth embodiment of the present invention.

FIG. 44 is a block diagram showing the structure of a data communication apparatus according to a thirteenth embodiment of the present invention. In FIG. 44, the data communication apparatus according to the thirteenth embodiment is different from that of the twelfth embodiment (FIG. 42) in that the data receiving apparatus 10201 does not have the synchronous signal reproducing part 233 and the multi-level discrimination controlling part 234.

Figure 45:
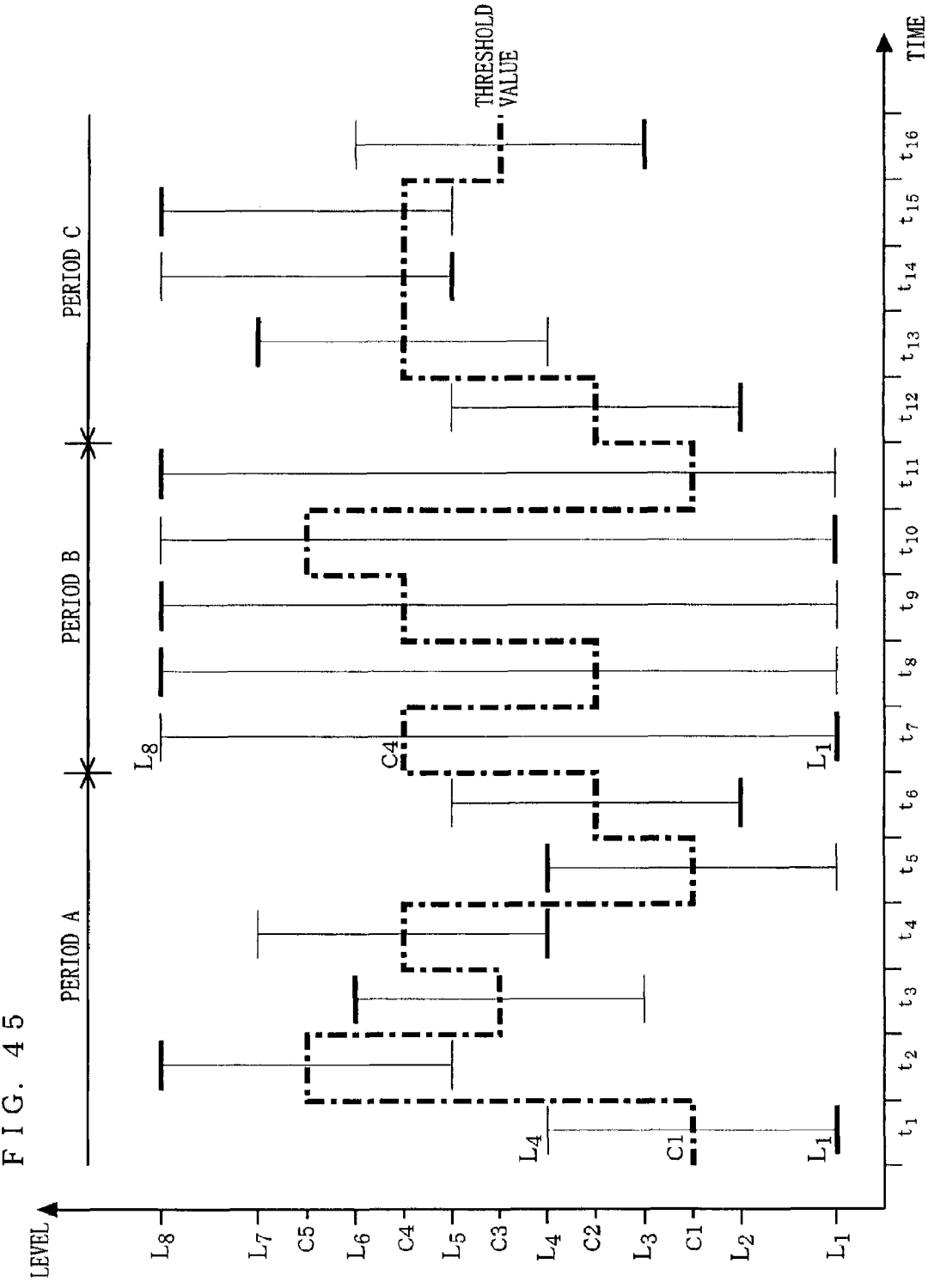
FIG. 45 is a schematic view explaining the transmission signal waveform of the data communication apparatus according to the thirteenth embodiment of the present invention.

FIG. 45 is a schematic view for explaining the signal waveform outputted from the multi-level encoding part 111. Hereinafter, the data communication apparatus according to the thirteenth embodiment will be explained by using FIGS. 44 and 45. Since the structure of the present embodiment corresponds to that of the twelfth embodiment (FIG. 42), the blocks performing the same operations are denoted by the same reference characters, and descriptions thereof are omitted.

In FIG. 44, the multi-level processing part 111b outputs the multi-level signal 13 which is the output signal while switching the level number thereof, based on the multi-level processing control signal 65, and when the level number of the multi-level signal 13 is decreased, sets the amplitude of the multi-level signal so as to be large. For example, as shown in FIG. 45, while the level number is "8" in the periods A and C, in the period B, the level number is "2," and the amplitude is made sufficiently large. More specifically, the multi-level processing part 111b outputs the multi-level signal 13 while setting the amplitude of the binary signal in the period B so as to be equal to or larger than that of the multi-level signals in the period A and C.

The multi-level discriminating part 212b performs the discrimination (binary determination) of the multi-level signal 15 outputted from the demodulating part 211 by using the multi-level code sequence 17 as the threshold value irrespective of the level number, and reproduces the information data. For example, as shown in FIG. 45, in the periods A and C, the multi-level signal of the total level number "8" is discriminated by using, as the threshold value, the multi-level code sequence 17 the level of which successively changes, and in the period B, the binary signal is discriminated based on the multi-level code sequence 17.

As described above, according to the present embodiment, by causing a decisive deterioration in the reception signal quality in wiretapping by third parties by encoding the information data to be transmitted as the multi-level signal, a safe communication channel only for specific receivers is ensured, and by reducing the level number as appropriate and increasing the amplitude, the threshold value control at the time of reception of the multi-level signal is facilitated to thereby selectively realize communication not requiring safety with a simpler structure. Thereby, a stealth communication service and a general communication service can both be provided by using the same modulating and demodulating systems and transmitting system, and an efficient and economical communication apparatus can be provided.

(Fourteenth Embodiment)

Figure 46:
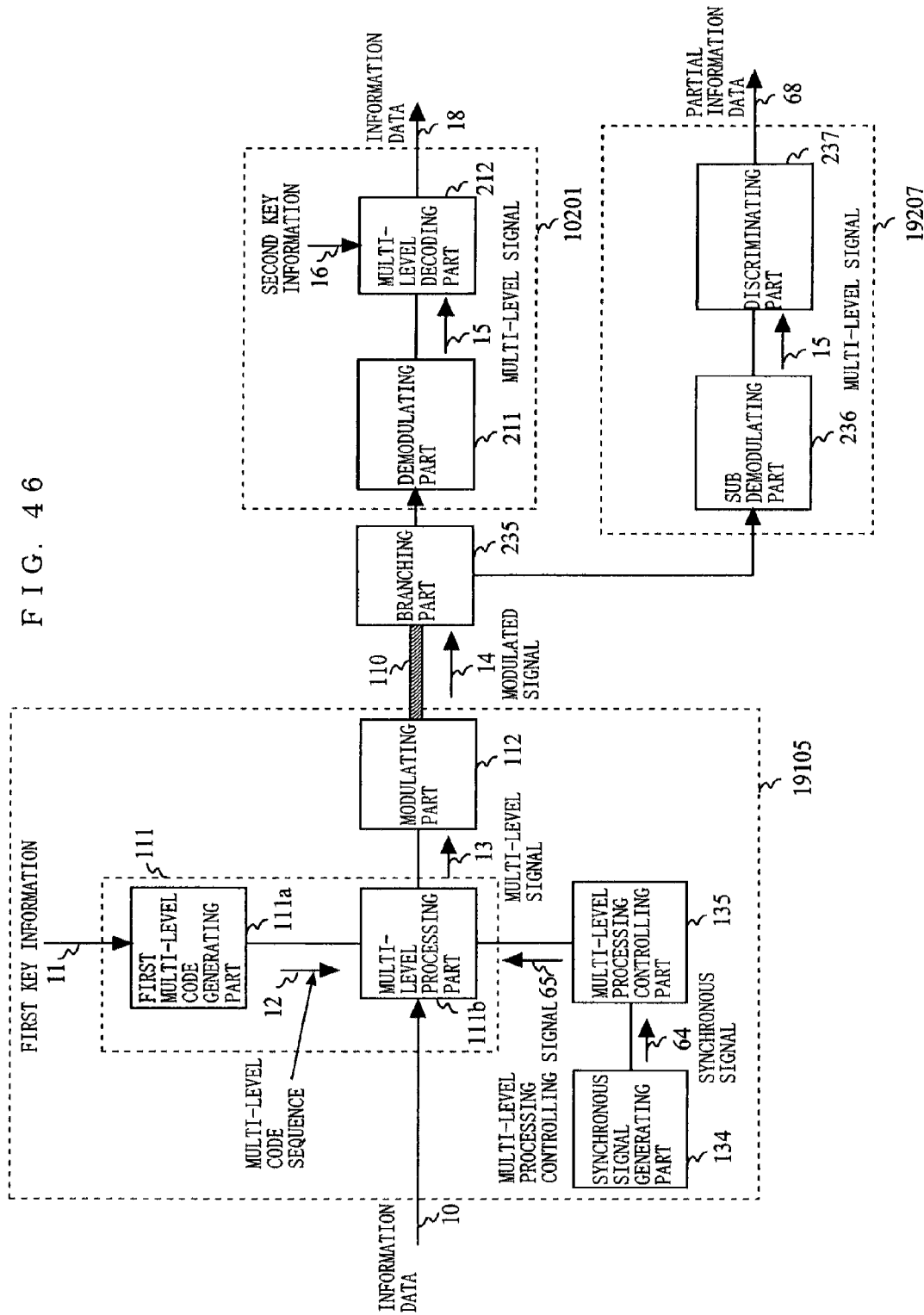
FIG. 46 is a block diagram showing the structure of a data communication apparatus according to a fourteenth embodiment of the present invention.

FIG. 46 is a block diagram showing the structure of a data communication apparatus according to a fourteenth embodiment of the present invention. In FIG. 46, the data communication apparatus according to the fourteenth embodiment is constituted by connecting a data transmitting apparatus 19105, the data receiving apparatus 10201 and a sub data receiving apparatus 19207 via the transmission path 110 and a branching part 235. The data communication apparatus according to the fourteenth embodiment is different from that of the thirteenth embodiment (FIG. 44) in that the branching part 235 and the sub data receiving apparatus 19207 are further provided. Although omitted in FIG. 46, the multi-level decoding part 212 includes the second multi-level code generating part 212a and the multi-level discriminating part 212b. Hereinafter, the data communication apparatus according to the fourteenth embodiment will be explained. Since the structure of the present embodiment corresponds to that of the thirteenth embodiment (FIG. 44), the blocks performing the same operations are denoted by the same reference characters, and descriptions thereof are omitted.

In FIG. 46, the data transmitting apparatus 19105 transmits the modulated signal 14 which is the multi-level signal shown in FIG. 45 that is modulated. The branching part 235 branches the modulated signal 14 transmitted via the transmission path 110 into a plural number m (m is an integer equal to or higher than 2; in FIG. 24, m=2), and outputs the branch signals. The data receiving apparatus 10201 is provided so as to correspond to a number n (n is an integer equal to or lower than m; in FIG. 46, n=1) of modulated signals among the number m of modulated signals outputted from the branching part 235. In the periods A and C, the data receiving apparatus 10201 demodulates and decodes the modulated signal based on the second key information 16 shared as the same key as the first key information 11, thereby reproducing the information data 18. The data receiving apparatus 10201 may discriminate the binary signal in the period B.

The sub data receiving apparatus 19207 is provided so as to correspond to a number m−n (in FIG. 46, m−n=2−1=1) among the number m of modulated signals outputted from the branching part 235. A sub demodulating part 236 demodulates the modulated signal, and reproduces the multi-level signal 15. An discriminating part 237 discriminates the multi-level signal 15 outputted from the corresponding sub demodulating part 236 based on a predetermined fixed threshold value, and reproduces the information data (partial information data 68) only in the period B shown in FIG. 45.

While in FIG. 46, the branch number m at the branching part 235 is 2, the data receiving apparatus 10201 is provided so as to correspond to a number n−1 of modulated signals among the number m of signals and the sub data receiving apparatus 19207 is provided so as to correspond to a number m−n=1 of modulated signals, the present invention is not limited thereto; the numbers may be set to any values as long as m≧n, and the corresponding number of data receiving apparatuses and sub data receiving apparatuses are provided.

As described above, according to the present embodiment, by causing a decisive deterioration in the reception signal quality in wiretapping by third parties by encoding the information data to be transmitted as the multi-level signal, a safe communication channel only for specific receivers is ensured and by reducing the level number as appropriate, a broadcast communication to an indefinite number of receivers is selectively realized. Thereby, a stealth communication service and a communication service such as a broadcast communication and a broadcast can be provided by using the same modulating and demodulating systems and transmitting system, and an efficient communication apparatus can be provided.

(Fifteenth Embodiment)

Figure 47:
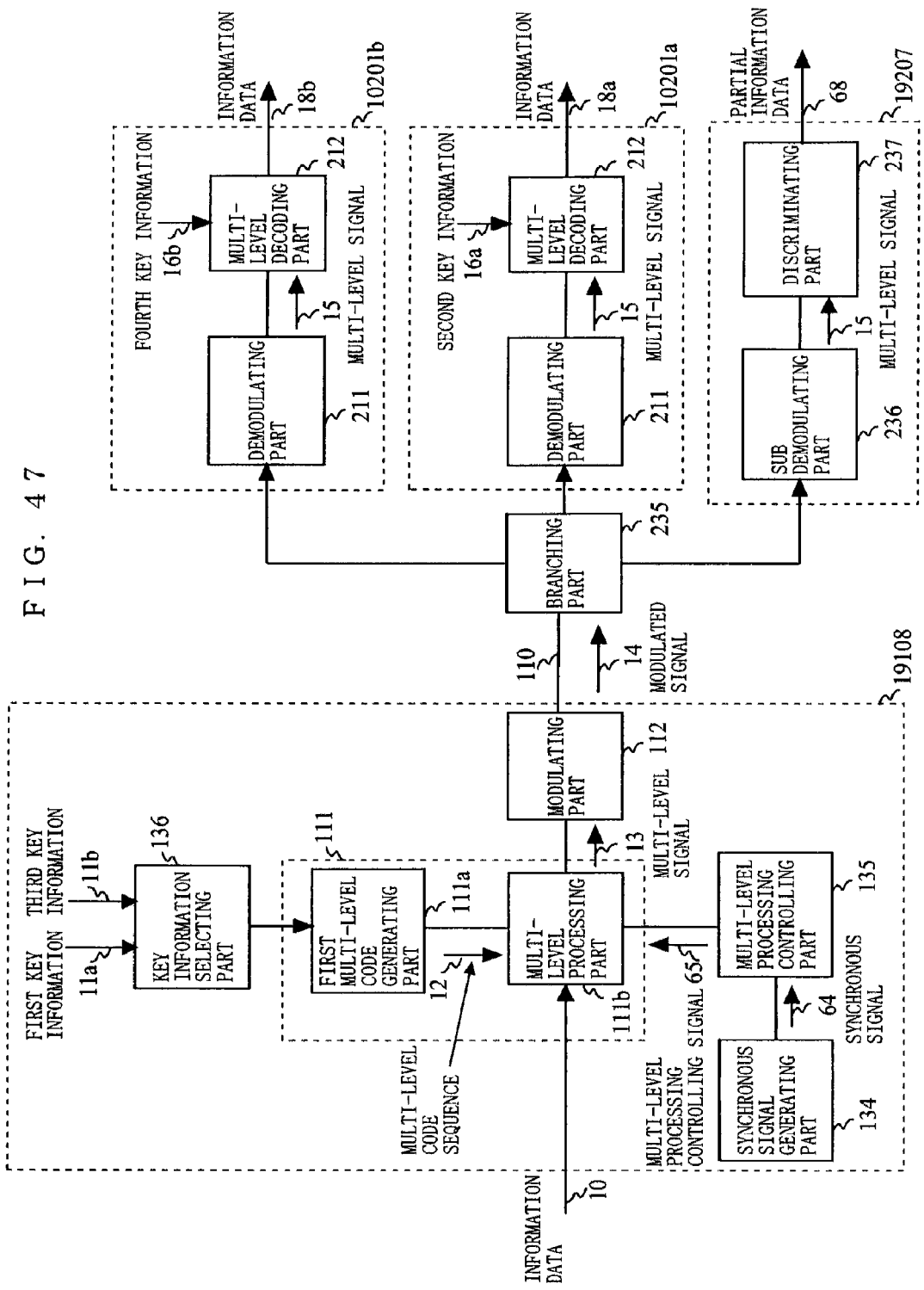
FIG. 47 is a block diagram showing the structure of a data communication apparatus according to a fifteenth embodiment of the present invention.

FIG. 47 is a block diagram showing the structure of a data communication apparatus according to a fifteenth embodiment of the present invention. In FIG. 47, the data communication apparatus according to the fifteenth embodiment is constituted by connecting a data transmitting apparatus 19108, a plurality of data receiving apparatuses 10201a and 10201b, and a sub data receiving apparatus 19207 via the transmission path 110 and the branching part 235. The data transmitting apparatus 19108 further has a key information selecting part 136 compared with the fourteenth embodiment (FIG. 46). Although omitted in FIG. 47, the multi-level decoding part 212 includes the second multi-level code generating part 212a and the multi-level discriminating part 212b. Hereinafter, the data communication apparatus according to the fifteenth embodiment will be explained. Since the structure of the present embodiment corresponds to that of the fourteenth embodiment (FIG. 46), the blocks performing the same operations are denoted by the same reference characters, and descriptions thereof are omitted.

In FIG. 47, the key information selecting part 136 selects one from among a plural number n of pieces of predetermined key information (in FIG. 47, n=2; first key information 11a and third key information 11b). The multi-level encoding part 111 generates the multi-level signal 13 as shown in FIG. 45 based on the selected key information. A number n of data receiving apparatuses (10201a and 10201b) are provided so as to correspond to the number n of modulated signals among a number m (in FIG. 47, m=3) of modulated signals branched and outputted by the branching part 235, and demodulate and decode the modulated signals based on second key information 16a and fourth key information 16b shared as the same key as the corresponding first key information 11a and third key information 11b, thereby reproducing the corresponding pieces of information data (18a and 18b).

Specifically, in FIG. 45, when the data transmitting apparatus 19108 generates the multi-level signal 13 by using the first key information 11a in the period A, the data receiving apparatus 10201a demodulates the modulated signal inputted in the period A, and reproduces the information data 18a by using the second key information 16a. When the data transmitting apparatus 19108 generates the multi-level signal 13 by using the third key information 11b in the period C, the data receiving apparatus 10201b demodulates the modulated signal inputted in the period C, and reproduces the information data 18b by using the fourth key information 16b. The data receiving apparatuses 10201a and 10201b may demodulate the modulated signal inputted in the period B to reproduce partial information data 58.

The sub data receiving apparatus 19207 is provided so as to correspond to a number m−n (in FIG. 47, m−n=3−2=1) of modulated signals among a number m of modulated signals outputted from the branching part 235, demodulates the modulated signals, discriminates them based on a predetermined fixed threshold value, and reproduces the information data (partial information data 58) only in the period B shown in FIG. 45.

While in FIG. 47, the branch number m at the branching part 235 is 3, the data receiving apparatus 10201 is provided so as to correspond to a number n−2 of modulated signals among the number m of signals and the sub data receiving apparatus 19207 is provided so as to correspond to a number m−n=1 of modulated signals, the present invention is not limited thereto; the numbers may be set to any values as long as m≧n, and the corresponding number of data receiving apparatuses and sub data receiving apparatuses are provided.

As described above, according to the present embodiment, by causing a decisive deterioration in the reception signal quality in wiretapping by third parties by encoding the information data to be transmitted as the multi-level signal, and by providing a plurality of pieces of key information and making switching therebetween for use, a safe communication channel only for specific receivers is ensured, and by reducing the level number as appropriate, a broadcast communication to an indefinite number of receivers is selectively realized. Thereby, a stealth communication service and a communication service such as a broadcast communication and a broadcast can be provided by using the same modulating and demodulating systems and transmitting system, and an efficient communication apparatus can be provided.

Figure 48A:
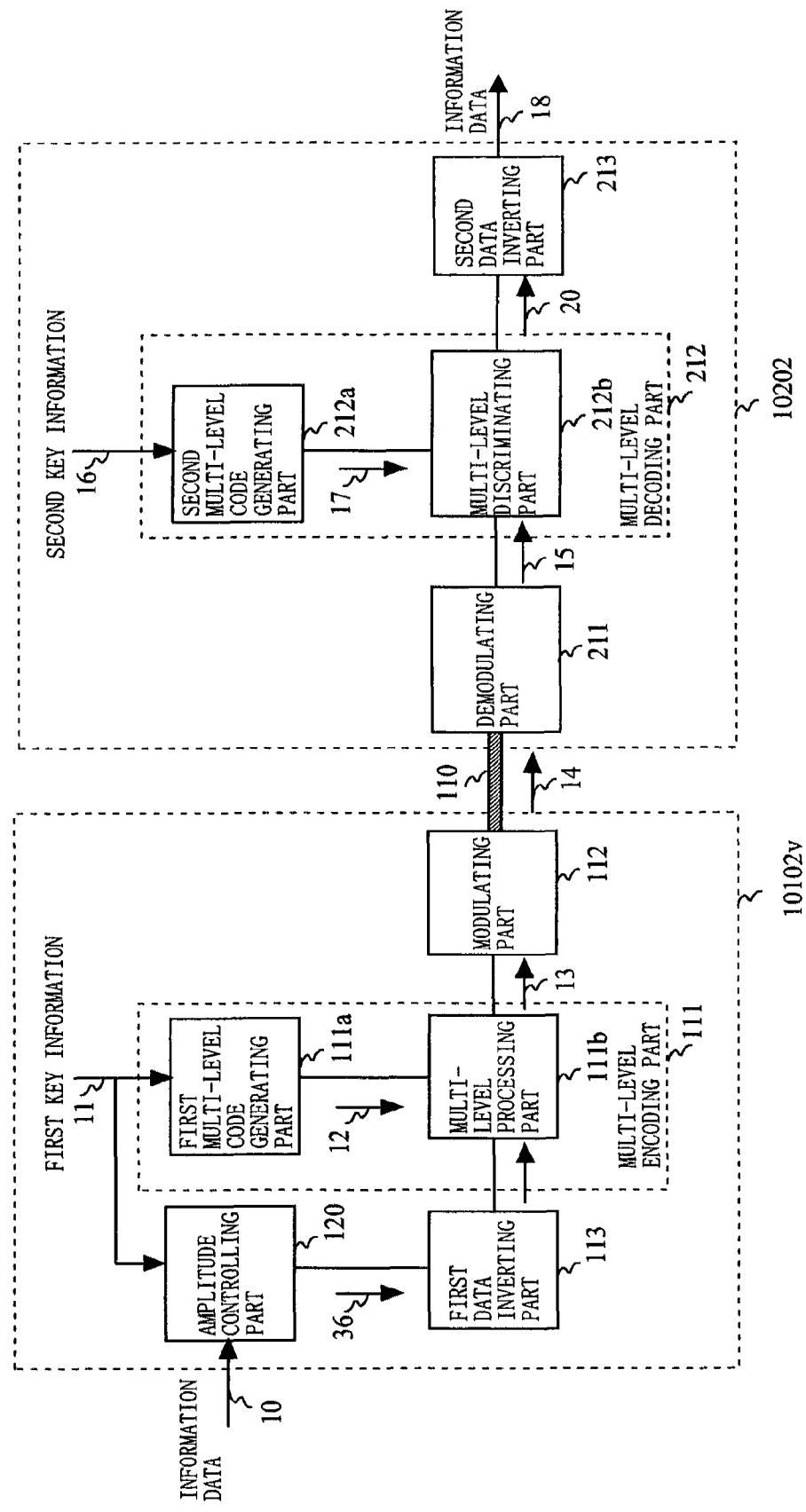
FIG. 48A is a block diagram showing an example of the structure of a data communication apparatus in which the characteristics of some of the embodiments of the present invention are combined.
Figure 48B:
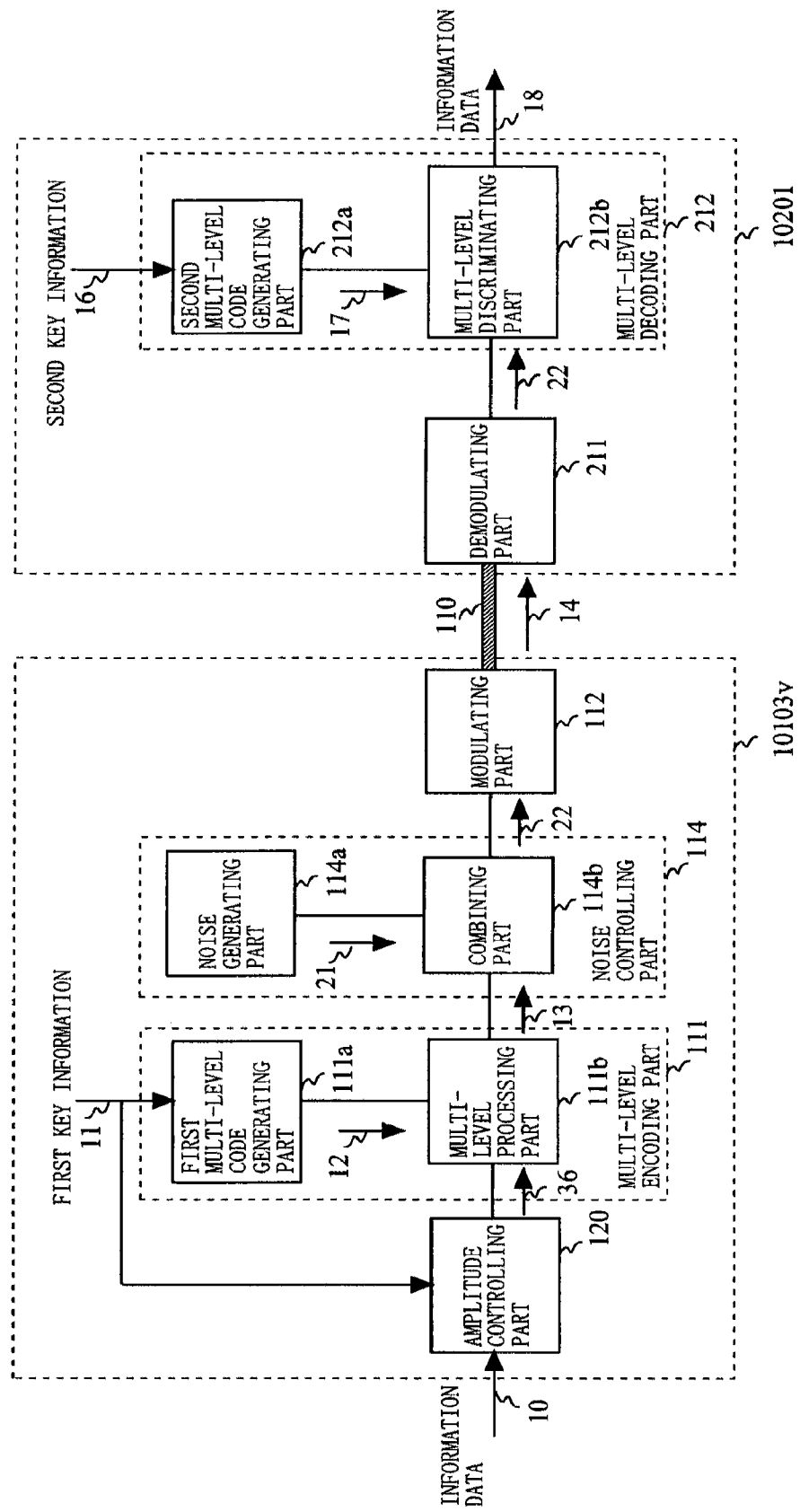
FIG. 48B is a block diagram showing an example of the structure of a data communication apparatus in which the characteristics of some of the embodiments of the present invention are combined.
Figure 48C:
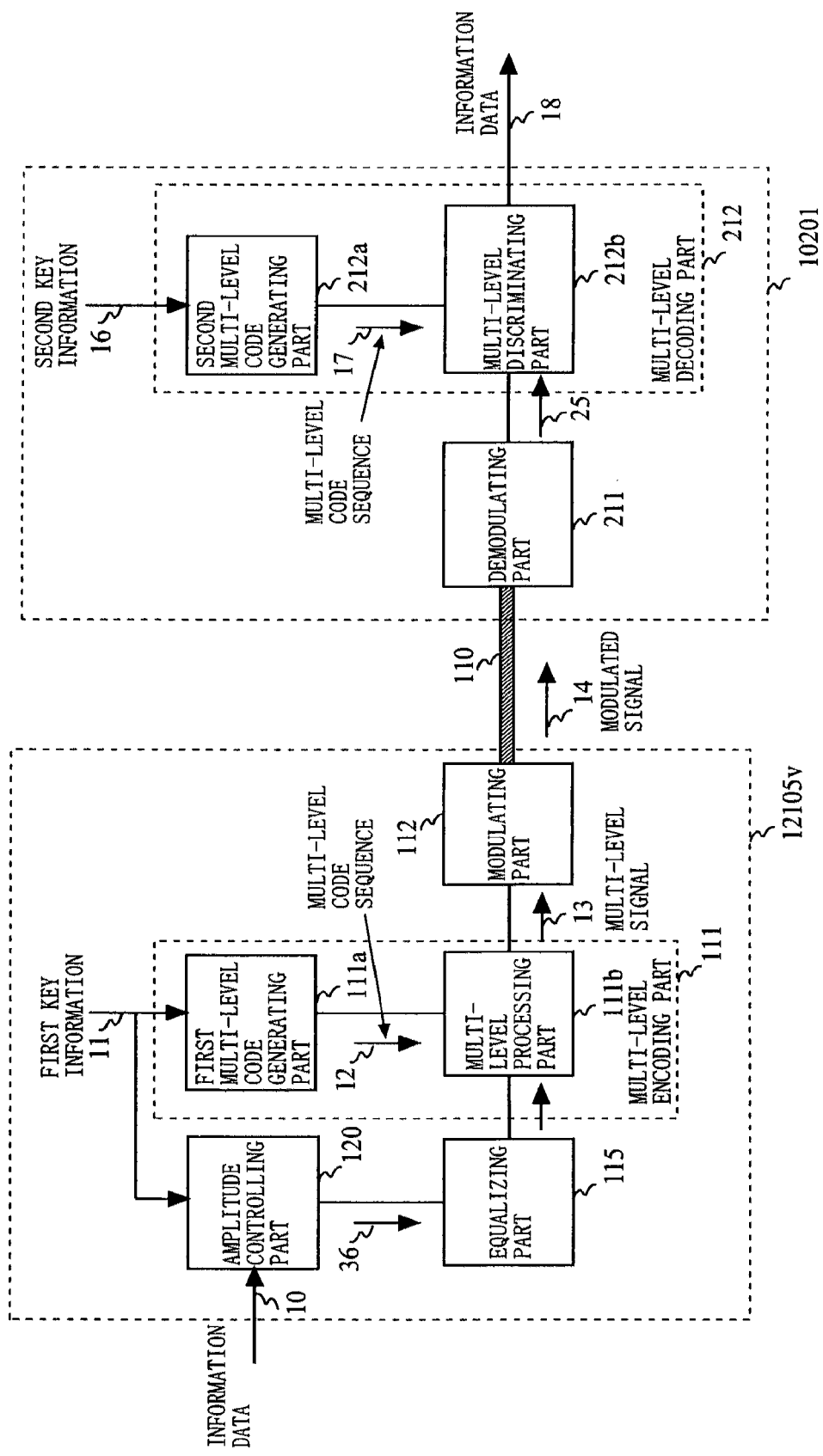
FIG. 48C is a block diagram showing an example of the structure of a data communication apparatus in which the characteristics of some of the embodiments of the present invention are combined.
Figure 49A:
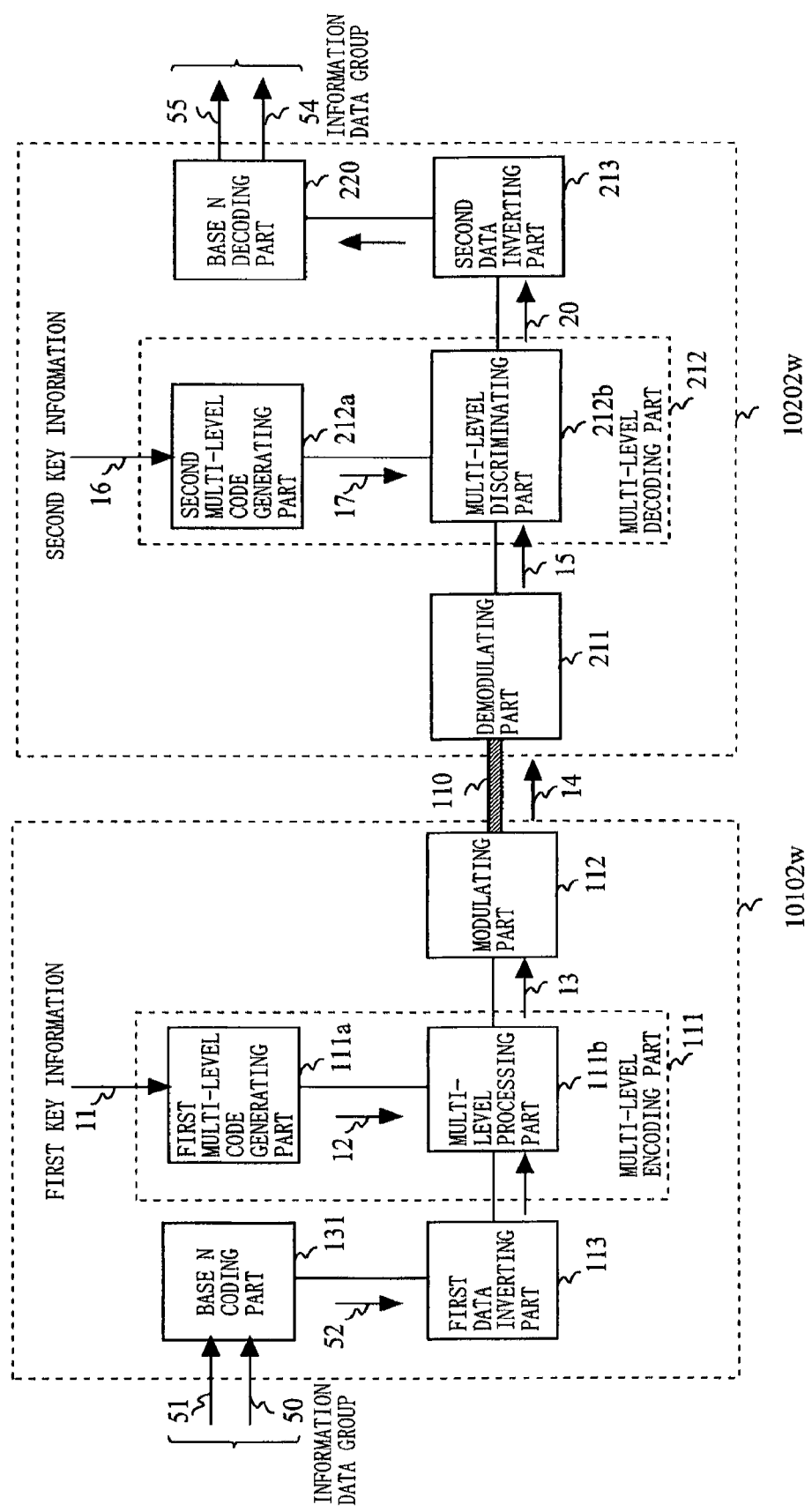
FIG. 49A is a block diagram showing an example of the structure of a data communication apparatus in which the characteristics of some of the embodiments of the present invention are combined.
Figure 49B:
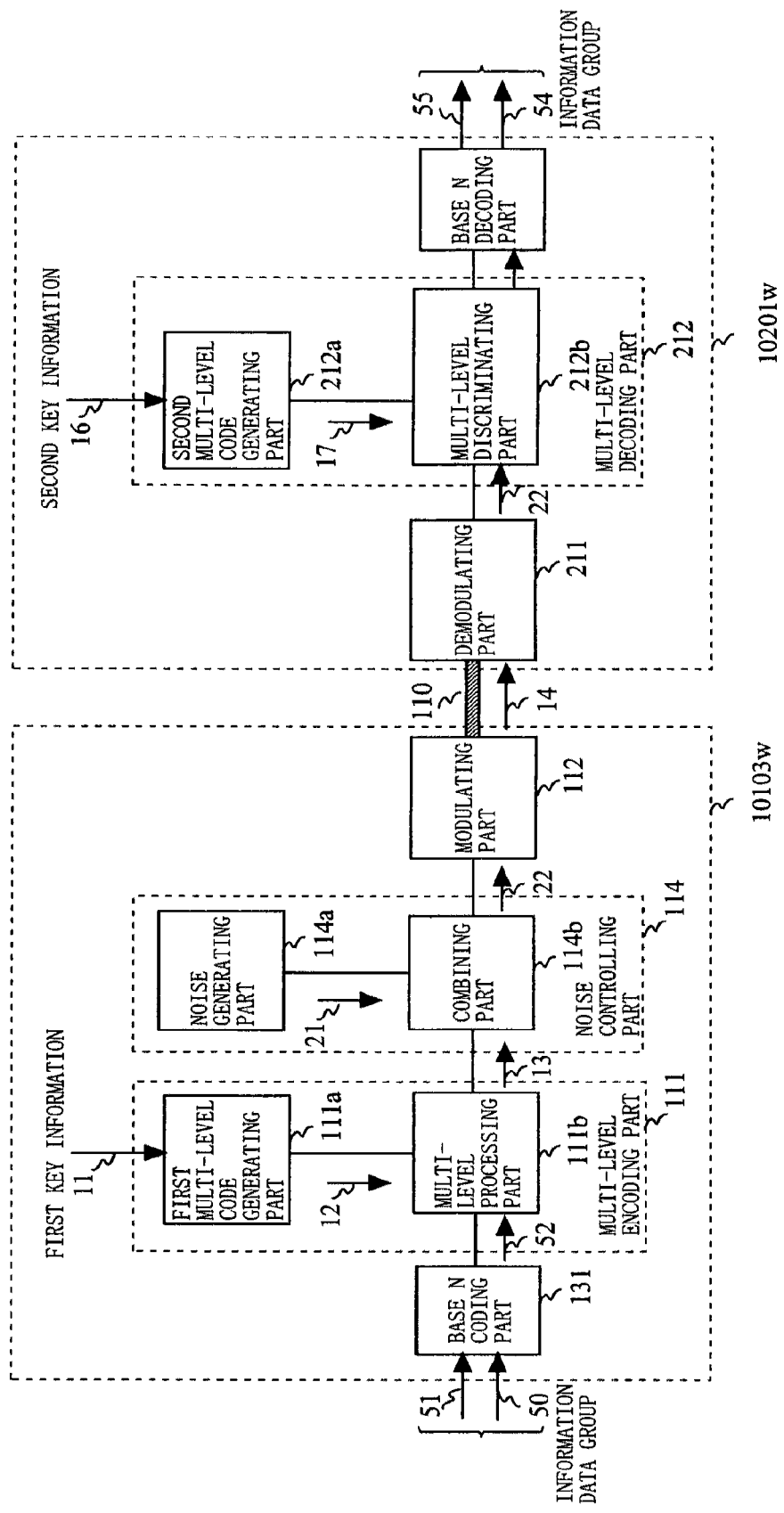
FIG. 49B is a block diagram showing an example of the structure of a data communication apparatus in which the characteristics of some of the embodiments of the present invention are combined.
Figure 50A:
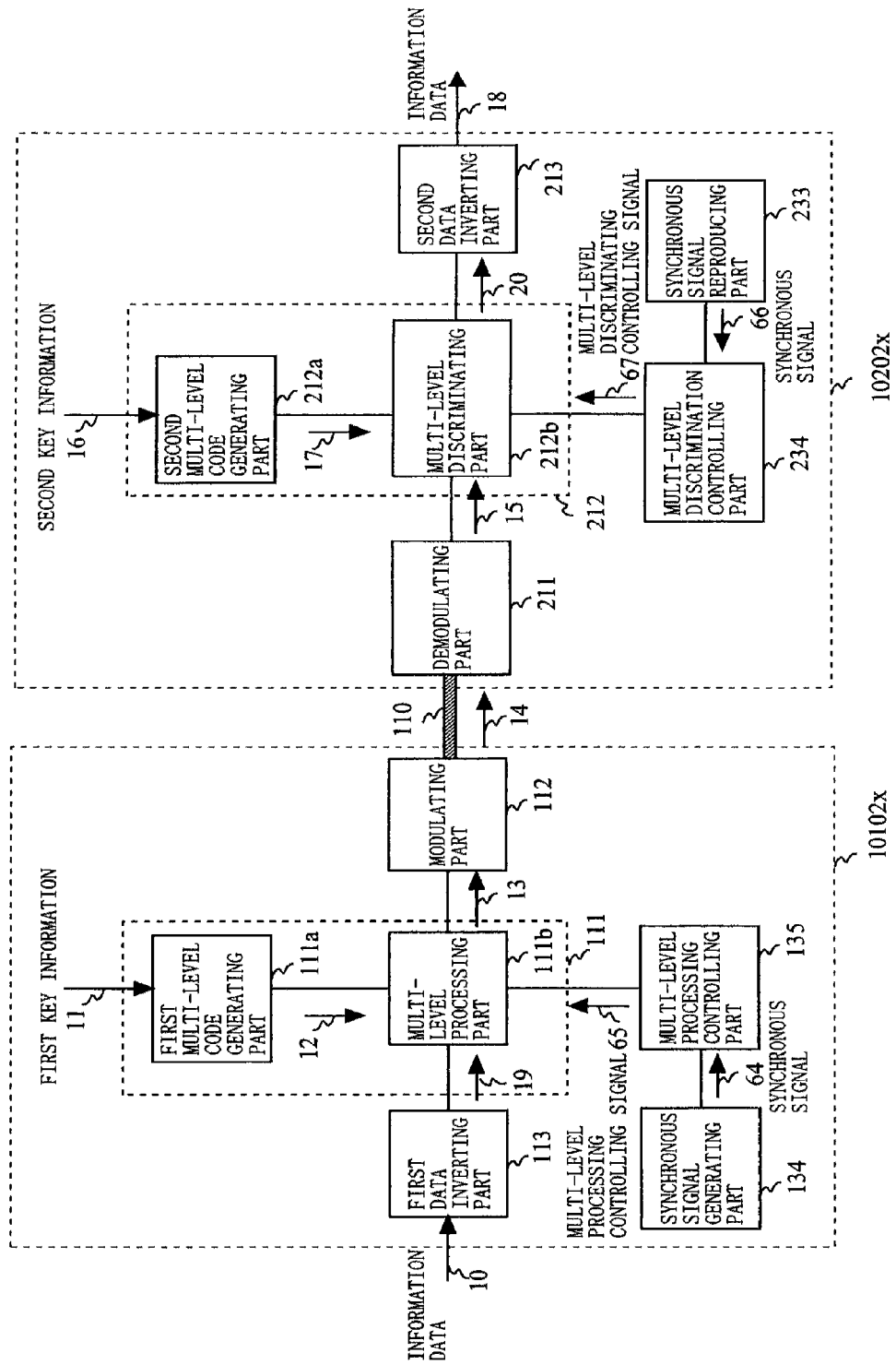
FIG. 50A is a block diagram showing an example of the structure of a data communication apparatus in which the characteristics of some of the embodiments of the present invention are combined.
Figure 50C:
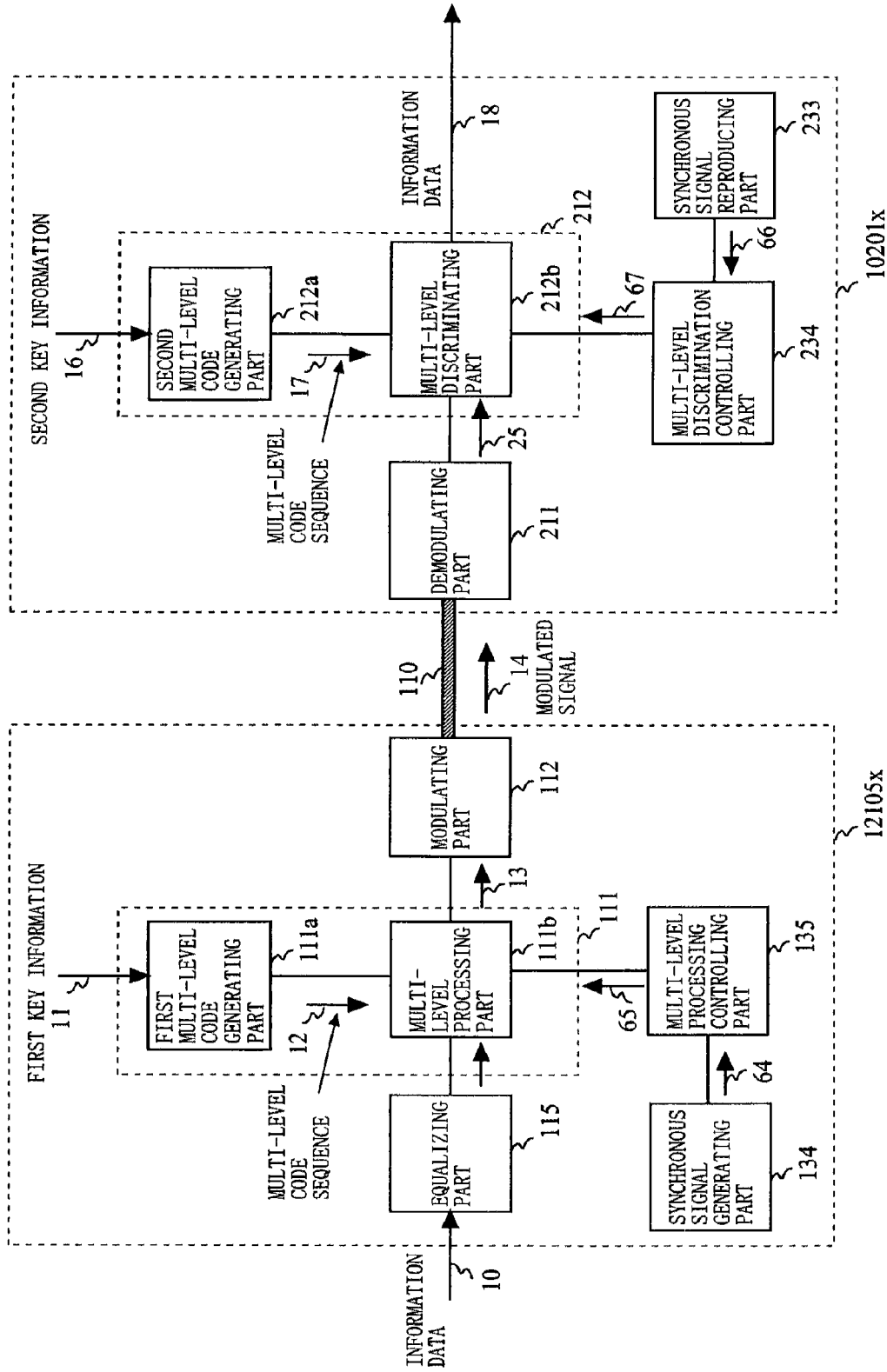
FIG. 50C is a block diagram showing an example of the structure of a data communication apparatus in which the characteristics of some of the embodiments of the present invention are combined.
Figure 51A:
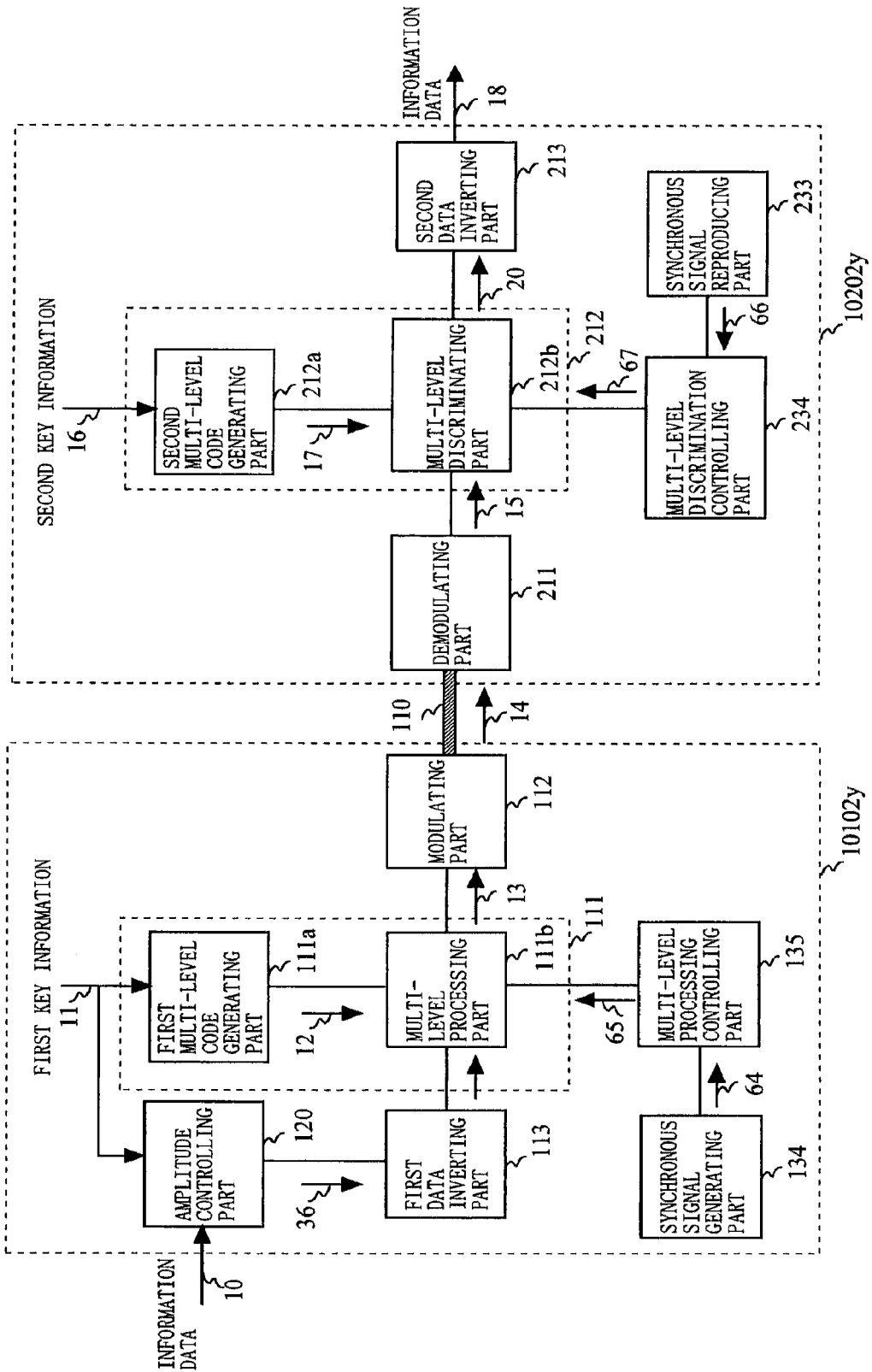
FIG. 51A is a block diagram showing an example of the structure of a data communication apparatus in which the characteristics of some of the embodiments of the present invention are combined.
Figure 51B:
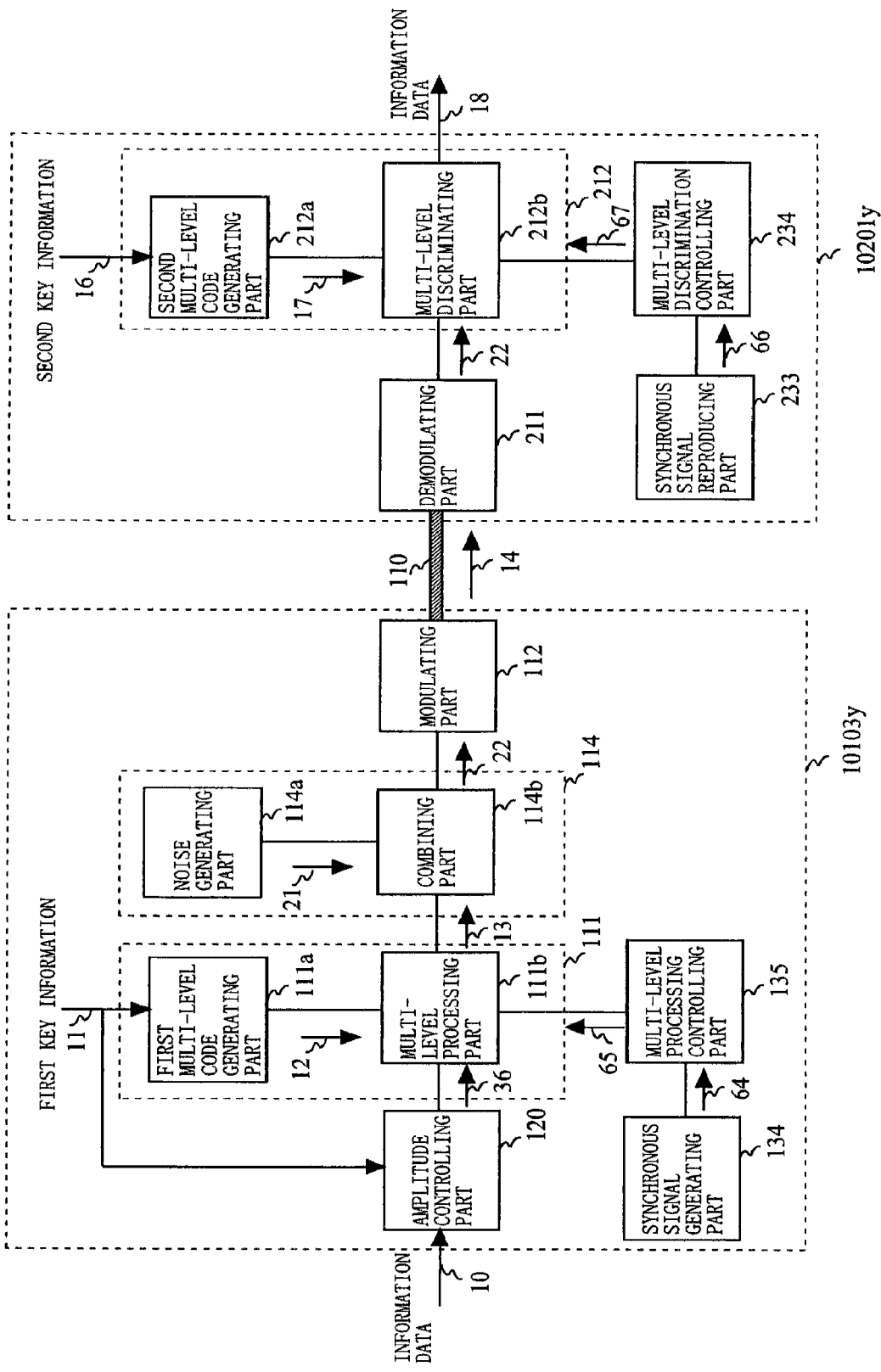
FIG. 51B is a block diagram showing an example of the structure of a data communication apparatus in which the characteristics of some of the embodiments of the present invention are combined.
Figure 51C:
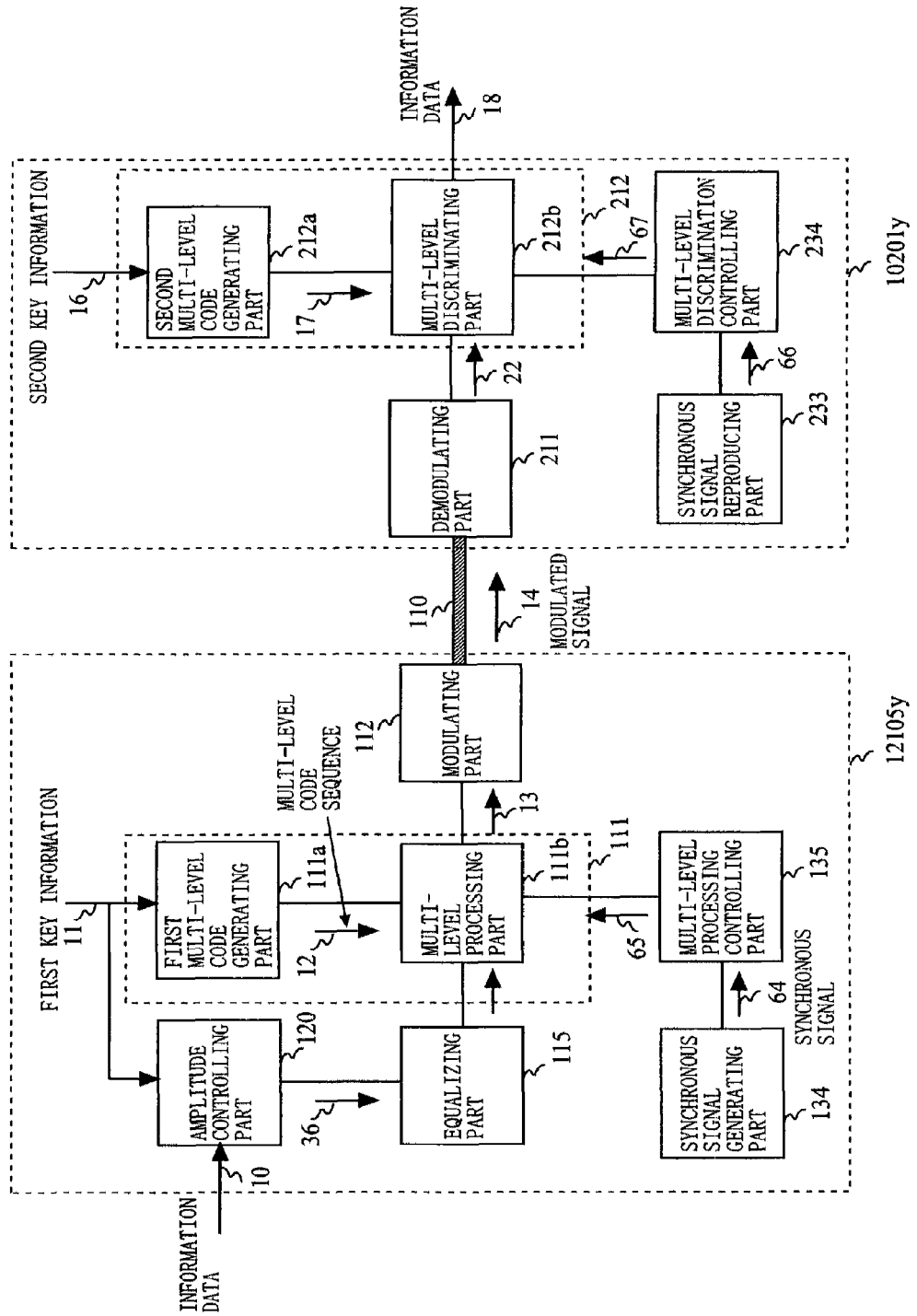
FIG. 51C is a block diagram showing an example of the structure of a data communication apparatus in which the characteristics of some of the embodiments of the present invention are combined.
Figure 52A:
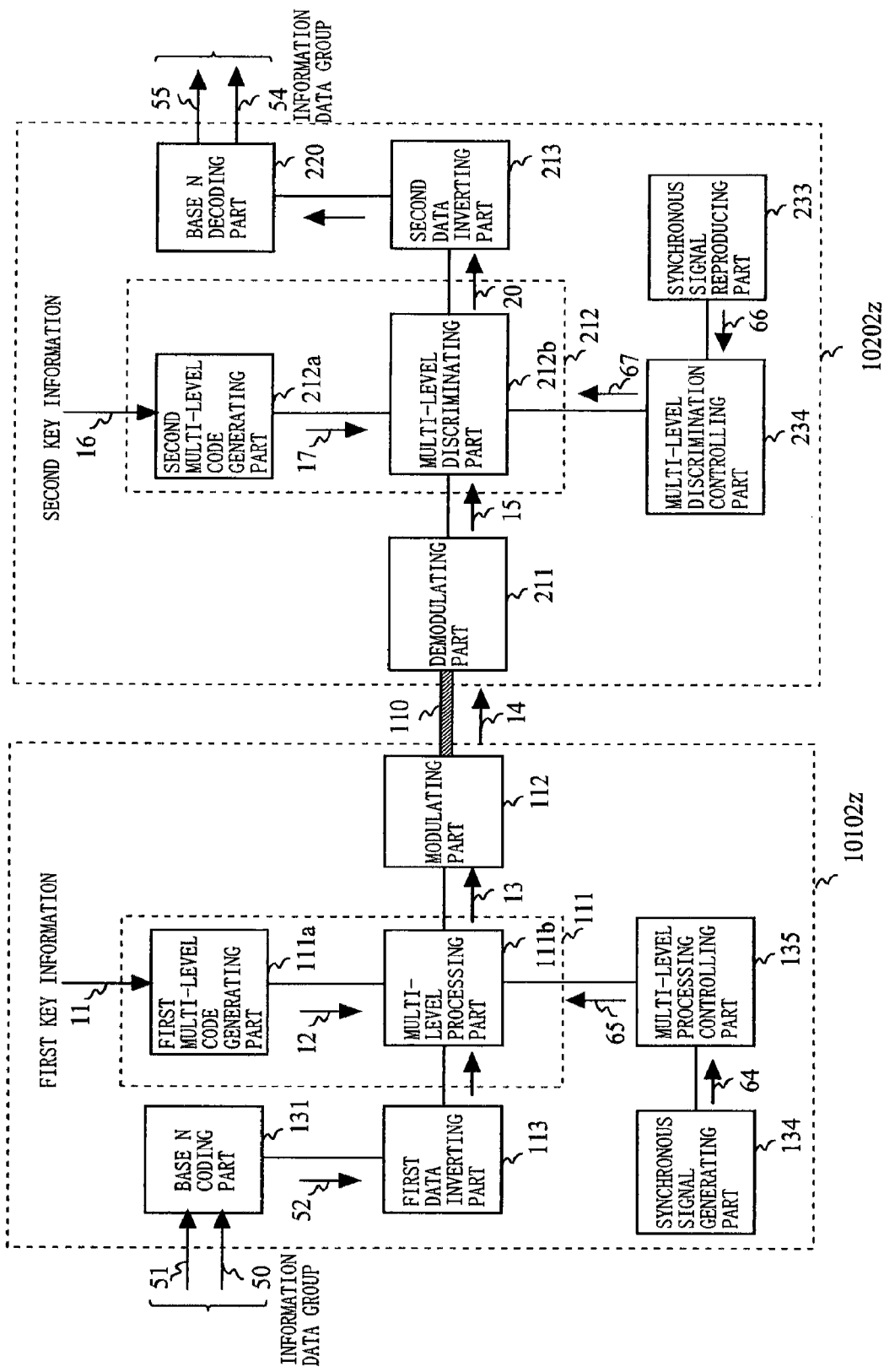
FIG. 52A is a block diagram showing an example of the structure of a data communication apparatus in which the characteristics of some of the embodiments of the present invention are combined.
Figure 52B:
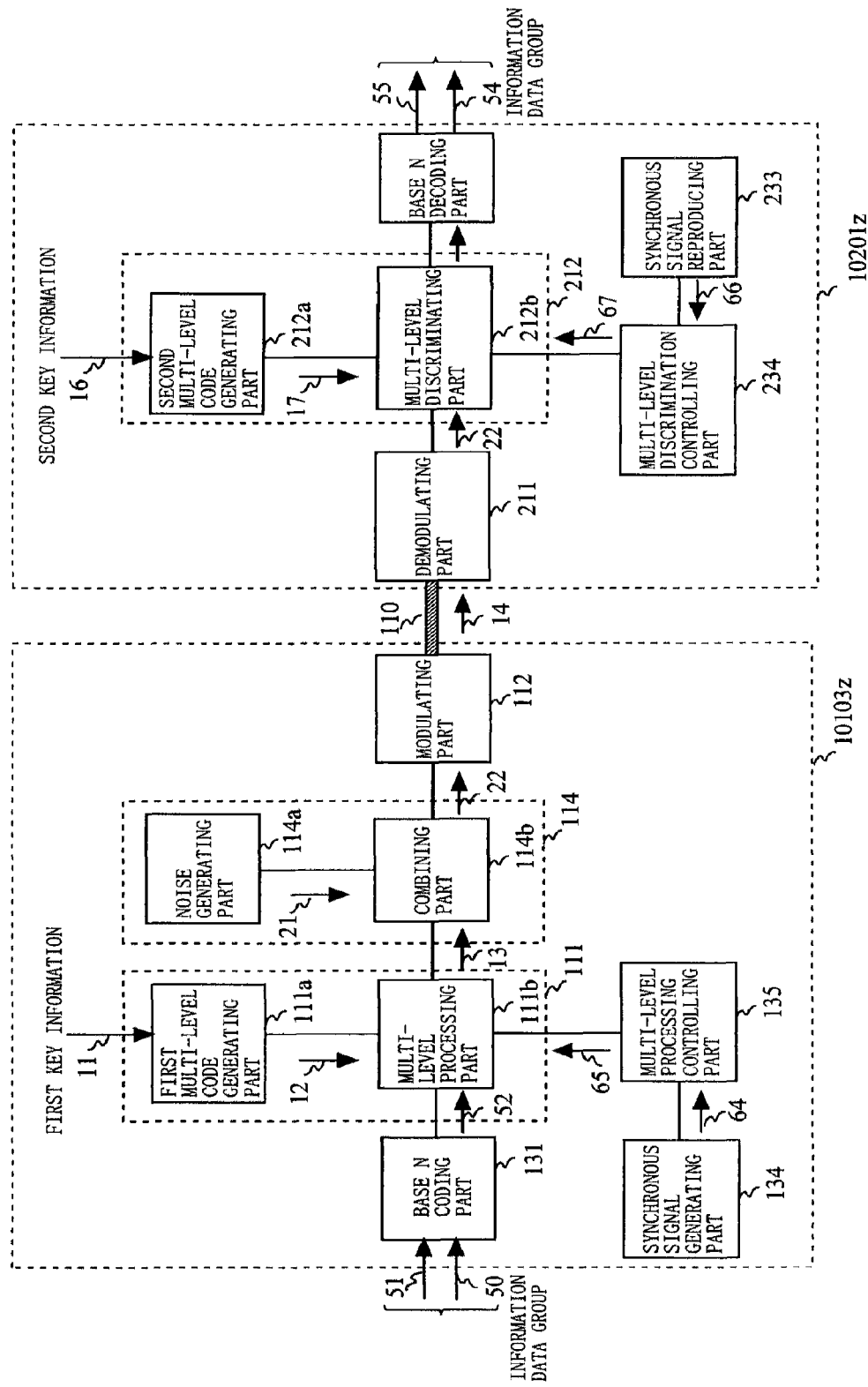
FIG. 52B is a block diagram showing an example of the structure of a data communication apparatus in which the characteristics of some of the embodiments of the present invention are combined.
Figure 52C:
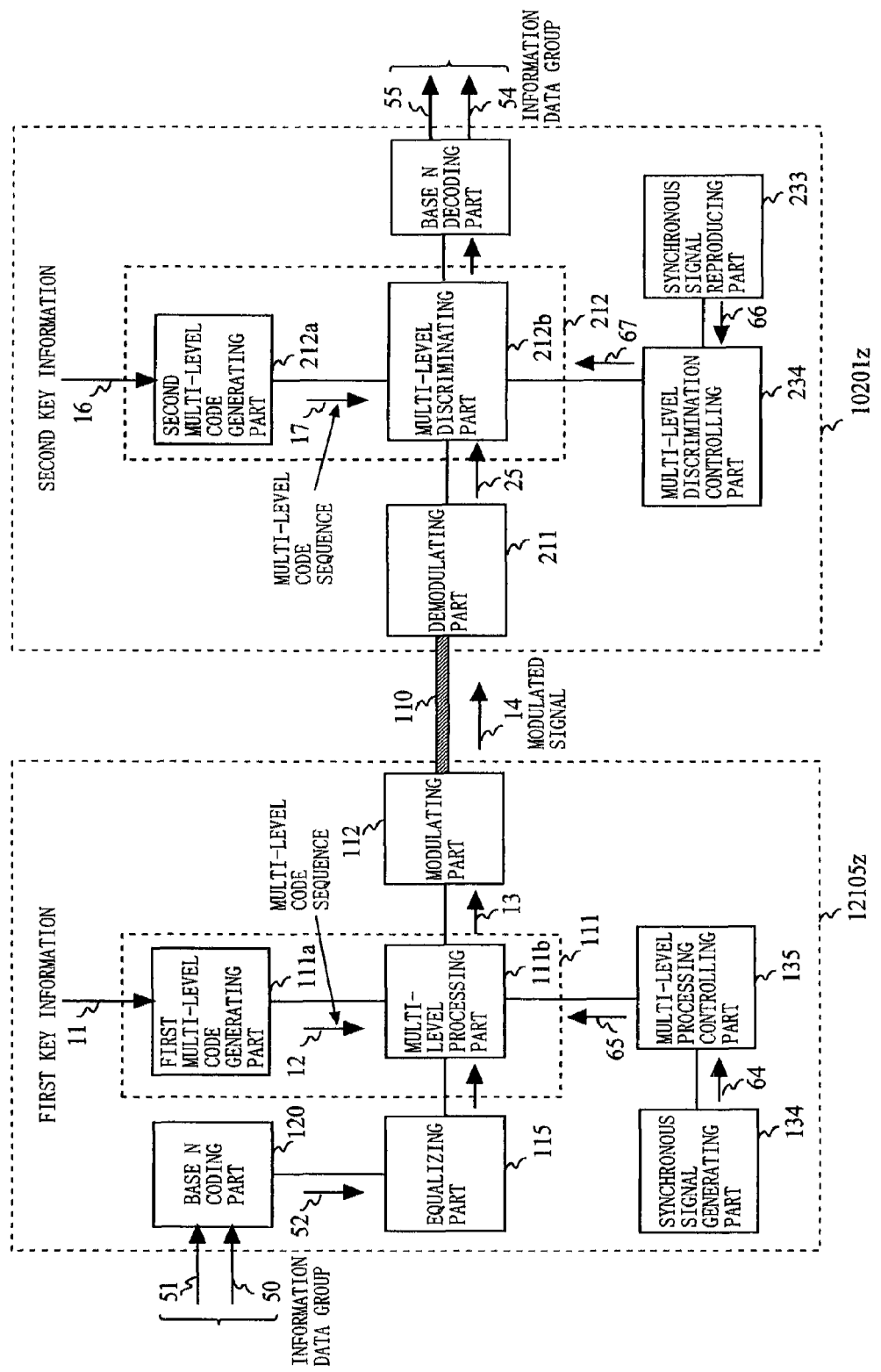
FIG. 52C is a block diagram showing an example of the structure of a data communication apparatus in which the characteristics of some of the embodiments of the present invention are combined.
Figure 53:
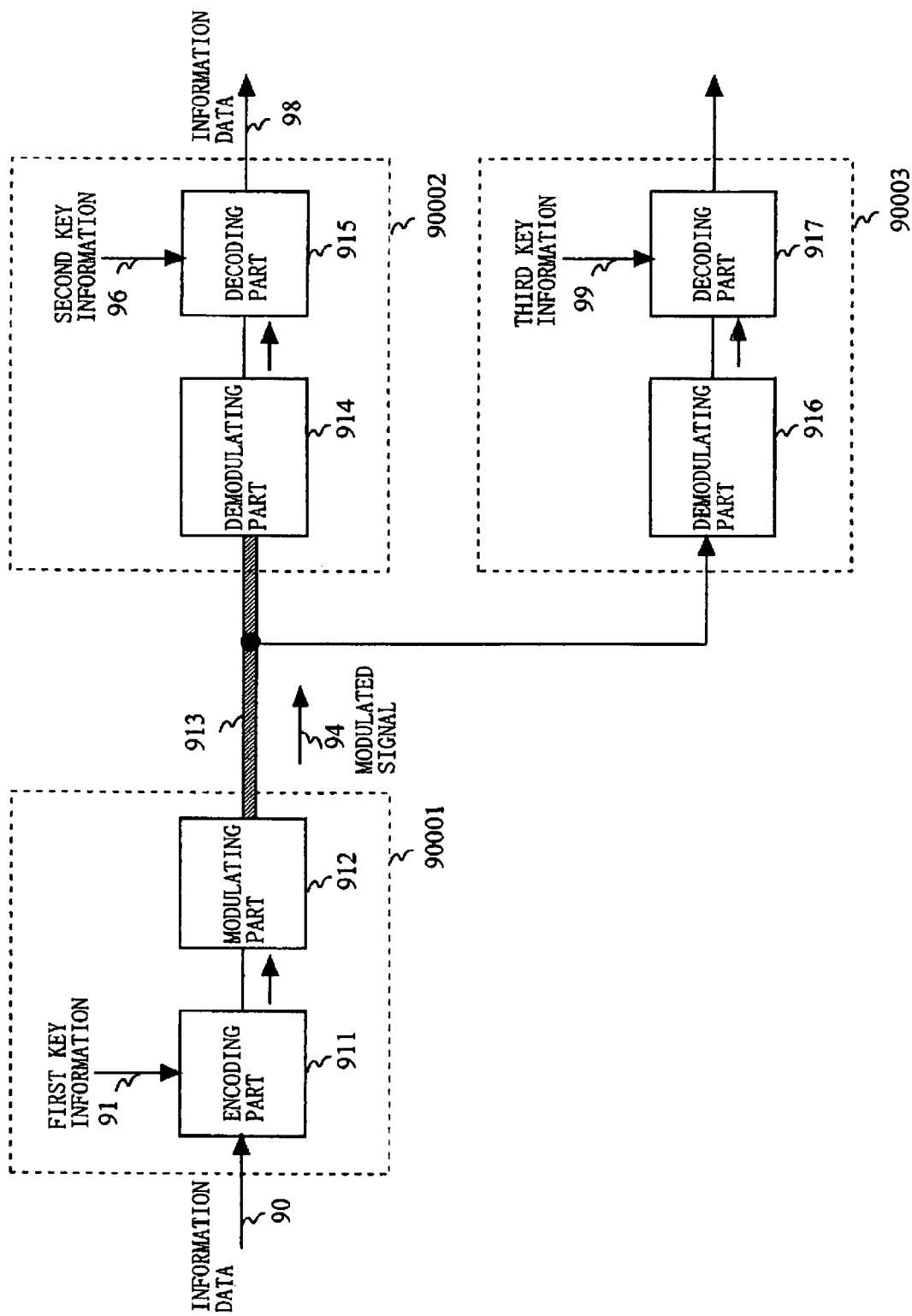
FIG. 53 is a block diagram showing the structure of the conventional data communication apparatus.

The data communication apparatuses according to the second to fifteenth embodiments may have the characteristics of some of the embodiments in combination. For example, the data communication apparatuses according to the second to the seventh and the ninth to the fifteenth embodiments may have the characteristic of the eighth embodiment (for example, see FIGS. 48A to 48C). For example, the data communication apparatuses according to the second to the ninth and the eleventh to the fifteenth embodiments may have the characteristic of the tenth embodiment (for example, see FIGS. 49A to 49C). For example, the data communication apparatuses according to the second to the eleventh and the thirteenth to the fifteenth embodiments may have the characteristic of the twelfth embodiment (for example, see FIGS. 50A to 50C). For example, the data communication apparatuses according to the second to the seventh and the ninth to the fifteenth embodiments may have the characteristics of the eighth and the twelfth embodiments (for example, see FIGS. 51A to 51C). For example, the data communication apparatuses according to the second to the ninth and the eleventh to the fifteenth embodiments may have the characteristics of the tenth and the twelfth embodiments (for example, see FIGS. 52A to 52C).

The processing performed by the data transmitting apparatuses, the data receiving apparatuses and the data communication apparatuses according to the first to the fifteenth embodiments may be grasped as data transmitting methods, data receiving methods and data communication methods having a series of processing procedures.

The data transmitting methods, the data receiving methods, and the data communication methods are realized by a CPU interpreting and executing predetermined program data capable of executing the processing procedures stored in a storage device (a ROM, a RAM, a hard disk, etc.). In this case, the program data may be installed into the storage device via a storage medium, or may be directly executed on the storage medium. The storage medium includes semiconductor memories such as ROMs, RAMs and flash memories, magnetic disk memories such as flexible disks and hard disks, optical disk memories such as CD-ROMs, DVDs, and BDs, and memory cards. The storage medium is a general idea including communication media such as the telephone line and carrying paths.

Industrial Applicability

The data communication apparatus according to the present embodiment is useful as a safe secret communication apparatus that is never wiretapper nor intercepted.

The invention claimed is:

1. A data transmitting method executed by a data transmitting apparatus including a processor, the data transmitting method comprising:
    a multi-level code sequence generating step of generating, from predetermined key information, a multi-level code sequence that varies in a signal level in a random number manner, the multi-level code sequence generating step being performed via a multi-level code generating part of the data transmitting apparatus utilizing the processor of the data transmitting apparatus;
    a modulated signal generating step of selecting a modulation condition from among a plurality of predetermined modulation conditions corresponding to a plurality of combinations of signal levels of information data and signal levels of the generated multi-level code sequence, and generating a modulated signal of a predetermined modulation format, the modulated signal generating step being performed via a modulating part of the data transmitting apparatus utilizing the processor of the data transmitting apparatus; and
    a transmitting step of transmitting the generated modulated signal, the transmitting step being performed via the modulating part utilizing the processor of the data transmitting apparatus,
    wherein a maximum interval between signal points of multiple levels constructed in correspondence with a combination of the signal levels of the information data and the signal levels of the generated multi-level code sequence is equal to or more than twice an amplitude of the information data in the selected modulation condition of the generated modulated signal.

2. The data transmitting method according to claim 1, wherein intervals between adjoining signal points of multiple levels constructed in correspondence with a combination of the signal levels of the information data and the signal levels of the generated multi-level code sequence are smaller than an amplitude of the information data in the selected modulation condition of the generated modulated signal.

3. The data transmitting method according to claim 1, wherein the information data is a binary signal.

4. The data transmitting method according to claim 1, wherein the modulated signal is generated by modulating an electromagnetic wave by a signal corresponding to the combination of the signal levels of the information data and the signal levels of the generated multi-level code sequence.

5. The data transmitting method according to claim 1, wherein the modulated signal is generated by modulating a light wave by a signal corresponding to the combination of the signal levels of the information data and the signal levels of the generated multi-level code sequence.

6. The data transmitting method according to claim 5, wherein the light wave is coherent light.

7. The data transmitting method according to claim 1, wherein signal points of multiple levels are arranged, such that a signal-to-noise power ratio defined in an interval between adjoining signal points is the same among all intervals between the signal points under a condition where the generated modulated signal is demodulated.

8. The data transmitting method according to claim 1, wherein signal points of multiple levels are non-uniformly or non-linearly arranged, such that a signal-to-noise power ratio defined in an interval between adjoining signal points is the same among all intervals between the signal points under a condition where the generated modulated signal is demodulated.

9. The data transmitting method according to claim 1, wherein the modulated signal generating step includes:
    a multi-level processing step of combining the information data with the generated multi-level code sequence in accordance with predetermined processing, so as to generate, in accordance with the combination of the signal levels of the information data and the signal levels of the generated multi-level code sequence, a multi-level signal that varies in a signal level in a random number manner, the multi-level processing step being performed via a multi-level processing part of the data transmitting apparatus utilizing the processor of the data transmitting apparatus; and
    a modulating step of generating, based on the generated multi-level signal and via the modulating part utilizing the processor, the modulated signal of the predetermined modulation format, and
    wherein signal points of the generated multi-level signal are uniformly arranged.

10. The data transmitting method according to claim 9, further comprising a noise controlling step of arbitrarily controlling a noise condition in the generated modulated signal, the noise controlling step being performed via a noise controlling part of the data transmission apparatus utilizing the processor of the data transmission apparatus.

11. The data transmitting method according to claim 9, further comprising an equalizing step of arbitrarily equalizing a frequency spectrum of the generated modulated signal, the equalizing step being performed via an equalizing part of the data transmission apparatus utilizing the processor of the data transmission apparatus.

12. The data transmitting method according to claim 9, further comprising an amplitude controlling step of increasing or decreasing an amplitude or an intensity of the generated modulated signal based on a predetermined amplitude control signal, the amplitude controlling step being performed via an amplitude controlling part of the data transmission apparatus utilizing the processor of the data transmission apparatus.

13. The data transmitting method according to claim 9, further comprising a base N encoding step of encoding the information data into a number in a given base system according to predetermined processing, the base N encoding step being performed via a base N encoding part of the data transmission apparatus utilizing the processor of the data transmission apparatus.

14. The data transmitting method according to claim 9, further comprising a base N encoding step of encoding an information data group comprising a plurality of pieces of the information data, into a number in a given base system according to predetermined processing, the base N encoding step being performed via a base N encoding part of the data transmission apparatus utilizing the processor of the data transmission apparatus.

15. The data transmitting method according to claim 9, further comprising a level number setting step of setting a level number of the generated multi-level signal to any predetermined level number of a plurality of predetermined level numbers every predetermined period, the level number setting step being performed via the multi-level code generating part of the data transmission apparatus utilizing the processor of the data transmission apparatus.

16. The data transmitting method according to claim 15, wherein the level number of the generated multi-level signal is "2" for any predetermined period.

17. The data transmitting method according to claim 15, wherein an amplitude, when the level number of the generated multi-level signal is "2," is a maximum amplitude of the generated multi-level signal in all periods.

18. The data transmitting method according to claim 15, wherein a transfer rate of the information data, the generated multi-level code sequence or the generated multi-level signal is changed according to the level number of the generated multi-level signal.

19. The data transmitting method according to claim 18, wherein the transfer rate of the information data, the generated multi-level code sequence or the generated multi-level signal increases as the level number of the generated multi-level signal decreases.

20. The data transmitting method according to claim 1, wherein the modulated signal generating step includes:
a first modulating step of generating, based on the information data, a first modulated signal of a predetermined modulation format; and
a second modulating step of generating, based on the generated multi-level code sequence, a second modulated signal of a predetermined modulation format, and
wherein the first modulated signal and the second modulated signal are combined according to predetermined processing, and a modulated signal, having a modulation condition that varies in a random number manner, is generated in correspondence with the combination of the signal levels of the information data and the signal levels of the generated multi-level code sequence.

21. A data transmitting apparatus comprising:
a multi-level code sequence generating part including a processor that generates, from predetermined key information, a multi-level code sequence that varies in a signal level in a random number manner;
a multi-level processing part including the processor that combines information data with the generated multi-level code sequence in accordance with predetermined processing, so as to generate a multi-level signal that varies in a signal level in a random number manner, the generated multi-level signal having a level corresponding to a combination of signal levels of the information data and signal levels of the generated multi-level code sequence;
a modulating part including the processor that generates, based on the generated multi-level signal, a modulated signal of a predetermined modulation format;
a noise controlling part including the processor arbitrarily controlling a noise condition in the generated modulated signal; and
a transmitting part including the processor transmitting, to a data receiving apparatus, the generated modulated signal having the noise condition arbitrarily controlled,
wherein signal points of the generated multi-level signal are uniformly arranged, and
wherein the noise controlling part includes:
a noise generating part generating a predetermined noise independent of the data receiving apparatus to which the generated modulated signal is transmitted; and
a combining part combining the generated noise and one of the information data, the generated multi-level code sequence, and the generated modulated signal.

22. The data transmitting apparatus according to claim 21, further comprising a data inverting part including the processor that bit-inverts the information data based on a predetermined pseudo-random number sequence, and outputs the bit-inverted information data to the multi-level processing part.

23. The data transmitting apparatus according to claim 21, wherein, as the predetermined processing, the multi-level processing part generates the multi-level signal by adding the information data to the generated multi-level code sequence.

24. The data transmitting apparatus according to claim 21, wherein, as the predetermined processing, the multi-level processing part generates the multi-level signal by level-controlling the generated multi-level code sequence according to the information data.

25. The data transmitting apparatus according to claim 21, wherein the combining part combines the generated noise and the information data, and outputs the combined noise and information data to the multi-level processing part.

26. The data transmitting apparatus according to claim 21, wherein the combining part combines the generated noise and the generated multi-level code sequence, and outputs the combined noise and multi-level code sequence to the multi-level processing part.

27. The data transmitting apparatus according to claim 21, wherein the combining part combines the generated noise and the generated multi-level signal, and outputs the combined noise and multi-level signal to the modulating part.

28. The data transmitting apparatus according to claim 21, wherein the combining part combines the generated noise and the generated modulated signal.

29. The data transmitting apparatus according to claim 21, further comprising an equalizing part including the processor that performs a predetermined frequency equalization on a spectrum of the generated modulated signal.

30. The data transmitting apparatus according to claim 29, further comprising an equalizing part including the processor that performs a predetermined frequency equalization on the information data, and outputs the equalized information data to the multi-level processing part.

31. The data transmitting apparatus according to claim 29, further comprising an equalizing part including the processor that performs a predetermined frequency equalization on the generated multi-level code sequence, and outputs the equalized multi-level code sequence to the multi-level processing part.

32. The data transmitting apparatus according to claim 29, further comprising an equalizing part including the processor that performs a predetermined frequency equalization on the generated multi-level signal, and outputs the equalized multi-level signal to the modulating part.

33. The data transmitting apparatus according to claim 29, further comprising an equalizing part including the processor that performs a predetermined frequency equalization on the generated modulated signal.

34. The data transmitting apparatus according to claim 21, further comprising an amplitude controlling part including the processor that increases or decreases an amplitude or an intensity of the generated modulated signal based on a predetermined amplitude control signal.

35. The data transmitting apparatus according to claim 34, further comprising:

an amplitude control signal generating part including the processor that generates, from predetermined amplitude control key information, an amplitude control signal having a value that varies in a random number manner; and an amplitude controlling part including the processor that performs an amplitude modulation on the information data based on the generated amplitude control signal.

36. The data transmitting apparatus according to claim 34, further comprising:

an amplitude control signal generating part including the processor that generates, from predetermined amplitude control key information, an amplitude control signal having a value that varies in a random number manner; and an amplitude controlling part that performs an amplitude modulation on the generated multi-level code sequence based on the generated amplitude control signal.

37. The data transmitting apparatus according to claim 34, further comprising:

an amplitude control signal generating part including the processor that generates, from predetermined amplitude control key information, an amplitude control signal having a value that varies in a random number manner; and an amplitude controlling part including the processor that performs an amplitude modulation on the generated multi-level signal based on the generated amplitude control signal.

38. The data transmitting apparatus according to claim 34, further comprising:

an amplitude control signal generating part including the processor that generates, from predetermined amplitude control key information, an amplitude control signal having a value that varies in a random number manner; and an amplitude controlling part including the processor that performs an amplitude modulation on the generated modulated signal based on the generated amplitude control signal.

39. The data transmitting apparatus according to claim 21, further comprising a base N encoding part including the processor that encodes the information data into a number in a given base system according to predetermined processing, and outputs the number to the multi-level processing part.

40. The data transmitting apparatus according to claim 39, wherein the base N encoding part encodes the information data into the number, in the given base system, such that multiple levels of the number vary, by changing a logical order of the information data.

41. The data transmitting apparatus according to claim 39, wherein the base N encoding part encodes the information data into the number in a predetermined base system based on the predetermined key information.

42. The data transmitting apparatus according to claim 39, wherein the base N encoding part encodes the information data into the number in a predetermined base system based on key information different from the predetermined key information.

43. The data transmitting apparatus according to claim 21, further comprising a base N encoding part including the processor that encodes an information data group comprising a plurality of pieces of the information data, into a number in a given base system according to predetermined processing, and outputs the number to the multi-level processing part.

44. The data transmitting apparatus according to claim 21, wherein the multi-level code generating part sets a level number of the generated multi-level signal to any predetermined level number of a plurality of predetermined level numbers every predetermined period.

45. The data transmitting apparatus according to claim 44, further comprising:

a synchronous signal generating part including the processor that outputs a predetermined synchronous signal corresponding to the generated multi-level signal; and a multi-level code controlling part including the processor that outputs, based on the predetermined synchronous signal, a multi-level code control signal that specifies the level number, wherein the multi-level code generating part sets the level number of the generated multi-level signal based on the multi-level code control signal.

46. A data receiving apparatus comprising:

a multi-level code sequence generating part including a processor that generates, from predetermined key information, a multi-level code sequence that varies in a signal level in a random number manner;

a demodulating part including the processor that demodulates a modulated signal of a predetermined modulation format having a multi-level modulation condition, and outputs the demodulated signal as a multi-level signal; and a multi-level discriminating part including the processor that discriminates the multi-level signal based on the generated multi-level code sequence according to predetermined processing, and reproduces information data, wherein a maximum interval between signal points of multiple levels constructed in correspondence with a combination of signal levels of the information data and signal levels of the generated multi-level code sequence is equal to or more than twice an amplitude of the information data in the multi-level modulation condition of the modulated signal.

47. The data receiving apparatus according to claim 46, further comprising a data inverting part including the processor that bit-inverts the information data based on a predetermined pseudo-random number sequence, and outputs the bit-inverted information data.

48. The data receiving apparatus according to claim 46, wherein the multi-level discriminating part reproduces the information data by subtracting the generated multi-level code sequence from the multi-level signal as the predetermined processing.

49. The data receiving apparatus according to claim 46, wherein the multi-level discriminating part reproduces the information data by binary-discriminating the multi-level signal with the generated multi-level code sequence as a reference level, as the predetermined processing.

50. The data receiving apparatus according to claim 46, wherein the multi-level discriminating part reproduces the information data by discriminating the multi-level signal based on the generated multi-level code sequence and a predetermined amplitude control signal as the predetermined processing.

51. The data receiving apparatus according to claim 50, further comprising an amplitude control signal generating part including the processor that generates, from predetermined amplitude control key information, an amplitude control signal having a value that varies in a random number manner, wherein the multi-level discriminating part reproduces the information data by discriminating the multi-level signal based on the generated multi-level code sequence and the amplitude control signal.

52. The data receiving apparatus according to claim 46, further comprising a base N decoding part including the processor that decodes the information data from a number in a given base system to a binary number according to predetermined processing.

53. The data receiving apparatus according to claim 52, wherein the base N decoding part decodes the information data from the number in the given base system to the binary number based on the predetermined key information.

54. The data receiving apparatus according to claim 52, wherein the base N decoding part decodes the information data from the number in the given base system to the binary number based on key information different from the predetermined key information.

55. The data receiving apparatus according to claim 46, further comprising a base N decoding part including the processor that decodes the information data from a number in a given base system to a binary number according to predetermined processing, and separates the decoded information data into a plurality of pieces of information data.

56. The data receiving apparatus according to claim 46, wherein the multi-level discriminating part changes a threshold value for discriminating the multi-level signal, in correspondence with a level number of the multi-level signal, every predetermined period.

57. The data receiving apparatus according to claim 56, further comprising:
   a synchronous signal reproducing part including the processor that reproduces a predetermined synchronous signal corresponding to the multi-level signal; and
   a multi-level discrimination controlling part including the processor that outputs a multi-level discrimination control signal that changes the threshold value at the multi-level discriminating part based on the synchronous signal,
   wherein the multi-level discriminating part changes the threshold value for discriminating the multi-level signal, based on the multi-level discrimination control signal.

58. A data communication apparatus in which a data transmitting apparatus and a data receiving apparatus perform cipher communication,
wherein the data transmitting apparatus comprises:
   a first multi-level code sequence generating part including a processor that generates, from predetermined first key information, a first multi-level code sequence that varies in a signal level in a random number manner;
   a multi-level processing part including the processor that combines information data with the generated first multi-level code sequence in accordance with predetermined processing, so as to generate a multi-level signal that varies in a signal level in a random number manner, the generated multi-level signal having a level corresponding to a combination of signal levels of the information data and signal levels of the generated first multi-level code sequence; and
   a modulating part including the processor that generates, based on the generated multi-level signal, a modulated signal of a predetermined modulation format,
wherein a maximum interval between signal points of multiple levels constructed in correspondence with a combination of the signal levels of the information data and the signal levels of the generated first multi-level code sequence is equal to or more than twice an amplitude of the information data in a selected modulation condition of the generated modulated signal,
wherein the data receiving apparatus comprises:
   a second multi-level code sequence generating part including the processor that generates, from predetermined second key information equal to the predetermined first key information, a second multi-level code sequence that varies in a signal level in a random number manner;
   a demodulating part including the processor that demodulates the generated modulated signal, and reproduces the generated multi-level signal; and
a multi-level discriminating part including the processor that discriminates the generated multi-level signal based on the generated second multi-level code sequence according to predetermined processing, and reproduces the information data, and
wherein signal points of the generated multi-level signal are uniformly arranged.

\* \* \* \* \*